United States Patent [19]
Loshbough et al.

[11] 3,962,570
[45] June 8, 1976

[54] SCALE WITH MANUAL TARE ENTRY

[75] Inventors: Richard C. Loshbough, Temperance, Mich.; Edward G. Pryor, Toledo, Ohio

[73] Assignee: Reliance Electric Company, Cleveland, Ohio

[22] Filed: Apr. 30, 1975

[21] Appl. No.: 573,150

Related U.S. Application Data

[63] Continuation-in-part of Ser. No. 434,663, Jan. 18, 1974.

[52] U.S. Cl. .............................. 235/151.33; 177/25
[51] Int. Cl.² ........................................ G06F 15/46
[58] Field of Search ...... 235/151.33, 151.3, 92 WT; 177/3, 4, 5, 6, 12, 25; 340/172.5; 444/1

[56] References Cited
UNITED STATES PATENTS

| | | | |
|---|---|---|---|
| 2,974,863 | 3/1961 | Williams, Jr. et al. | 235/151.33 |
| 3,262,639 | 7/1966 | Karp | 177/3 X |
| 3,329,807 | 7/1967 | Currie, Jr. et al. | 177/3 X |
| 3,375,357 | 3/1968 | Dekker et al. | 235/151.33 X |
| 3,665,169 | 5/1972 | Henderson et al. | 235/151.33 X |
| 3,684,875 | 8/1972 | Smith et al. | 177/25 X |

Primary Examiner—Joseph F. Ruggiero

[57] ABSTRACT

Improved electronic apparatus for weighing, computing a value and printing a label showing the weight, the price per unit weight and the computed value of each of a plurality of successive articles. A microcomputer is supplied with the article weight from a load cell scale and with the price per unit weight either from a manual keyboard or automatically from a commodity plate in a label printer. Tare weight is entered through a plurality of switches, each of which represents a different tare weight. When one of the tare switches is actuated, a timer is started. If a second tare switch is then pushed before a predetermined time interval is measured by the timer, the tare weight represented by the two switches are added together to obtain the total tare weight. After the system corrects for zero error, checks for scale motion, compensates for the total entered tare weight and checks various interlocks, the microcomputer computes an article value and causes a label to be printed. A digital indicator is provided for displaying the net article weight obtained from the measured gross article weight less the zero error correction factor and the total entered tare weight.

4 Claims, 19 Drawing Figures

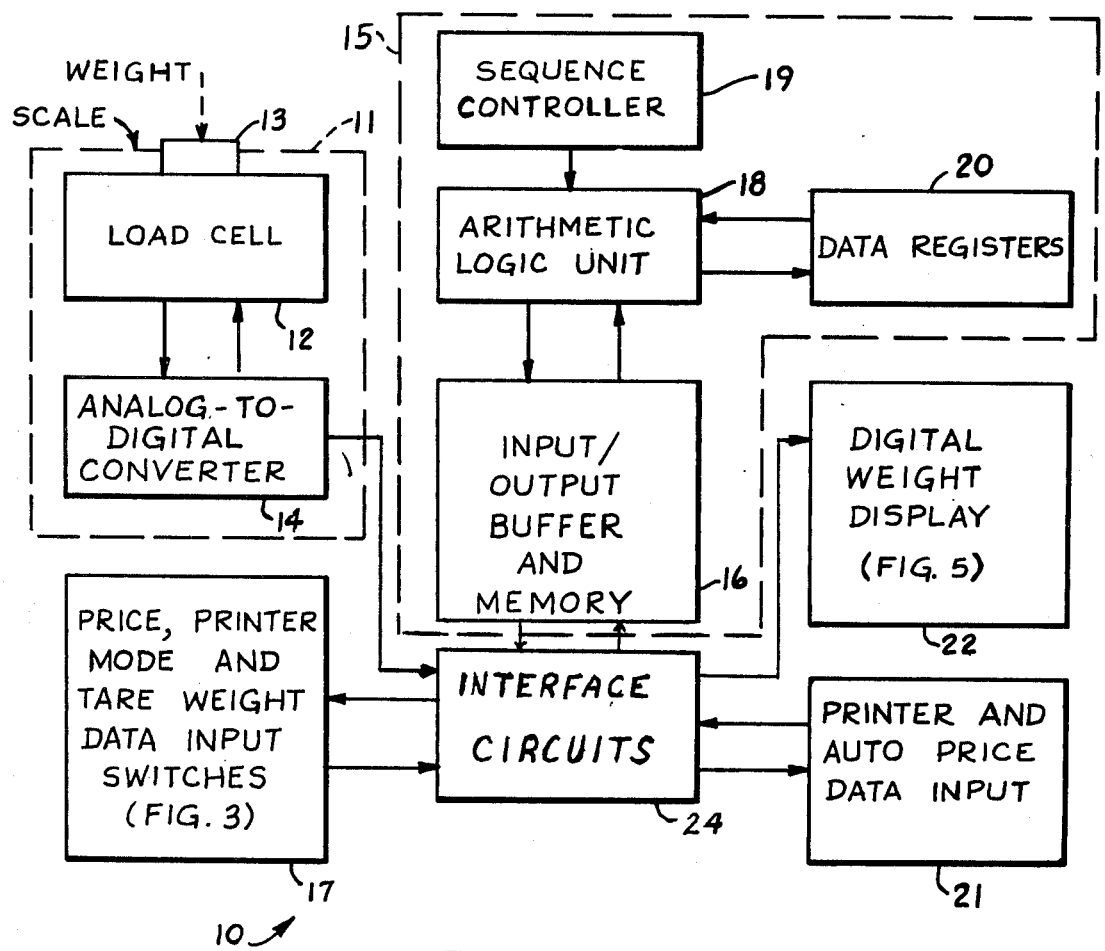
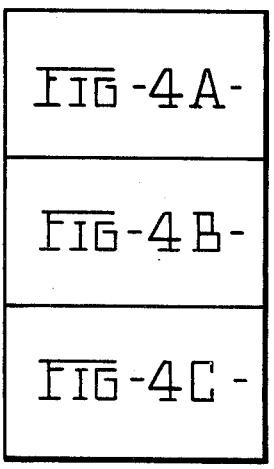
FIG-1-
FIG-4A-
FIG-4B-
FIG-4C-

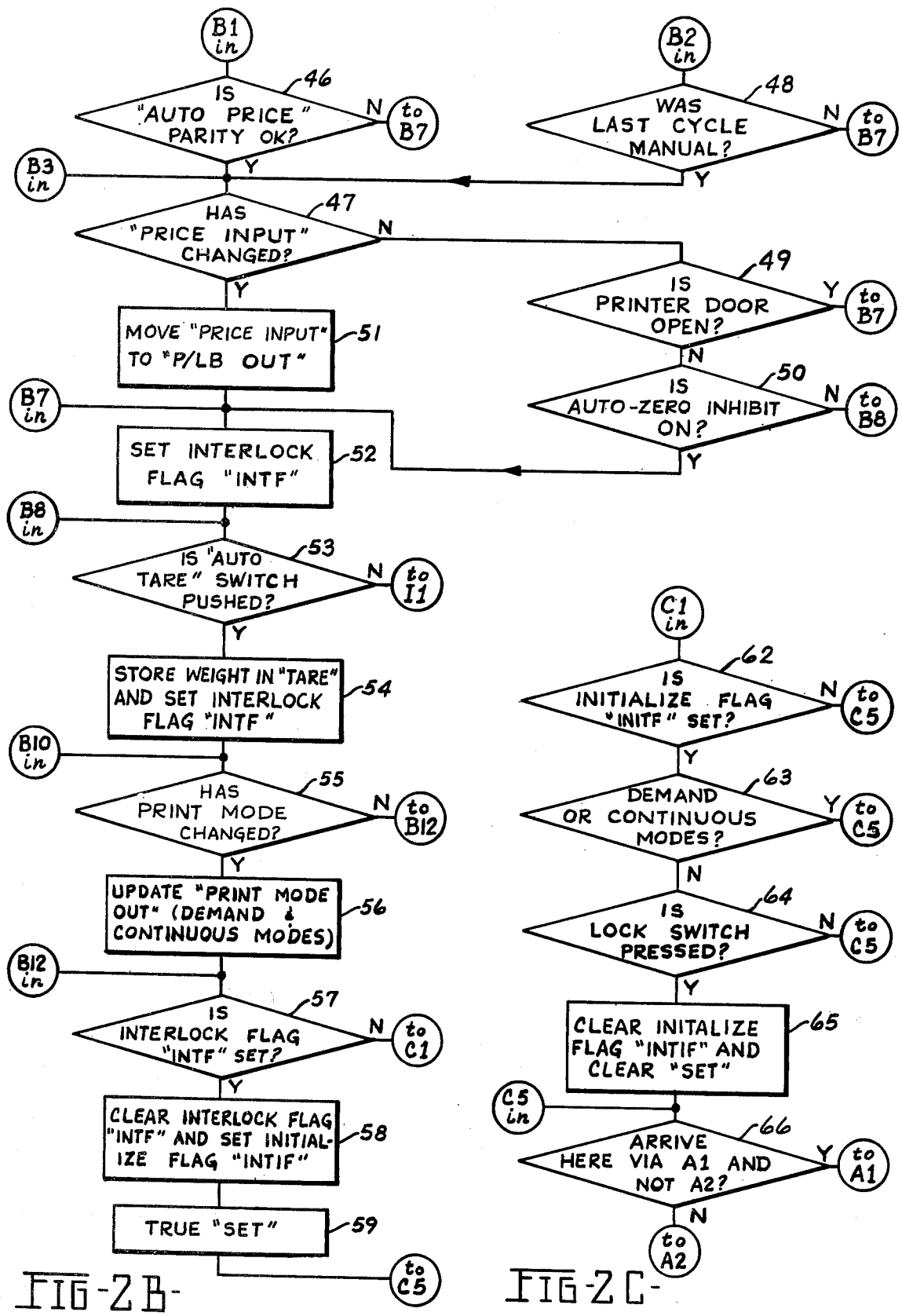

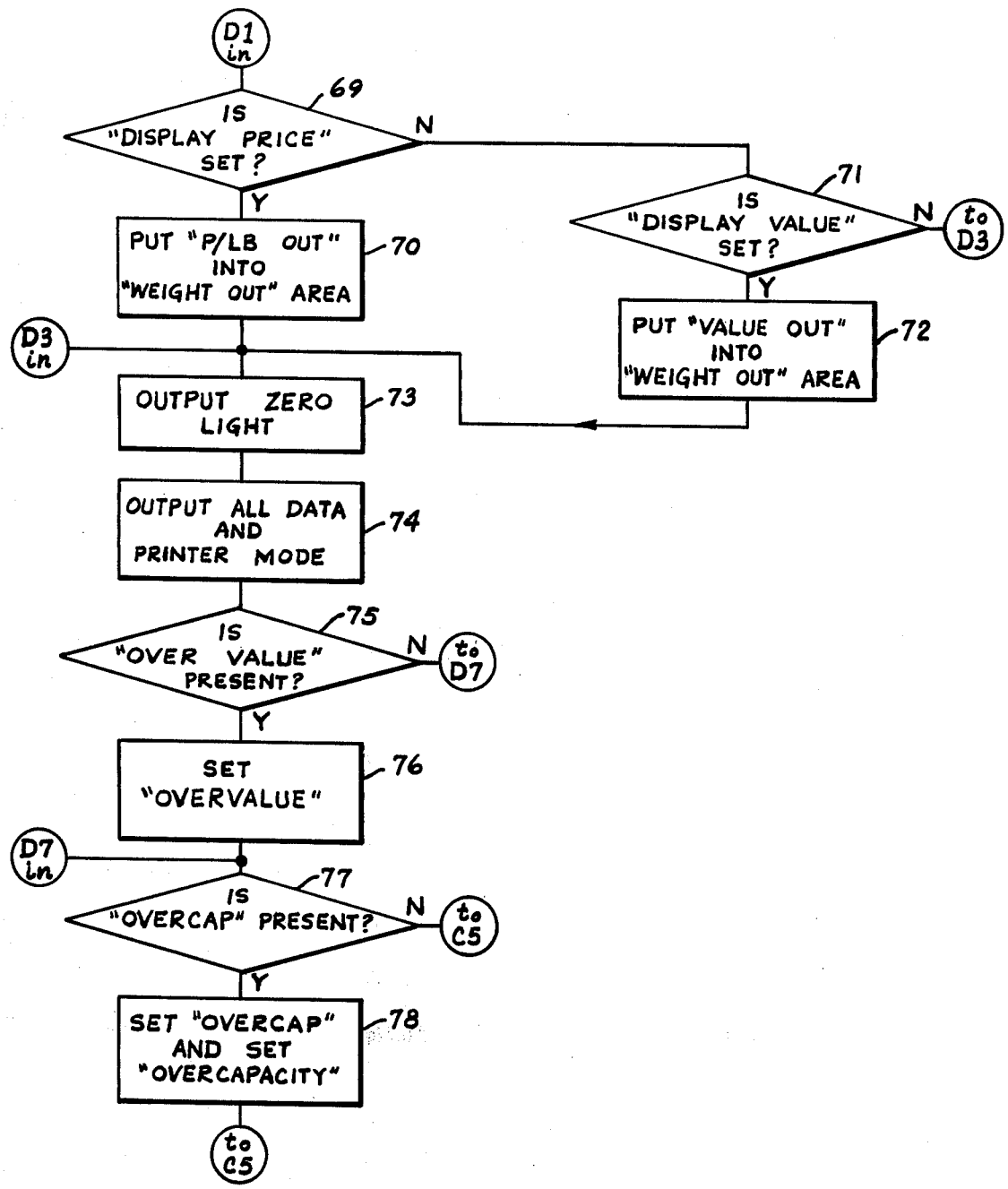
FIG-2D-

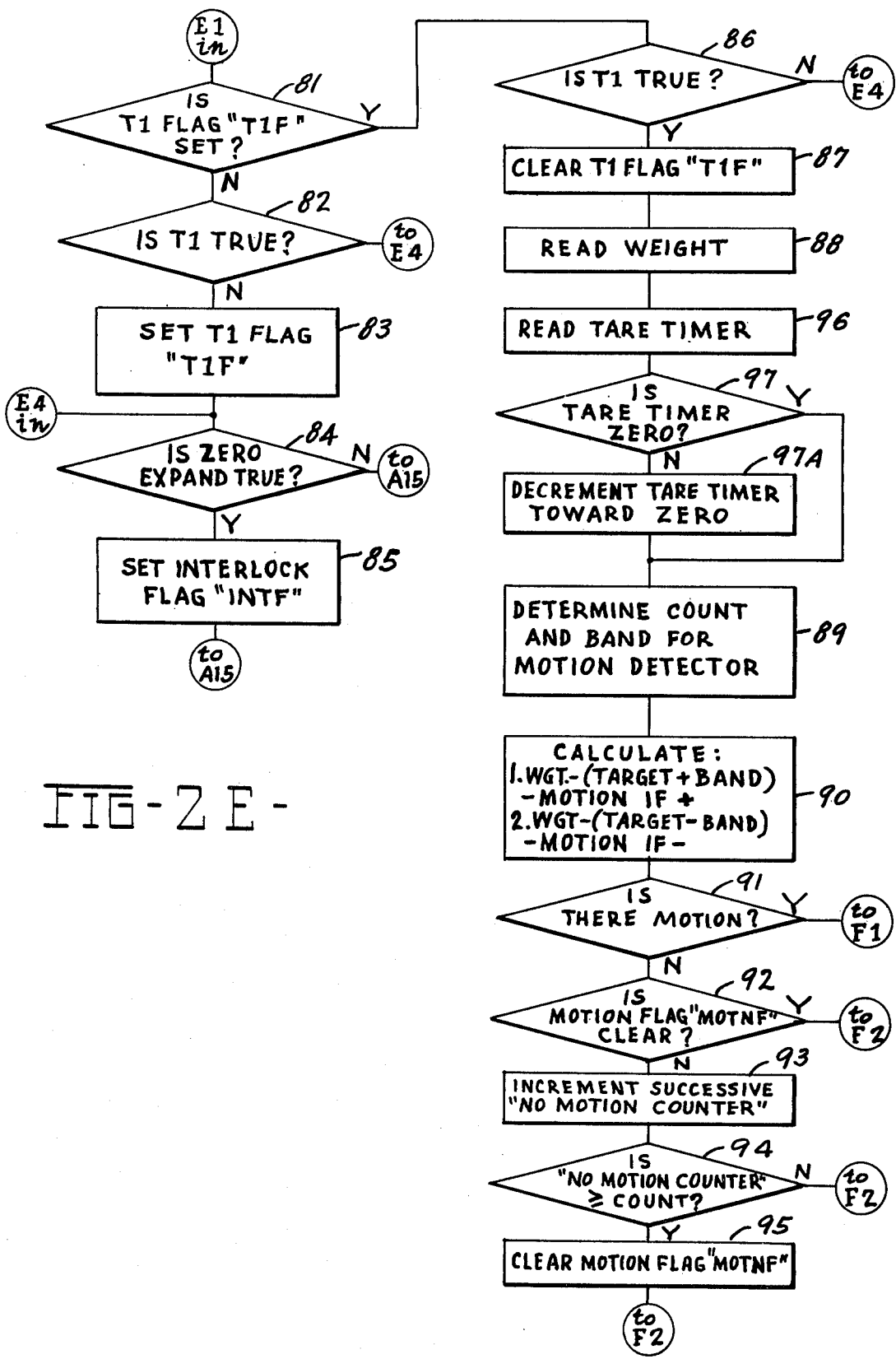
FIG-2E-

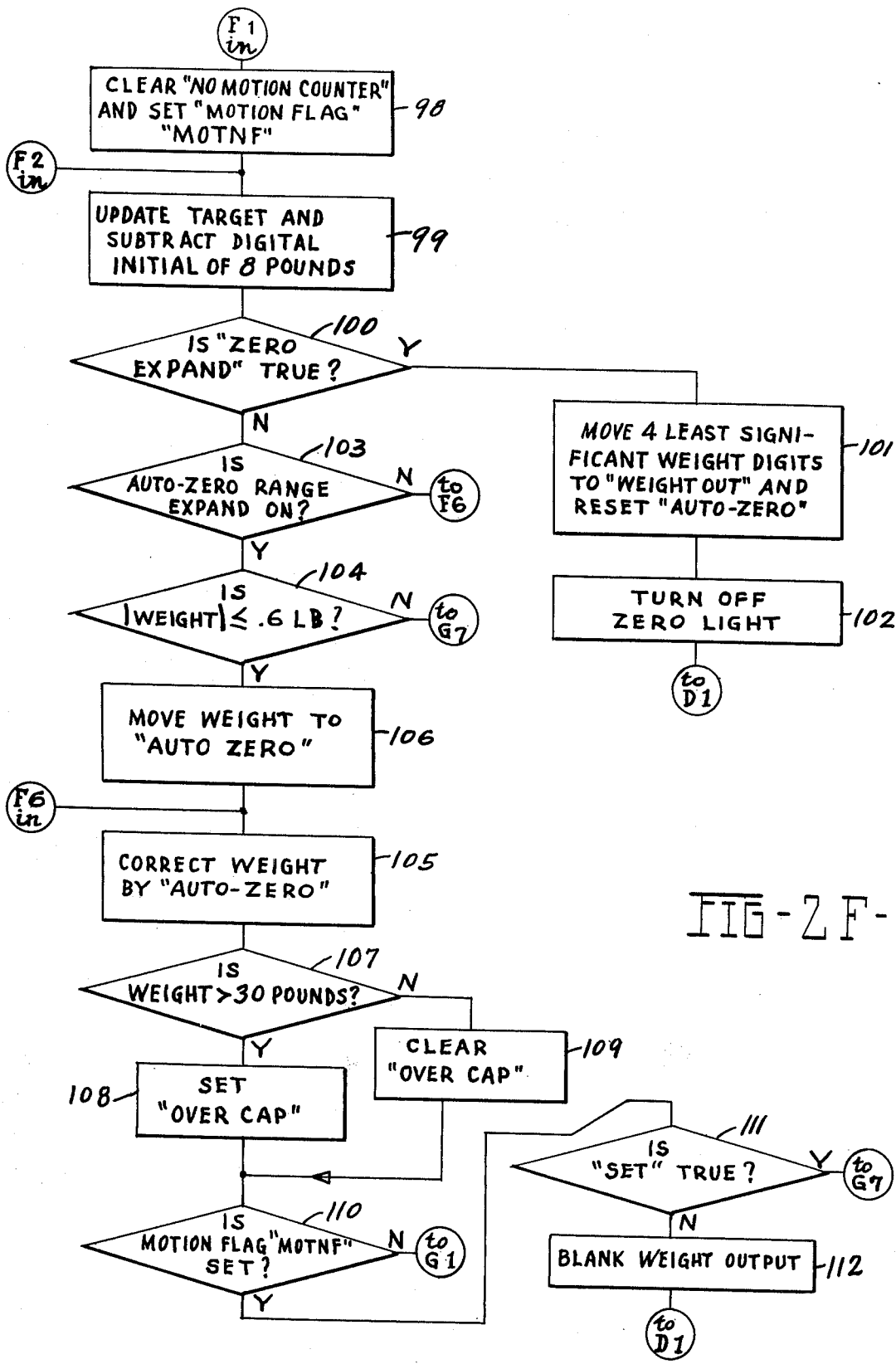
FIG-2F-

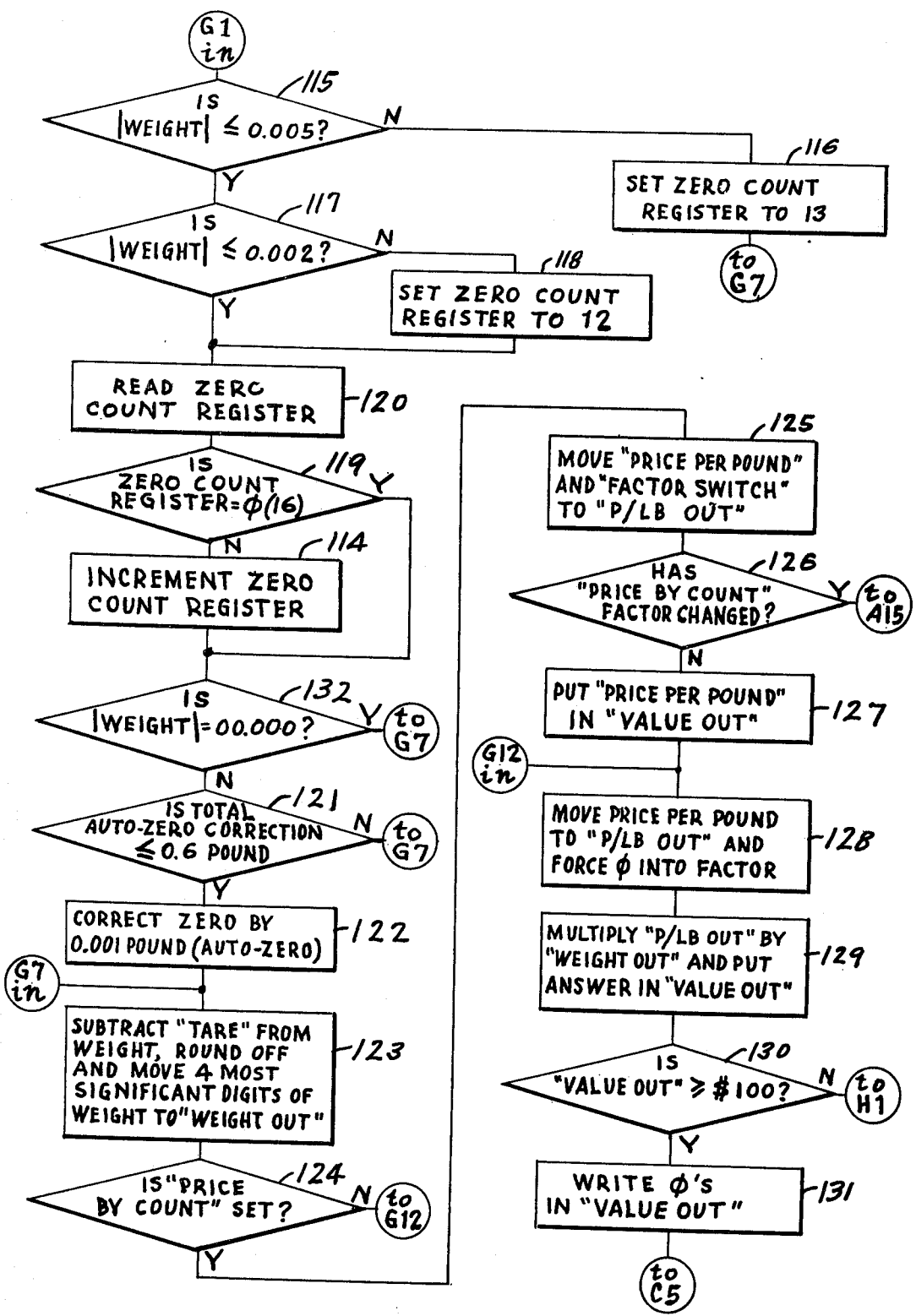
FIG-2G-

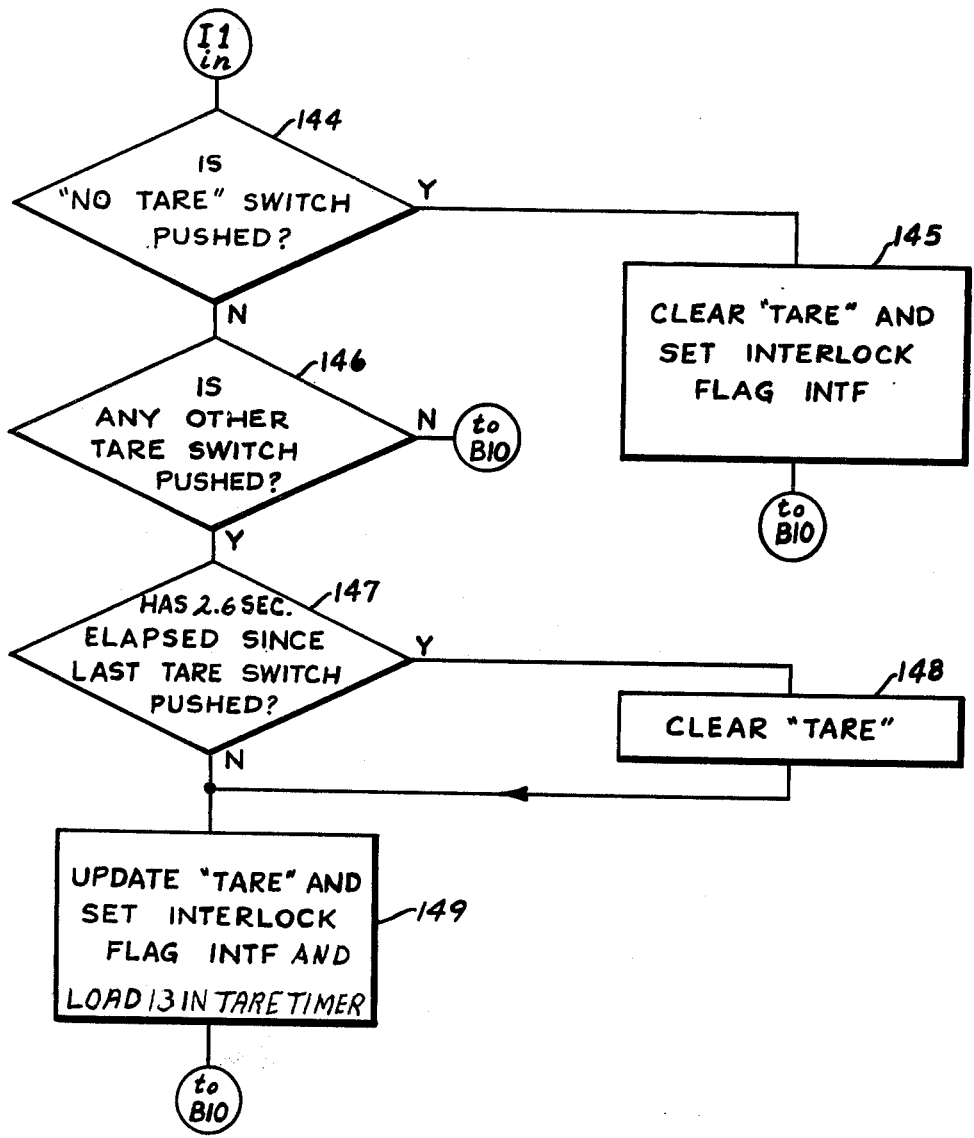
FIG-21-

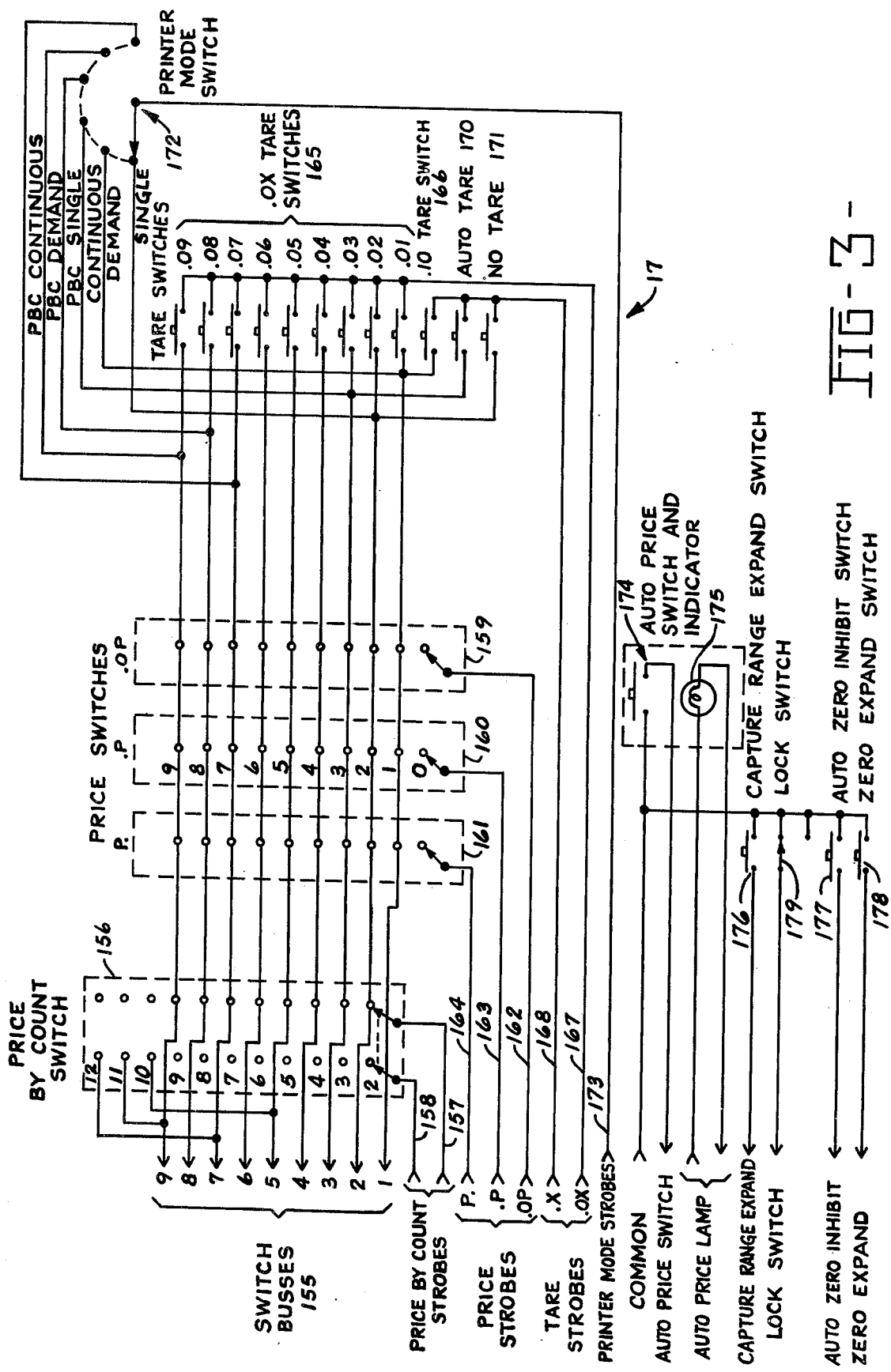

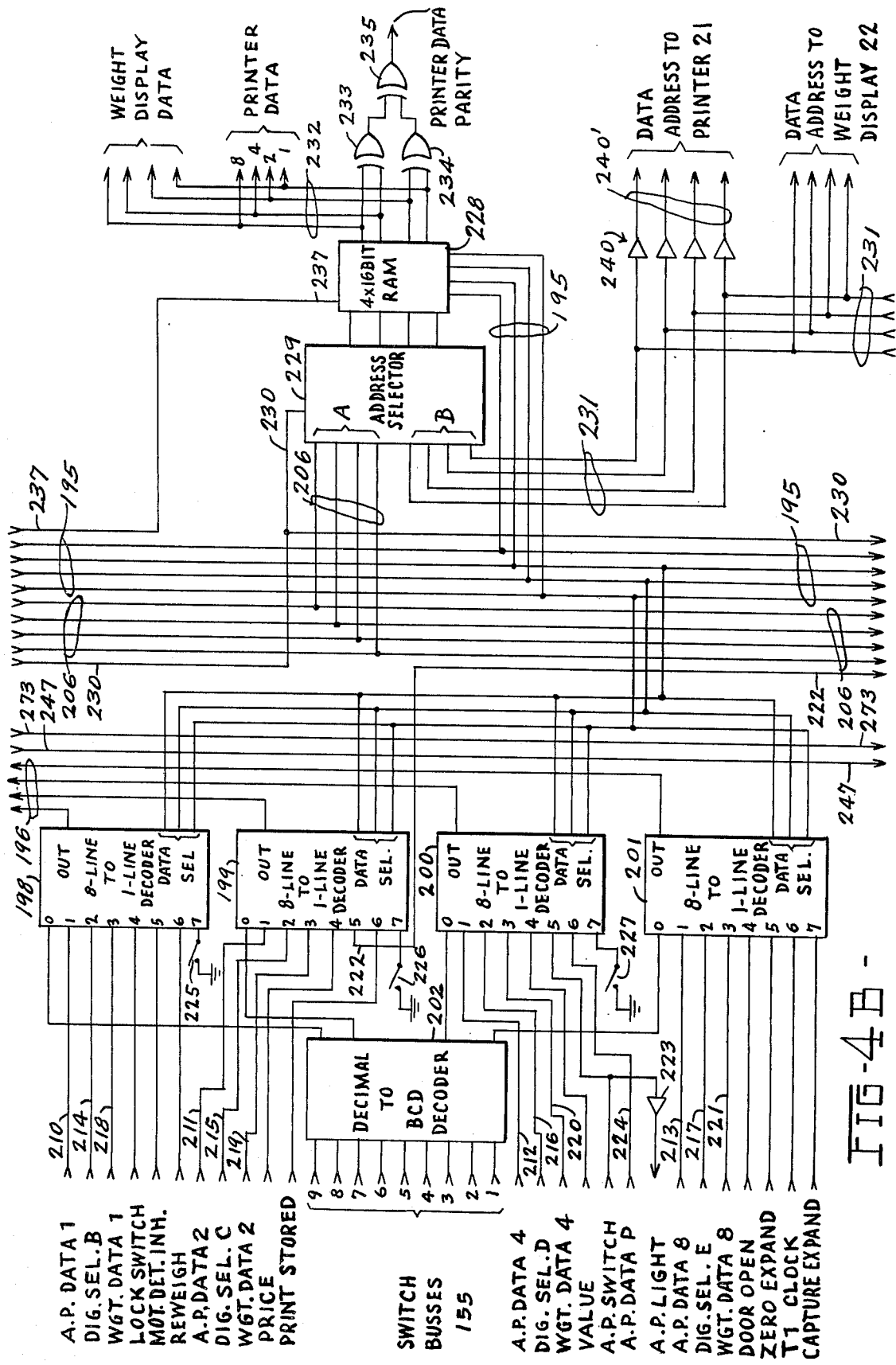

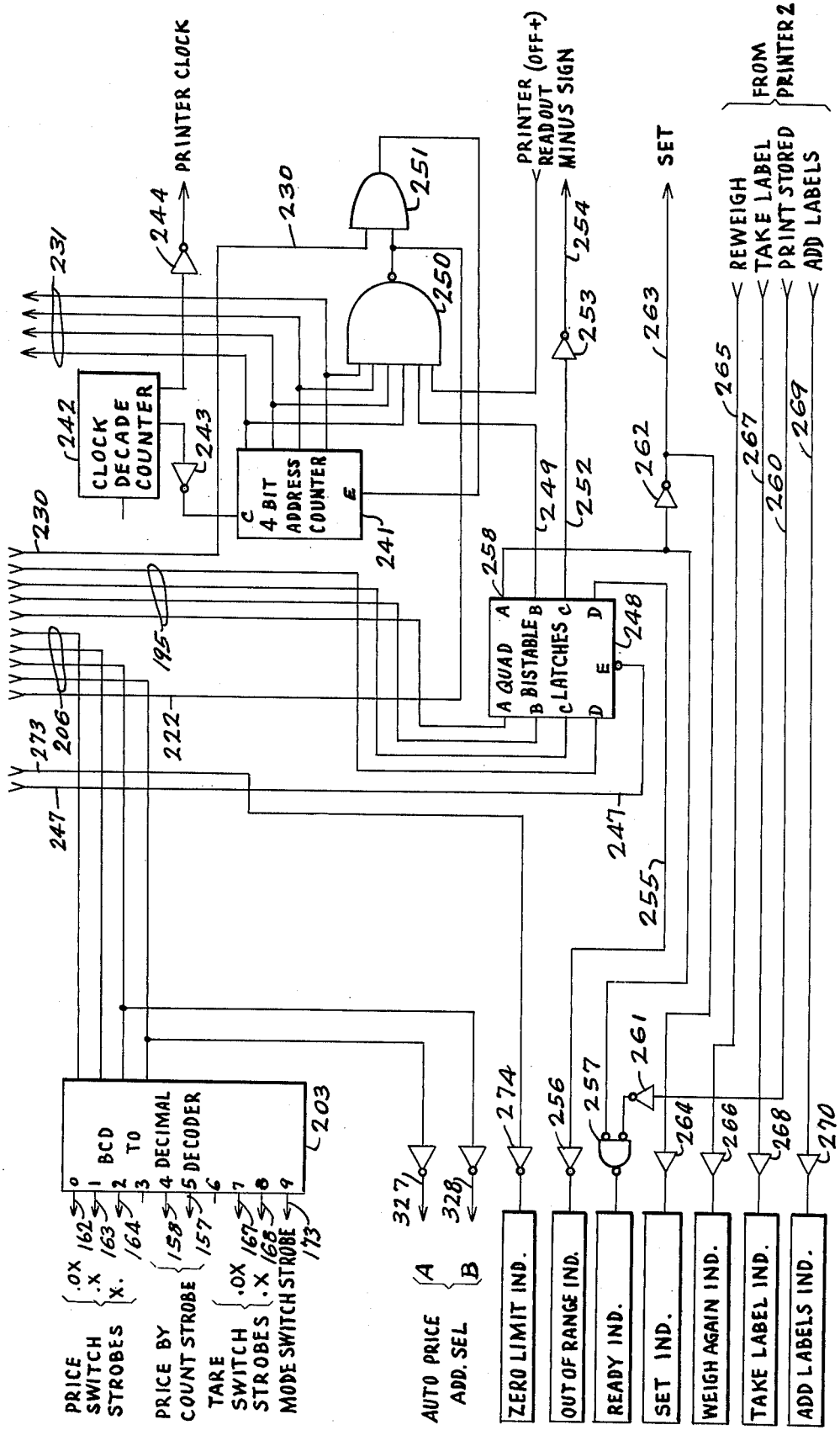

FIG-6-

SCALE WITH MANUAL TARE ENTRY

CROSS-REFERENCE TO RELATED PATENT APPLICATIONS

This is a continuation in part of our copending application converter No. 434,663, filed Jan. 18, 1974.

This application discloses features claimed in and also claims features disclosed in the following copending patent applications: The application of R. C. Loshbough, Ser. No. 573,242, filed Apr. 30, 1975 for "Motion Detecting Scale" which application is a continuation-in-part of a prior filed application, Ser. No. 434,384, filed Jan. 18, 1974; the application of R. C. Loshbough, et al, Ser. No. 573,149, filed Apr. 30, 1975 for "Digital Weight Measuring and Computing Apparatus with Automatic Zero Correction" which application is a continuation-in-part of the prior filed application, Ser. No. 466,303, filed May 2, 1974, which application is in turn a continuation of the prior filed application, Ser. No. 434,400, filed Jan. 18, 1974; the application of R. C. Loshbough, et al, Ser. No. 573,147, filed Apr. 30, 1975 for "Value Computing Scale", which application is a continuation-in-part of the prior filed application, Ser. No. 434,401, filed Jan. 18, 1974; the application of G. D. Robaszkiewicz, Ser. No. 573,141, filed Apr. 30, 1975 for "Apparatus for Insulating Errors in Printed Records", which application is a continuation-in-part of the prior filed application, Ser. No. 434,417, filed Apr. 18, 1974; the application of D. L. Hall, Ser. No. 573,162, filed Apr. 30, 1975, for "Weight Measuring and Indicating Apparatus", which application is a continuation-in-part of the prior application, Ser. No. 434,431 filed January 18, 1974 and the application of G. D. Robaszkiewicz, Ser. No. 573,146, filed Apr. 30, 1975, for "Clear and Restart Arrangement for Digital Measuring Apparatus", which application is a continuation of the prior filed application, Ser. No. 434,840, filed Jan. 18, 1974.

BACKGROUND OF THE INVENTION

This invention relates to weight measuring and value computing apparatus and more particularly to improved apparatus for weighing, computing a value and printing an article label showing the weight, price per unit weight and computed value of in of a plurality of successive articles. The In recent years the demand for increased efficiency has created the need for high speed measuring apparatus capable of automatically weighing successive articles and, for each weighed article, computing a value based upon a predetermined price per unit weight and printing an article label bearing such weight, price per unit weight and computed value. Such measuring apparatus is commonly used, for example, in supermarket meat departments. After a butcher cuts and divides meat into package portions, the meat may be automatically packaged and subsequently labeled by automatic weight measuring, value computing and label printing apparatus.

In the past, apparatus for weighing an article, computing an article value and printing an article label have included a combination of mechanical, optical and electrical elements. A typical prior art system of this type is described in U.S. Pat. No. 3,384,193 which issued on May 21, 1968 to William C. Susor et al and U.S. Pat. No. 3,453,422 which issued on July 1, 1969 to William C. Susor. This system includes a mechanical-optical scale which generates a digital signal corresponding to an article weight. A computer multiplies the measured weight by a price per unit weight, using a partial products method of multiplication, to obtain the article's value. The measured weight data, the price data and the computed value data are then supplied to a printer for producing an article label. the system is provided wtih various interlocks which reduce the chances of printing erroneous labels or multiple labels for a single article. For example, if the price per until weight or the tare weight data are changed, a "lock" switch must be manually pushed to prevent accidental changes in this data. A label cannot be printed if the weight or the computed value exceed the capability of the system. After a label is printed, another interlock prevents printing the next label until printed label is removed from the printer for application to the article. The system also includes a scale motion detector which inhibits printing a label unit the measured weight reaches a steady state.

Prior art weighing and value computing systems generally include means for compensating the measured gross weight for the tare weight of a container holding the article being priced. The tare weight is often entered manually through a plurality of switches. In one prior art embodiment, the tare weight is entered through a plurality of ten positioned rotary switches, with each switch representing a different decade of the tare weight. However, a system of this type may provide inaccurate weight and value data because of the opportunity for failure on the part of the operator to enter the correct tare weight for each article. Once the rotary switches are set to a tare weight, they will remain set until manually changed by the operator. If a series of articles in containers having different tare weights are being weighed and priced, the operator may forget to update the tare weight for each successive article. The net weight and computed value for the article will then be based upon an incorrect tare weight. Various other switch arrangements have also been suggested in the prior art for manually entering tare weight data into a scale system. Many of these systems are subject to human errors on the part of the system operator.

SUMMARY OF THE INVENTION

In accordance with the present invention, electronic apparatus is provided for successively measuring the weight of articles to be labeled, for computing an article value from each measured weight and a price per unit weight supplied to the apparatus, and, for each weighed article, for printing a label bearing the measured weight, the computed value and the price per unit weight used for computing such value. The apparatus is capable of operating at a high speed with a high degree of accuracy in the measured weight and the computed value.

The article weight measurements are made by means of an electronic scale including at least one load cell for producing an analog signal proportional to the article weight and an analog-to-digital converter for converting the analog weight signal into a digital format. The measured article weight is compensated for any tare weight and for scale zero errors and displayed on a digital indicator. Price per unit weight data is entered into the apparatus for use in computing the value of the article. The digital weight data, tare weight data and the price per unit weight data are supplied to an integrated circuit microcomputer which calculates the article value and controls the operating cycle of the entire apparatus.

When applicable, a tare weight is supplied to the apparatus either through a manual keyboard or automatically from the scale for obtaining a net weight which is used in computing the article value. According to the present invention at least some of the tare weight keys on the keyboard are cumulative when the keys are pushed within a predetermined time interval. When the first of the tare weight keys is actuated, the weight represented by the key is stored in a tare weight memory and a timer is started. The timer remains on only for the predetermined time interval. If a second key is actuated while the timer is on, the tare weight represented by the key is added to the tare weight memory and the total weight from the two keys is subtracted from the measured gross article weight to obtain the net article weight. If the timer is not on when a tare key is actuated, only the tare weight represented by the actuated key is stored in tare weight memory. The system also includes provisions for requiring the entry of a new tare weight each time a new article is weighed and priced.

Accordingly, it is one object of the invention to provide improved electronic apparatus for successively measuring the weight of articles to be labeled, for computing a value for each weighed article and for printing a label for each weighed article.

Another object of the invention is to provide improved means for manually entering a tare weight into weight measuring apparatus.

Other objects and advantages of the invention will become apparent from the following detailed description, with reference being made to the accompanying drawings.

BRIEF DESCRIPTION OF THE DRAWINGS

FIG. 1 is a schematic block diagram of apparatus embodying the principles of the present invention for weighing, computing a value and printing a label showing the weight, price per unit weight and computed value of each of a plurality of successive articles;

FIG. 3 is a schematic circuit diagram showing a switch arrangement for entering data into apparatus for weighing, computing a value and printing a label for each of a plurality of successive articles;

FIG. 3A shows a multiplex interface between the analog-to-digital convertor and the microcomputer multiplex input interface.

DESCRIPTION OF AN EXEMPLARY EMBODIMENT

Figure 2A:
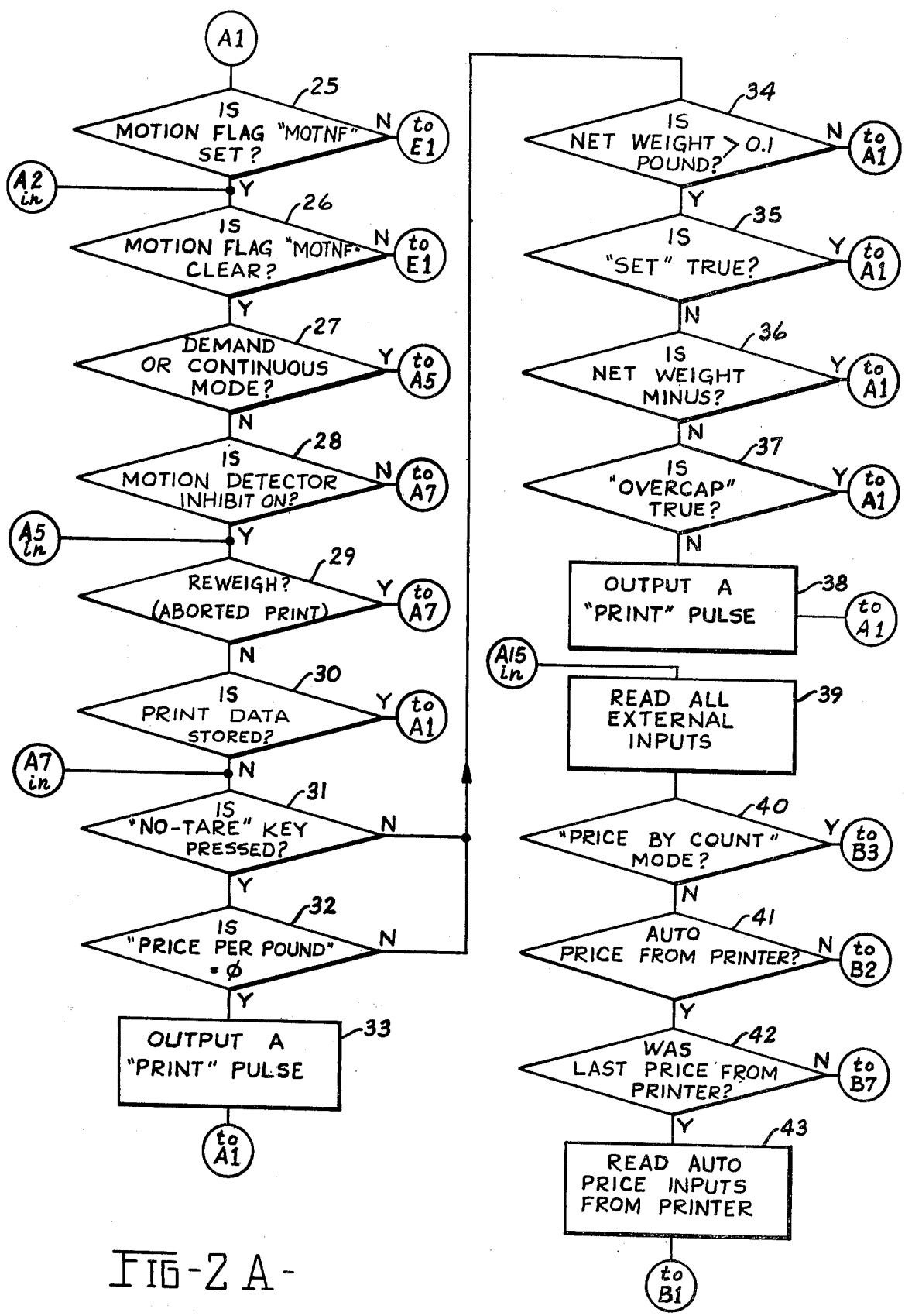
FIG. 2, composed of FIGS. 2A – 2J, shows a flow diagram illustrating the operating sequence of apparatus embodying the principles of the present invention.

Referring now to the drawings and particularly to FIG. 1, a block diagram is shown of apparatus 10 embodying the principles of the present invention for weighing articles and, for each weighed article, for computing a value based upon a predetermined price per unit weight and subsequently printing an article label bearing the weight, the price per unit weight and the computed value for the article. The weight of each article is measured by a scale 11. Although the scale 11 may be of various known designs using mechanics, optics and electronics, it is preferably an electronic scale of the type shown in U.S. Pat. No. 3,709,309 which issued on Jan 9, 1973 to Williams, Jr. et al, and the disclosure of such patent is incorporated herein.

The scale 11 generally comprises a load cell 12 which generates an analog output signal proportional to the weight of an article placed on a platter or weight platform 13. The analog output from the load 12 is applied to an analog-to-digital converter 14 which has a digital output corresponding to the gross weight of the article on the platter 13. The digital weight signal from the converter 14 is preferably in a binary coded decimal (BCD) format which is particularly desirable for use in computing an article value. The binary coded decimal (BCD) format comprises four binary digits for each decimal digit. The weights given to the binary digits are 1, 2, 4, 8 respectively of each decimal digit. The converter 14 may be arranged to provide any desired number of decimal digits, depending upon the maximum weight to be weighed on the scale and also upon an increment represented by the least significant decimal digit. In the exemplary embodiment described herein, as well as in the exemplary embodiment set forth in the above-identified patent to Williams, Jr. et al, it is assumed that five decimal digits will be supplied by the analog-to-digital converter 14.

The above-identified patent to Williams, Jr. et al discloses circuitry for automatically canceling unwanted direct current signals from the direct current or analog signals from the load cell, sensor, transducer, or strain gauge. In addition, this patent discloses circuitry for automatically zeroing the analog portion of the system while the transducer output is momentarily interrupted and for filling in gaps in the analog signal resulting from interruption of the transducer or strain gauge output.

As explained in the above-identified patent to Williams, Jr. et al, it is sometimes desirable to indicate a negative weight from the overall arrangement from the scale load cell through the converter and digital control arrangement. Thus, when the scale has been corrected to read net weight and the container and the commodity are both removed from the platter, the scale should indicate a negative weight equal to the weight of the container which is the tare weight for which the scale has been adjusted. The overall arrangement in accordance with the exemplary embodiment of this invention is accordingly arranged to indicate a negative weight under these circumstances and also under other conditions described herein.

However, the arrangement for making the various analog corrections described in the above-identified patent to Williams, Jr. et al do not prevent the zero output display of the scale from varying or wandering in a random manner.

In accordance with the present invention, the digital output or display from the scale mechanism is further corrected in the manner described herein to correct for the random wandering of the zero display of the scale.

A digital weight signal from the scale 11 is applied to a control unit 15 through interface circuits of FIG. 3A and circuits 24 of FIG. 4B. The control unit 15 includes an input/output buffer and memory 16 which receives the digital weight data through the interface circuits of FIG. 3A and the circuits 24 from the scale 11. Data input switches 17 are also connected to the input/output buffer and memory 16. The data input switches 17 include a manually operated keyboard for entering price data, a printer mode switch and tare weight switches. The input/output buffer and memory 16 functions as an interface with an arithmetic logic unit 18. A sequence controller 19 causes the arithmetic logic unit 18 and data memory or registers 20 to compute the value of each weighed article and to supply such value through the input/output buffer and memory 16 to a printer 21. The arithmetic logic unit 18, the sequence controller 19 and the data registers 20 are preferably included in an integrated circuit microcomputer, as will be discussed in greater detail below.

The value is computed from a price per unit weight which is obtained either from the data input switches 17 or from a commodity plate inserted into the printer 21. The commodity plate automatically supplies price information to the input/output buffer 16 in a manner similar to that described in U.S. Pat. No. 3,459,272, which issued to Susor on Aug. 5, 1969 and the disclosure of such Susor patent is incorporated herein. The commodity plate includes raised type for use in printing the commodity or article name on a label. Price per unit weight information is encoded on the commodity plate by means of the presence or absence of a plurality of holes or notches at predetermined locations. An optical or other suitable type of reader is provided in the printer 21 for sensing the presence or absence of the holes and for converting the price per unit weight information to a BCD output. the weight data from the scale is corrected for any tare weight and zero error by the arithmetic logic unit 18 and supplied to the printer 21 and to a digital weight display 22. After a steady state weight reading is received by the logic unit 15 from the scale 11, the sequence controller 19 causes the arithmetic logic unit 18 to compute an article value. The computed article value, the net article weight and the price unit weight information are used by the printer 21. The sequence controller 19 controls data output to the printer and initiates printing a label.

After a label is printed, the sequence controller 19 will normally inhibit the arithmetic logic unit 18 until the label has been removed from the printer 21 and a motion-no motion cycle has appeared on the scale 11 to indicate that the weighed article has been removed and a new article has been placed on the scale 11. The sequence controller 19 may also inhibit the arithmetic logic unit 18 in the event of the occurrence of various conditions. For example, if the price or tare information is changed, the apparatus 10 is adapted to go into a "lock" condition which prevents printing a label until a "lock" switch is manually actuated to extinguish an indicator light. Such an interlock prevents an accidental change in price or tare weight data, as when an operator accidentally bumps one of the switches 17. Another interlock may be provided to prevent printing a label if data print wheels are not properly set up to the correct value, weight and price data. Still another interlock may prevent printing an erroneous label in the vent that either the maximum weight capacity of the scale 11 or the maximum value capacity has been exceeded.

For convenience, the apparatus 10 is adapted for operating in several different modes. The different modes of operation affect the manner in which the printer 21 prints a label. The data input switches 17 include the mode switch which permits selecting either "single", "demand" or a "continuous" mode of operation for printing labels in which the value is computed for each weighed article. In the single mode of operation, the apparatus 10 must be manually actuated for each label which is printed. In the demand mode of operation, a new label is printed each time a printed label is removed from the printer 21 and the scale 11 has gone through a motion-no motion cycle to cause the computation of a new value. In the continuous mode of operation, the printer 21 will continuously print labels all bearing the same weight, price per unit weight and value. The mode switch may further include "price by count" modes of "single", "demand" and "continuous". In the price by count mode of operation, the printer 21 will print labels bearing a count or factor of the number of pieces in each article or package to be labeled and the total price for this number of pieces. For example, a grocery store may package six oranges or six pears together. If the package price is, for example, six for $1.29, then the label will be printed bearing the legend "$1.29" in the place of the article value and "6/$1.29" in place of the price per unit weight.

In the following description of an exemplary embodiment of the present invention, it is assumed that the automatic zero correction feature will work within a range of −0.005 pounds and +0.005 pounds. However, these limits may obviously be changed to any desired value. In addition, an expanded range switch or button is provided which will allow the zero correcting feature to operate within other weight limits. For example, by operating this expanded range button under certain circumstances, the automatic zero correcting arrangement may be employed to correct in the range from 0.105 pounds and 0.095 pounds. However, the arrangement in accordance with this invention is also arranged to prevent any operation of the zero correcting arrangement if the indication of the weight on the scale platter or pan exceeds 0.6 pounds.

Also, a ready lamp or other indicator is provided which is turned on when indication from the scale is within +0.002 pounds and −0.002 pounds for a predetermined interval of time. The lamp is employed to indicate that the scale is properly corrected and in condition to weigh another object or commodity. The automatic zero wander correction does not stop at 0.002 pounds, but continues on to be corrected to zero accurately. The automatically operated correcting feature operates sufficiently rapid so that correction will all be completed prior to the time the ready lamp is turned on and thus prior to the time an object or commodity to be weighed is placed on the platter or pan to be weighed.

It is obvious that the predetermined limits of −0.002 and +0.002 pounds, +0.005 pounds and −0.005 pounds and the limits of 0.6 and −0.6 pounds have been arbitrarily set or selected and that any other set of suitable limits may be selected and provided by obvious minor changes in the control equipment in accordance with the present invention.

Turning now to FIGS. 2A through 2J, a flow diagram is shown for an exemplary operating sequence of the apparatus 10 for measuring the weight of an article, computing from the measured weight and a price per unit weight the article value and printing an article label. The flow diagram consists of a series of diamonds or rhombuses and rectangles. Each diamond corresponds to a question having either a yes or a no answer which may be obtained by conventional methods. Each rectangular block corresponds to the performance of a specific function such as causing a label to be printed. The numbers placed in the circles to the top and left of the blocks represent input locations. For example, an "A2" in a circle on the left of the flow diagram in FIG. 2A represents an input to the second block from the top in sheet A of FIG. 2. The numbers in the circles to the right of the blocks in the flow diagram represent an output connected to a different location in the flow diagram. For example, the first or uppermost block in FIG. 2A has an output to "E1" if the answer to the question is no. This indicates that if the answer is no, a jump is made to E1 or the input on the first block in sheet E of FIG. 2.

Figure 2H:
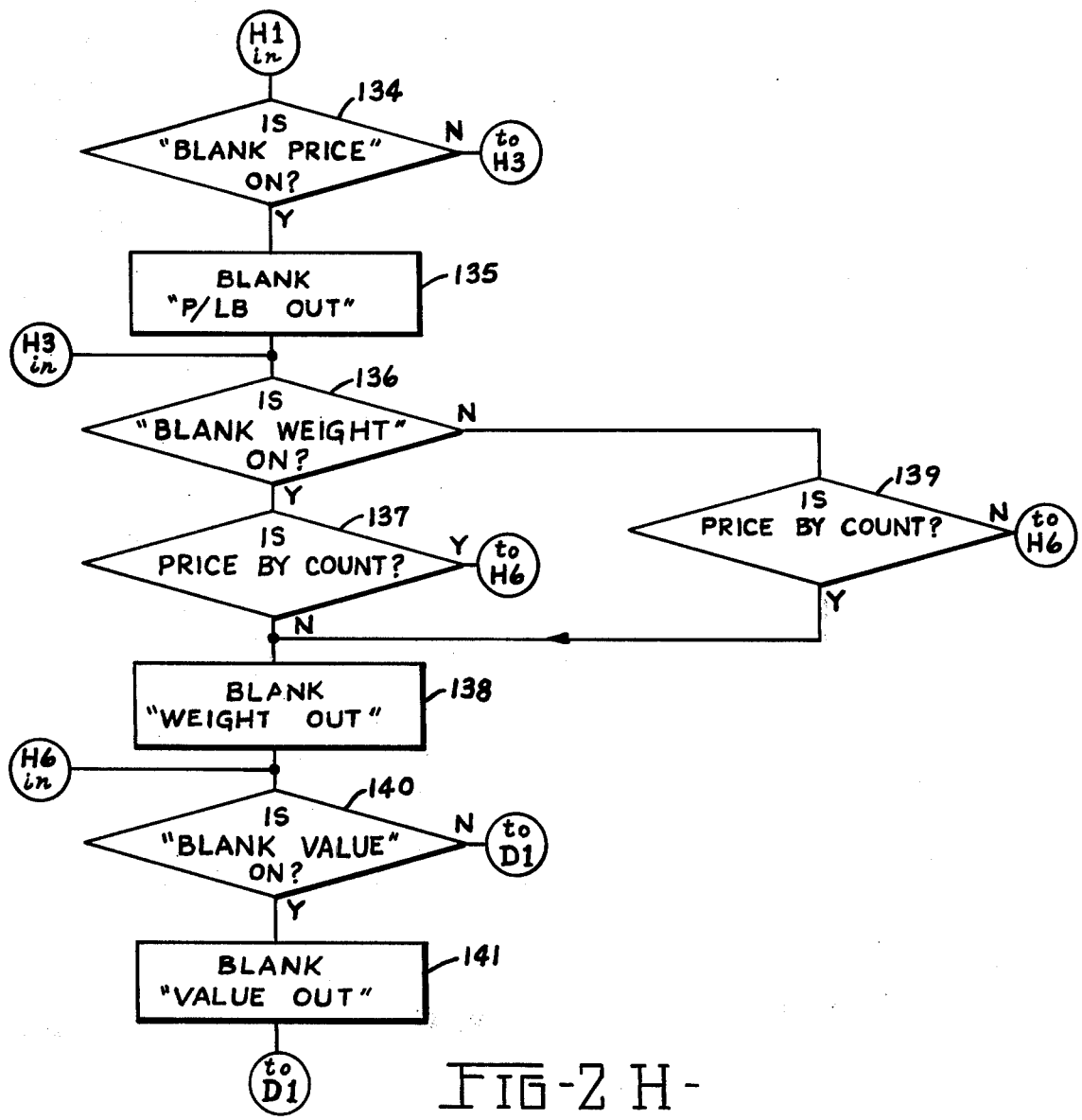
Figure 2J:
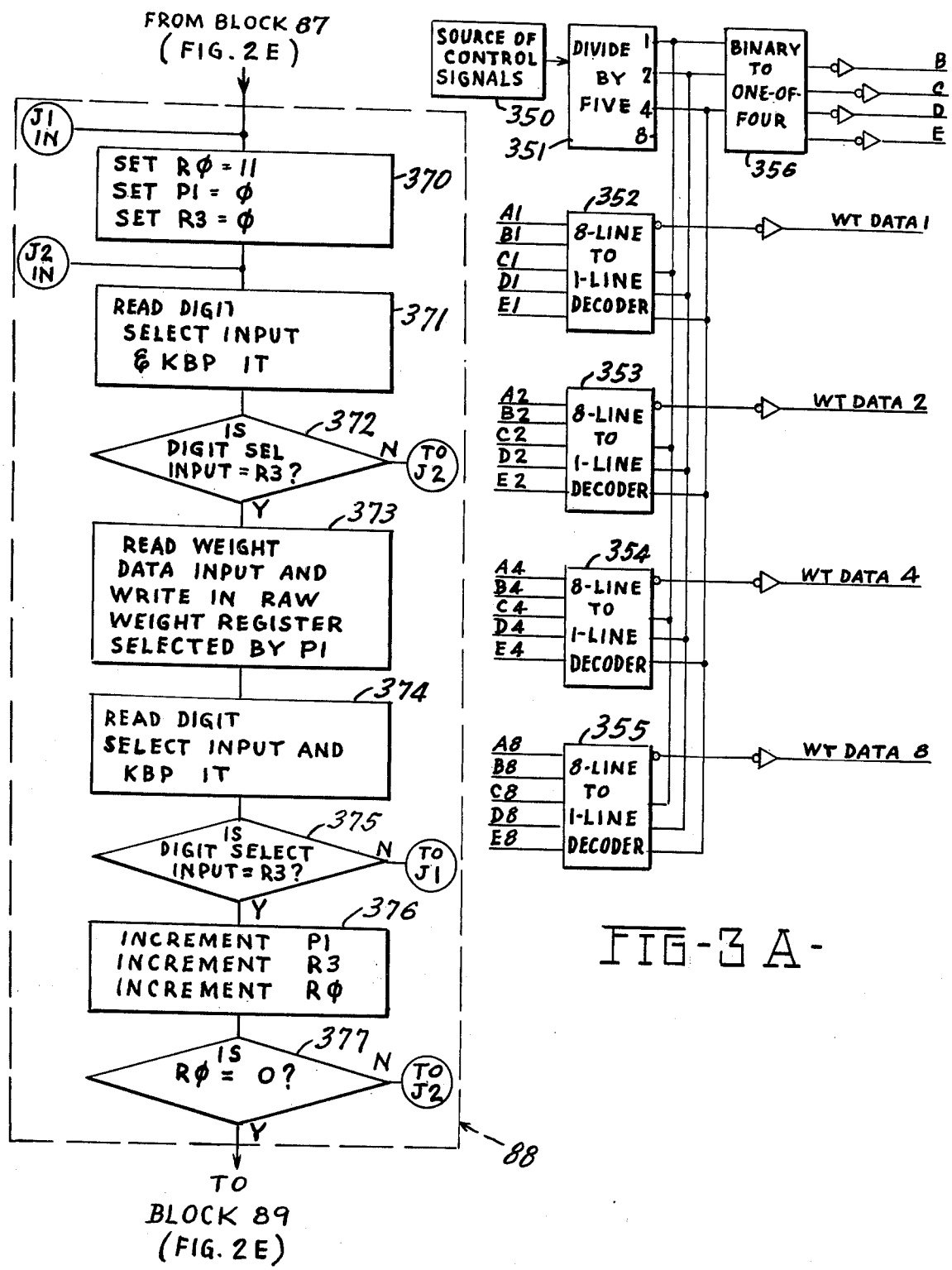

For convenience, FIG. 2 has been separated into parts A through J. Generally speaking, FIG. 2A covers the basic cycling of the apparatus 10. Upon the occurrence of a predetermined sequence of conditions, the cycle is completed with a print pulse. FIG. 2B represents the logic of a check of various interlocks for the occurrence of new data. FIG. 2C shows the sequence of operations for the operation of the lock switch which must be pressed when data is changed and the printer 21 is in the "single" mode of operation. FIG. 2D shows the logic for checking the setting of the service switch which affects the weight display 22 and for checking for the presence of excess weight and excess value. FIG. 2E generally represents the operation of the scale motion detector. FIG. 2F shows the operation of the "expand" switch which permits checking the accuracy of scale zero and of the auto-zero capture range expand switch. FIG. 2G shows the operation of the auto-zero correction circuitry, of the price by count logic and of the value computation. FIG. 2H shows the manner in which the condition of value, price and weight blanking switches are checked and the sequence in which the outputs are actually blanked. FIG. 2I shows the manner in which tare weight is manually entered into the apparatus 10. FIG. 2J shows the sequence of operations for transferring weight signals from the analog-to-digital converter to the microcomputer.

As previously indicated, FIG. 2A shows the basic operating cycle for the apparatus 10. Each new cycle is initiated at the input A1 to a block 25. If motion has been present on the output from the scale 11 during the previous cycle of the apparatus 10, a motion flag MOTNF will be set. The motion flag MOTNF may, for example, consist of a bit stored in a memory or the state of a flip-flop or a latch. If the motion flag MOTNF is not set, the logic jumps to the E1 input while if the motion flag MOTNF is set, the logic proceeds to a block 26. The logic must proceed through the block 26 before a label can be printed Thus, the block 25 requires a motion-no motion cycle before a label is printed. In the block 26, the presence of a motion flag MOTNF is again checked. If the flag is still present, the cycle again turns to the E1 input while if the flag is not present, the logic proceeds to a block 27 which checks to see if the printer is in a demand or continuous mode of operation as set on a mode switch. If the system is operating in a demand or continuous mode, the logic proceeds to the A5 input, while if it is in a single mode, logic proceeds to a block 28.

In the block 28, a check is made on whether or not the printer 21 is set up to inhibit the recognition of a motion-no motion function if a previously printed label has not been removed from the printer. If the motion detector is not inhibited, logic proceeds to A7 while if it is inhibited by the printer 21, a check is made in block 29 on whether or not a new weight measurement is required by the printer 21 due to a lack of verification in the data supplied to the printer 21. If a reweigh is required, the logic proceeds to A7 while if reweigh is not required, a block 30 checks to see if print data is stored in the printer 21. If print data is stored, the system returns to A1 while if print data is not stored, it proceeds to a block 31 which checks on whether or not a "no tare weight" key has been pressed. If the no tare key is pressed, a block 32 checks to see if the price per pound data is equal to zero. If the price per pound data is equal to zero, a block 33 outputs a "print" pulse to the printer 21 for printing a label and the cycle returns to A1. This function is provided to allow printing of labels when the weight is equal to or less than 0.1 pound, for testing.

If either the no tare key is not pressed or the price per pound is not equal to zero, the system proceeds from the blocks 31 or 32, respectively, to a block 34 which checks to see if the net weight from the scale 11 is greater than 0.1 pound. If the net weight is not greater than 0.1 pound, it is assumed that an article is not present on the scale platform 13 and the system returns to A1. If an article greater than one-tenth pound is present on the scale platform 13, a block 35 checks to see if a SET latch or flip-flop is true. If it is true, it indicates that the system interlocks have been broken and the cycle returns to A1. If SET is not true, a block 36 checks to see if the net weight is positive. If the net weight should for any reason be negative, such as when a tare weight is entered into the apparatus 10 and a package or article has not yet been placed upon the scale platform 13, the cycle returns to A1. If the net weight is positive, a block 37 checks to see if an OVERCAP latch or flip-flop is true. OVERCAP is trued when the weight capacity of the apparatus 10 has been exceeded.

For the following description, it will be assumed that the apparatus 10 is capable of measuring up to 30 pounds so that OVERCAP will be true if a weight greater than 30 pounds is placed upon the scale platform 13. If OVERCAP is true, the cycle returns to A1. If the capacity of the apparatus 10 has not been exceeded, a "print" pulse is outputed at a block 38. From block 38 control is returned to A1. When the control is transferred to A15, block 39 cause the system to read all external inputs including the mode switch, the tare weight switches, the price switches, the price by count switches, the auto-price input from the printer and any weight input from the scale 11. After the external inputs are read, a block 40 checks to see if the apparatus 10 is in a "price by count" mode. If the apparatus 10 is in the price by count mode, logic proceeds to B3 while if it is not in this mode, a block 41 checks to see if auto-price data has been received from the printer 21. As previously indicated, the auto-price data may be supplied from a commodity plate inserted into the printer 21. If auto-price data is received from the printer 21, a block 42 checks to see if the price data during the last cycle was also auto-price data received from the printer 21. If not, the system proceeds to B7. If the last price was also from the printer, a block 43 reads and stores the auto-price data inputs from the printer 21. The system then proceeds to B1.

Turning now to FIG. 2B, the logic is shown for checking the various interlocks. From the input B1, a block 46 checks for correct parity in auto-price data received from the printer. If there is a parity error, the logic proceeds to B7. If there is no parity error, the logic proceeds to a block 47. If the printer 21 is operating in a manual mode, the diagram in FIG. 2B is entered through B2, wherein a block 48 checks on whether or not the last cycle was also in the manual mode. If not, the cycle proceeds to B7 while if the last cycle was also manual, the logic also proceeds to the block 47. The block 47 checks on whether or not the price data input has changed. If no change has occurred, a block 49 checks an interlock on the printer door. If the printer door is open, the logic proceeds to B7 while if it is not open, a check is made by a block 50 on whether or not an auto-zero inhibit signal is received from the printer 21. If no inhibit signal is received, the cycle proceeds to B8.

Returning to the block 47, if the price input data has changed, at a block 51 the new price input data is moved to a price per pound output memory, hereinafter referred to as "P/LB OUT". The cycle then proceeds to a block 52 and an interlock flag INTF is set. The cycle also proceeds to the block 52 from the block 50 if an auto-zero inhibit is received from the printer 21. The interlock flag INTF may consist of the setting of a latch or a flip-flop or a bit stored in a memory. The presence of the flag indicates the occurrence of an interlock such as a change in the printer mode, the opening of the printer door or the presence of an auto-zero inhibit signal. After the interlock flag INTF is set at the block 52, a block 53 checks to see if an "auto-tare" switch has been actuated. If not, the logic proceeds to I1 for manually entering a tare weight. If the auto-tare switch has been pushed, a block 54 updates the tare weight by storing the current measured weight in a TARE memory and again sets the interlock flag INTF. A block 55 then checks to see if the print mode has changed. If not, the logic proceeds to B12 while if the mode has changed, a block 56 updates a "print mode out" signal which indicates when the printer 21 is in the demand or continuous modes of operation. A check is then made at a block 57 to see if the interlock flag INTF is set. If not, the logic jumps to C1. If the interlock flag INTF was set, a block 58 clears the interlock flag INTF and sets an "initialize" flag INITF. Thus, the initialize flag INITF is set whenever either the price input or the tare weight input has changed. This flag inhibits the printing of a label until the lock switch is manually actuated, thus preventing an erroneous change in the tare weight or price data. After the initialize flag INITF is set, a block 59 trues the SET latch to indicate that the interlocks have been broken and the system proceeds to C5.

FIG. 2C shows logic relating to operation of the lock switch which must be actuated when the initialize flag INITF is set. A block 62 checks to see if the initialize flat INITF is set. If not, the cycle jumps to C5. If the initialize flag INIFT is set, a block 63 checks to see if the mode switch is in the demand or continuous mode. If the mode switch is in either of these modes, the cycle again proceeds to C5. If not, a block 64 checks to see if the lock switch is pressed. If not, the cycle proceeds to C5. If the lock switch is pressed, a block 65 clears the initialize flag INITF and clears the SET latch and continues with the C5 input to a block 66. The block 66 returns the cycle back to either A1 or A2, whichever was the original point of origin for arriving to the block 66.

The logic of FIG. 2D checks the setting of a service switch which permits isolating price and value errors in printed labels between the printer and the logic unit which calculates and stores this data, and also checks for the presence of either an excessive weight or an excessive value which may cause an error in the output from the apparatus 10. From the D1 input, a block 69 checks to see if the service switch is in a "display price" position. If so, a block 70 transfers the price data stored in the P/LB OUT memory into a WEIGHT OUT memory wherein such price data is displayed on the digital weight display 22. If the service switch was not in the "display price" position, a block 71 checks to see if the service switch is in the "display value" position. If not, the cycle proceeds to D3 while if it is in this position, the cycle proceeds to a block 72 which causes a transfer of value data stored in a VALUE OUT memory into the WEIGHT OUT memory for displaying the value data on the digital weight display 22. Thus, if an error is present in the price shown on the printed label and the service switch is in the display price position, a comparison may readily be made between the price appearing on the digital weight display 22 and the price appearing on the printed label. If these prices are not identical, the serviceman will know that the error is due to a fault in the printer 21. If the data is identical, the serviceman will know that the error is caused in the logic unit 15. A similar check may be made on the computed value.

The D3 input as well as the outputs from the blocks 70 and 72 are applied to a block 73 which turns on a "ZERO" light. The ZERO light indicates that the scale is properly zeroed to within ¼ of the least significant displayed weight digit. A block 74 then outputs all data and the printer mode to the printer 21. Subsequently, a block 75 checks to see if the maximum value capacity of the apparatus 10 has been exceeded. If the maximum value has been exceeded, a block 76 will set an OVERVALUE latch or flip-flop or store a bit in a memory location. After the block 76 has set OVERVALUE or if the logic jumped to D7 because the maximum value capacity was not exceeded, a block 77 checks to see if the maximum weight capacity of the scale 11 has been exceeded. If not, the cycle will proceed to C5 where it is returned to either A1 or A2. If the maximum capacity of the scale 11 has been exceeded, a block 78 sets an OVERCAP latch or flip-flop or stores a bit in a memory location and an OVERCAPACITY flip-flop or latch is set to turn on an indicator light. The cycle then returns through C5 to either A1 or A2.

In FIG. 2E, a check is made to see if weight data read from the scale 11 is legitimate, i.e., no analog-to-digital conversion is occurring in the converter 14. If not, a check is made on whether or not a zero expand switch is actuated. If weight data is legitimate, a motion check is made to see if the data has been consistent or steady for a predetermined number of cycles.

From an input E1, a block 81 checks to see if a T1 flag is set. The T1 flag is set whenever new weight data has been read from the scale 11 into the logic unit 15. If the T1 flag is not set, a block 82 checks to see if a clock signal T1 is true. A true T1 represents a time interval during which weight data is not permitted to change. The apparatus 10 may, for example, operate on a 200 millisecond cycle. T1 may be set true for an arbitrary time interval, such as true for 60 milliseconds out of each cycle and false for the remaining 140 milliseconds. If T1 is true, logic proceeds from the block 82 to E4, while if T1 is not true a block 83 sets the T1 flag and the logic proceeds to E4. At E4, a block 84 checks to see if a "zero expand" switch is actuated. If not, the logic returns to A15 while if the zero expand switch is actuated, a block 85 sets the interlock flag INTF and the logic returns to A15. The zero expand switch is used for checking the accuracy and adjusting the weight zero when no weight is present on the platform 13 on the scale 11. When the zero expand switch is closed, the weight displayed on the digital weight display 22 is shifted by one decimal point. Thus, if the scale normally has a maximum reading of 30.00 pounds, the displayed weight will be shifted over to display X.XXX pounds or to display as low as 1/1000th of a pound.

If the T1 flat T1F is set when the logic reaches the block 81, a block 86 checks to see if T1 is true. If not, the logic returns to E4. If T1 is true, a block 87 clears the T1 flag T1F. A block 88 then causes a weight reading to be entered into the logic unit 15. Next block 96 causes the tare timer state to be read out from the tare timer storage space in the RAM 187. Then in accordance with block 97, if the count in the tare timer is not zero it is reduced by one as indicated in block 97A and the control advances to block 89. If the count recorded in the tare timer is zero the control advances directly to block 89. After the weight is read out and the tare timer decremented if required as described above, block 89 checks the memory of switches for the setting of the motion detector count and the motion detector band. The motion detector count is the number of cycles or repetitions which might occur with no motion present before a label is printed. For example, switches may be set to establish that the apparatus 10 must cycle without motion at least twice or at least three times before a label can be printed. The band is the amount of permissible change during a no motion condition. For example, it may be determined that it is desirable to have a weight reading maintained without plus or minus 0.005 pound for a no motion condition. This results in a range of 0.01 pound for the motion detector regardless of the measured weight. This arrangement eliminates prior art problems in obtaining a uniform motion detector sensitivity for all weight measurements. The prior art optical motion detectors have not had a uniform sensitivity. After the count and band for the motion detector are determined, a block 90 calculates the weight minus the sum of the target plus the band. If this value is positive, then motion is present. The block 90 also determines the weight minus the sum of the target minus the band. If this sum is negative, then motion also is present. The target is taken to be the last weight reading.

If the block 90 calculates that there is motion, then a block 91 transfers the logic to F1 while if motion is not present, a block 92 checks to see if a motion flag MOTNF was set during the last cycle of the apparatus 10. If the motion flag is clear, logic proceeds to F2 while if a motion flag is present, a block 93 increments by one a no motion counter. After the counter is incremented, a block 94 compares the total count with the no motion count determined at the block 89. If the contents of the counter is not equal to or greater than this count, the cycle proceeds to F2 while if it is greater than or equal to the count, the motion flag MOTNF is cleared at a block 95. The cycle then proceeds to F2.

In FIG. 2F, sequence of operations is shown for the operating sequence of the zero expand, the auto-zero capture range expand and the weight overcapacity check. The F1 input, which is entered if motion is present, is applied to a block 98 which clears the no motion counter and sets the motion flat MOTNF. After the flag is set, a block 99 updates the target and subtracts a digital weight of 8 pounds. The output from the load cell 12 and the scale 11 preferably is always positive since it is in a digital format. Some types of analog-to-digital converters 14, such as a dual slope integrating converter, are more accurate if used in a range wherein they only have a positive output. This may be accomplished by offsetting the output from the scale 11 to fall within the range of from 8 pounds to 38 pounds. Thus, the zero is arbitrarily offset by 8 pounds. The block 99 subtracts an initial weight of 8 pounds from the scale reading to zero the weight signal when no weight is present on the platter 13. After the 8 pounds is subtracted, a block 100 checks to see whether or not the zero expand switch is actuated or true. If the zero switch is actuated, a block 101 moves the four least significant digits of the measured weight, or the digits X.XXX pounds, to the WEIGHT OUT memory and clears an AUTO-ZERO correction counter. Thus, the digital weight display 22 will now show the true zero weight setting of the apparatus 10 to within one-tenth of a normal weight graduation. Since the auto-zero operation is inhibited, a block 102 turns off the ZERO light and logic jumps to D1.

If the zero expand switch is not closed, sequence proceeds from the block 100 to a block 103 which checks to see if an "auto-zero capture range expand" switch is closed. If not, sequence proceeds to F6. Normally, the weight reading used by the apparatus 10 for calculating a value is automatically zeroed if the weight from the scale 11 is less than 0.005 pound when no weight is present on the platter 13. However, when the auto-zero capture range expand switch is closed, a block 104 will check to determine if the weight recorded in the raw weight register is equal to or less than 0.6 pound.

If the weight reading is greater than 0.6 pound, the sequence jumps to G7. If it is less, block 106 causes this weight, up to 0.6 pound, to be recorded in the zero error correction register in the AUTO-ZERO register. The weight is then corrected at a block 105 by the contents of the AUTO-ZERO register and moved to the WEIGHT OUT memory.

After the zero is corrected, a check is made to see if the maximum weight capacity of the apparatus 10 has been exceeded. Such maximum capacity has arbitrarily been set at 30 pounds which is generally sufficient for apparatus of the type described when used in the meat department of a grocery store. A block 107 checks to see if the corrected weight stored in the WEIGHT OUT memory is greater than 30 pounds. If it is, a block 108 sets an OVERCAP latch, flip-flop or similar memory device. If the maximum weight is not exceeded, a block 109 clears OVERCAP. Blocks 108 and 109 are connected to a block 110 which checks to see if a motion flag MOTNF is present. If not, logic proceeds to G1, while if motion is present, a block 111 checks to see if SET is true. If SET is true, the logic proceeds to G7 while if it is not true, a block 112 blanks the weight output and the logic proceeds to D1.

FIG. 2G shows the sequence of operations of the auto-zero correction circuitry, of the price by count mode of operation and of the value computation if a mode other than price by count is selected. A correction is automatically made to errors in the scale zero when the absolute value of the previously corrected weight is less than 0.005 pound. A total correction may be made up to 0.6 pound increments, or in other suitable incremental values. Furthermore, gross zero corrections of up to 0.6 pound may be made by use of the zero capture range expand switch which stores correction weight up to 0.6 pound to be stored in an AUTO-ZERO memory.

The G1 input to a block 115 is compared to see if the absolute value of the corrected weight is less than or equal to 0.005 pound. If not, a block 116 clears the ¼ graduation flag to turn off a light which indicates that the weight reading used by the logic unit 15 for computing a value is within ¼ of one graduation displayed on the digital weight display 22. From the block 116, sequence of operations proceeds to G7, skipping any changes in the contents of correction factors stored in an AUTO-ZERO correction register. If the absolute value of the corrected weight is less than or equal to 0.005 pound, a block 117 checks to see if the absolute weight is less than or equal to 0.002 pound. If not, a block 118 sets the zero count register to 12 which in turn causes the ¼ graduation indicator light to be turned off later in the cycle.

If the absolute value of the corrected weight is less than 0.002 pound, a block 120 indicates that the count stored in the zero count register is read out of this register but also remains stored in this register. In accordance with block 119, the zero count register is checked to determine if zero is recorded in this register. If the count is zero, block 132 checks the weight to determine if the weight is zero. If it is, the sequence jumps to G7. If the weight is not zero, the sequence continues to block 121. If the count in the zero count register is not zero, block 114 indicates that the count in this register is incremented by one. Thereafter, the sequence goes to block 132 and then as described.

After the ¼ graduation flag is set at the block 120, or after the logic has jumped to G5, a block 121 checks to see if the total auto-zero correction factor stored in the AUTO-ZERO register is less than or equal to 0.6 pound, the maximum permissible correction factor. If the correction factor is greater than or equal to 0.6 pound, no change is made in the correction factor and the logic jumps to G7, while if it is less than 0.6 pound the factor stored in AUTO-ZERO is modified by 0.001 pound at a block 122. After the sequence of operations jumps to G7 or after the AUTO-ZERO correction factor is modified in the block 122, a block 123 causes the tare weight stored in the TARE memory to be subtracted from the corrected scale weight and the four most significant weight digits are moved to WEIGHT OUT. Thus, it will be apparent that an auto-zero correction is made regardless of the fact that a tare weight may have previously been entered into the apparatus 10.

After weight data is stored in WEIGHT OUT, a block 124 checks to see if the printer mode switch has been set to a price by count mode of operation. If not, the logic jumps to G12 and subsequently a value is computed. If the apparatus 10 is in a price by count mode, a block 125 causes a factor or count received from the price by count switch to be stored in the P/LB OUT memory for supplying to the printer. A block 126 then checks to see if the price by count factor has changed from the last cycle of the apparatus 10. If a change has occurred, a jump is made to A15 and all external inputs are again read. If no change has occurred, a block 127 causes the price per pound data entered through the price switches to be stored in the VALUE OUT memory. If the logic has jumped to G12 and price per pound data from the switches or from the printer is present, the price per pound data is moved to the P/LB OUT memory location at a block 128 and zeros are forced into a register which stores the price by count factor read from the input switches 17. A block 129 then computes a value by multiplying the contents of the P/LB OUT memory by the contents of the WEIGHT OUT memory and stores the answer in the VALUE OUT memory. After the value is computed and stored, a block 130 compares this value with $100, the maximum value capacity of the apparatus 10. This maximum value has been arbitrarily selected to limit the number of print wheels required by the printer since measuring apparatus of this type, when used for labelling meat in the meat department of a grocery store, will normally not be required to exceed $100. If the computed value is greater than $100, a block 131 writes zeros in the VALUE OUT memory and the logic jumps to C5 while if the maximum permissible value has not been exceeded, the logic jumps to H1.

In some instances, an operator of the apparatus 10 may wish to print a label which does not include all three of the price, the weight and the value. The weight, for example, is blanked whenever the apparatus 10 is operating in a price by count mode. Or, it may be desired to print a label bearing only the weight. This may be desirable in a wholesale operation where the wholesale purchaser will reprice the article for retail sales. Therefore, the apparatus 10 may be provided with manual switches which permit selectively blanking the price, the weight and the value from the printed label. The logic for performing these functions is shown in FIG. 2H.

The H1 input is connected to a block 134 which checks to see if a "blank price" switch has been actuated. If the switch is actuated, a block 135 causes blanks or numbers which index the print wheels to blank spaces to be stored in the P/LB OUT memory location. If the blank price switch it not actuated, or after blanks have been stored in the P/LB OUT memory, a block 136 checks to see if a "blank weight" switch has been actuated. If the blank weight switch is actuated, a block 137 checks to see if the apparatus 10 is operating in a price by count mode. If the apparatus 10 is in the price by count mode, the weight will already have been blanked and logic jumps to H6 while if it is not in the price by count mode, a block 138 blanks the WEIGHT OUT memory. If the blank weight switch was not actuated, a block 139 checks to see if the scale is in the price by count mode. If not, logic jumps to H6 while if it is in this mode, the block 138 will blank the WEIGHT OUT memory. If the WEIGHT OUT memory has been blanked or the logic has jumped to H6, a block 140 checks to see if a "blank value" switch has been actuated and, if not, the logic jumps to D1 while if it is actuated, a block 141 blanks the VALUE OUT memory and the logic then jumps to D1.

FIG. 2I shows the manner in which the tare weight is manually entered into the apparatus 10. The tare weight, which is stored in the TARE memory, is subtracted from the measured gross article weight for obtaining a net weight used in computing a value. A check is made at a block 144 to see if a "no tare" switch has been pushed. If the no tare switch is pushed, the TARE memory is cleared and the interlock flag INTF is set at a block 145 and the logic then jumps to B10. If the no tare switch was not pushed when the logic was at the block 144, a block 146 checks to see if any other tare switch is pushed. If not, the logic jumps to B10 while if a tare switch is pushed, the block 147 checks to see if a 3 second time interval has elapsed since the last tare switch was pushed. If 3 seconds has elapsed, a block 148 clears the TARE memory and, subsequently, the tare weight is represented by the pushed tare switch is stored in the TARE memory and the interlock flag INTF is set. If the 3 second interval has not elapsed when the block 147 is reached, the contents of the TARE memory are updated by adding the tare value represented by the pushed tare switch to the contents of the TARE memory. Thus, the tare weight stored in the TARE memory will then represent the accumulation of tare weights from two tare switches. For example, an operator may push a 0.10 pound tare switch and a 0.06 pound tare switch within a 3 second time interval and the total tare weight stored in the TARE memory will equal 0.16 pound. From the block 149, the logic returns to B10. The 3 second time interval was selected on the basis that most people can select and push two switches in this interval. Of course, a different time interval may be used.

FIG. 2J shows an exemplary sub-routine or sequence of operations for causing weight signals received from the analog-to-digital converter to be entered in the weight registers of the microprocessor employed in the present invention. The sub-routine or sequence of operations shown in FIG. 2J are represented in FIG. 2E by block 88.

The remaining drawings show details of logic and circuitry of an exemplary embodiment of the invention for performing the functions described in the description of FIG. 2. Turning first to FIG. 3, the input switches 17 including the price, printer mode and tare weight data input switches are shown in detail. Price by count data, price per unit weight data, tare weight data and printer mode data is all supplied to the input/output buffer and memory 16 in the control unit 15 on nine switch buses 155 which represent the digits 1 through 9. It will be apparent that no bus is needed for a zero entry which corresponds to the absence of a signal on any of the nine buses 155. When the apparatus 10 is operated in a price by count mode, a count or factor is entered through a price by count switch 156. The price by count switch 156 is as a two-wafer or two-pole rotary switch having eleven contacts for selectively entering a count 2 through a count 12. It will be appreciated that a count of 1 would not normally be used nor is there normally a need for a count greater than 12, although this may be accomplished by providing additional contacts on the switch 156. A count of 2 through a count of 9 is entered into the control unit 15 by setting the switch 156 and strobing or grounding a strobe line 157 while a count of 10, 11 or 12 is entered by setting the switch 156 and strobing a strobe line 158. When the price by count switch 156 is set to a factor between 2 and 9, a signal on the strobe line 157 causes an appropriate output on one of the nine switch buses 155. Similarly, when a signal is applied on the strobe line 158 and the price by count switch 156 is set to a factor of 10, 11 or 12, a signal will also appear on one of the switch buses 155.

The apparatus 10 is designed for calculating an article value from price per unit weight data having three significant digits or from $0.01 up to $9.99 per pound. The price per unit weight data is manually entered through three switches 159–161. Each of the price switches 159–161 is a 10-contact rotary switch. A contact representing zero is not connected while contacts on the switches representing the digits 1 through 9 are connected to corresponding ones of the 9 switch bases 155. The switch 159 is used for entering pennies, or the least significant digit of the price data. A strobe line 162 is connected for providing a signal on the common terminal of the penny switch 159. When a signal is applied on the strobe line 162, the penny price data is entered on the connected one of the switch buses 155. The switch 160 is provided for entering dimes price data when a signal is received on a dime strobe line 163. Similarly, the switch 161 is connected for supplying dollar price data when a signal is received on a strobe line 164. Thus, price data up to a maximum of $9.99 per pound may be entered through the three price switches 159–161. Of course, it will be apparent that the number of price switches may be varied to meet other requirements for the apparatus 10 and the monetary units represented by the price switches may be changed to the local currency where the apparatus 10 is used.

Tare weight is entered into the logic unit 15 by means of nine momentary contact tare switches 165 which enter tare weight in 1/100th pound increments from 0.01 pound to 0.09 pound and a switch 166 which enters a tare weight of 0.10 pound. A signal is periodically applied by the logic unit 15 on a strobe line 167 which is connected to the 1/100th pound tare switches 165. These switches 165 are normally open push button switches. In the event that one of the switches 165 is pushed when a signal appears on the strobe line 167, an output appears on the associated one of the switch buses 155. A strobe line 168 is connected to the 0.10 pound tare switch 166, also a push button switch, and to an "auto-tare" switch 170 and a "no tare" switch 171. In the event that any of the switches 166, 170 or 171 is pushed when a signal appears on the strobe line 168, an output will appear on an associated one of the switch buses 155.

The apparatus 10 is designed for operation with a keyboard tare weight ranging from a minimum of 0.01 pound to a maximum of 0.19 pound. This is accomplished by providing a timing circuit in the control unit 15 which is initiated whenever one of the switches 165 or 166 is actuated. If one of the switches 165 is actuated and within the measured time interval the switch 166 is actuated, the tare weights for the two switches are summed. Similarly, if the switch 166 is actuated first and within the measured time interval one of the switches 165 is actuated, the total of the two tare weights is again summed. If two of the tare switches 165 are actuated within the time interval, only the most recent value is entered. The time interval may, for example, be about 3 seconds which should afford sufficient time for an operator to select and actuate two of the tare switches 165 and 166. If a greater time elapses, only the most recent are weight entered through a switch 165 or 166 is accepted by the control unit 15.

A printer mode switch 172 also supplies data over the switch buses 155. The printer mode switch 172 is a rotary switch having a common terminal connected to a printer mode strobe 173. When a signal is received over the strobe 173, an output appears on one of the switch buses 155, depending upon the setting of the mode switch 172. In an exemplary embodiment of the invention, the printer mode switch permits selecting between a "single" mode, a "demand" mode, a "continuous" mode, a "price by count-single" mode, a "price by count-demand" mode and a "price by count continuous" mode. In either of the single modes of operation, a single label is printed each time an article is weighed. The printer is actuated each time the scale goes through a motion-no motion cycle, a value is computed and the previous label has been removed from the printer 21. In the demand modes of operation, labels are printed as previous ones are removed from the printer. In the continuous modes of operation, the printer will continuously print a series of labels having the same weight, price per unit weight and value until printing is manually terminated.

The switches 17 also include an "auto-price" switch 174. When price information is to be supplied automatically from a commodity plate in the printer, the auto-price switch 174 is actuated. When the switch 174 is actuated, an indicator light 175 is automatically illuminated to annunciate this fact. A switch 176 is provided for expanding the capture range of the auto-zero circuitry from a normal range of zero plus or minus 0.005 pound to up to plus or minus 0.6 pound. The switch 176 is a momentary push button switch. A switch 177 is provided for inhibiting operation of the auto-zero circuitry to permit government inspectors to check the weighing accuracy of the apparatus 10. Finally, a switch 178 is provided for expanding the weight reading shown on the digital weight display 22. The zero expand switch is normally used by maintenance people in calibrating the zero weight setting for the apparatus 10. When the zero expand switch 178 is actuated, the displayed weight which is normally in a format of XX.XX pounds is shifted over by one digit to display a weight reading of X.XXX pounds. This permits calibrating the scale zero to within 1/1000th of a pound. Finally, the switches 17 include a "lock" switch 179. Any time there is a change in data entered into the apparatus 10 other than weight data, the apparatus 10 moves from what is normally referred to as a "ready" state to a "set" state to indicate that an interlock has been broken. The lock switch 179 must be manually actuated to return the apparatus 10 to the ready state. Thus, an operator cannot accidentally bump one of the tare switches 165 and 166 or the price switches 159–161 after the apparatus 10 is in the ready state and print erroneous labels.

FIG. 3A shows an exemplary arrangement for multiplexing the output decimal digits from the analog-to-digital converter of the above-identified Williams, Jr. et al patent so that this information may be transmitted over four data conductors or leads. In addition, four address leads are required to indicate which of the decimal digits is being transmitted over the four common leads at any particular instant or interval of time.

While both the above-identified patents to Williams, Jr. et al and the present exemplary embodiment of the invention show five decimal digits, it is obvious that any suitable number of decimal digits may be employed merely by increasing the number of counterstages and latches and related equipment.

The arrangement shown in FIG. 3A is controlled by a source of control signals 350. This source of signals may be an oscillator or any other source of control or clock signals which may be derived from the analog-to-digital converter such as a clock source of this converter which would be divided down to a much slower pulse or clock rate.

The clock source 350 is further divided by five by equipment 351 which may be of any suitable form. The output of this dividing circuit as shown in FIG. 3A comprises a binary output having conductors 1, 2 and 4. This is the weight of the signals output from the frequency divider 351. These signals are then applied to the multiplexing interface circuits 352, 353, 354 and 355 which may be all the same. These devices are arranged to switch the five input leads shown to the one output lead under control of the input binary address signals on conductors 1, 2 and 4. Thus, when the conductors 1, 2 and 4 are all zero, the input leads A1, A2, A4 and A8 are connected respectively to WT. DATA 1, WT. DATA 2, WT. DATA 4 and WT. DATA 8 leads. When a one signal is applied to the conductor 1 input address conductor and the other two address conductors are zero, then the B1, B2, B4 and B8 input leads are connected to the respective WT. DATA 1 lead, the WT. DATA 2, WT. DATA 4 and WT. DATA 8 conductors, respectively. In a similar manner, the other input conductors of these switching devices are connected to the output weight data leads.

The input leads A1, A2, A4 and A8 are connected to the four binary output leads from the first decade of latches 136 of the above-identified patent to Williams, Jr. et al. Similarly, the input conductors B1, B2, B4 and B8 are connected to the four binary output leads from the second decade of latches 137. The remaining input leads are similarly connected to the corresponding binary leads of the other output decade latches 138, 139 and 140 of the above-identified Williams, Jr. et al patent.

In addition, the output binary coded signals over conductors 1, 2 and 4 from the divider 351 are connected to a translating circuit arrangement 356 such that when all zeros are applied on the leads 1, 2 and 4, zero will be also applied to the digit selector leads DIG SEL B, DIG SEL C, DIG SEL D AND DIG SEL E thus indicating that the first decade signals appear on the weight data leads WT. DATA 1, WT. DATA 2, WT. DATA 4 and WT. DATA 8. When a one is applied to the number one lead, a one or voltage signal will be applied to the DIG SEL B conductor thus indicating that the B decade signal will be transmitted over the WT. DATA 1, WT. DATA 2, WT. DATA 4 and WT. DATA 8 leads. Similarly, a one signal will be applied to the digit selector leads C, D, and E when the corresponding weight data signal of these decimal digits is applied to the WT. DATA 1, WT. DATA 2, WT DATA 4 and WT. DATA 8 leads.

The switching devices for switching any one of the input lines to an output line are similar to the eight-line to one-line decoders 198, 199, 200, 202 of FIG. 4B except that the last three of the eight-line conductors are not connected. Similarly, the dividing arrangements 351 and the translating arrangement 356 are well-known and commercially available.

Figure 4A:
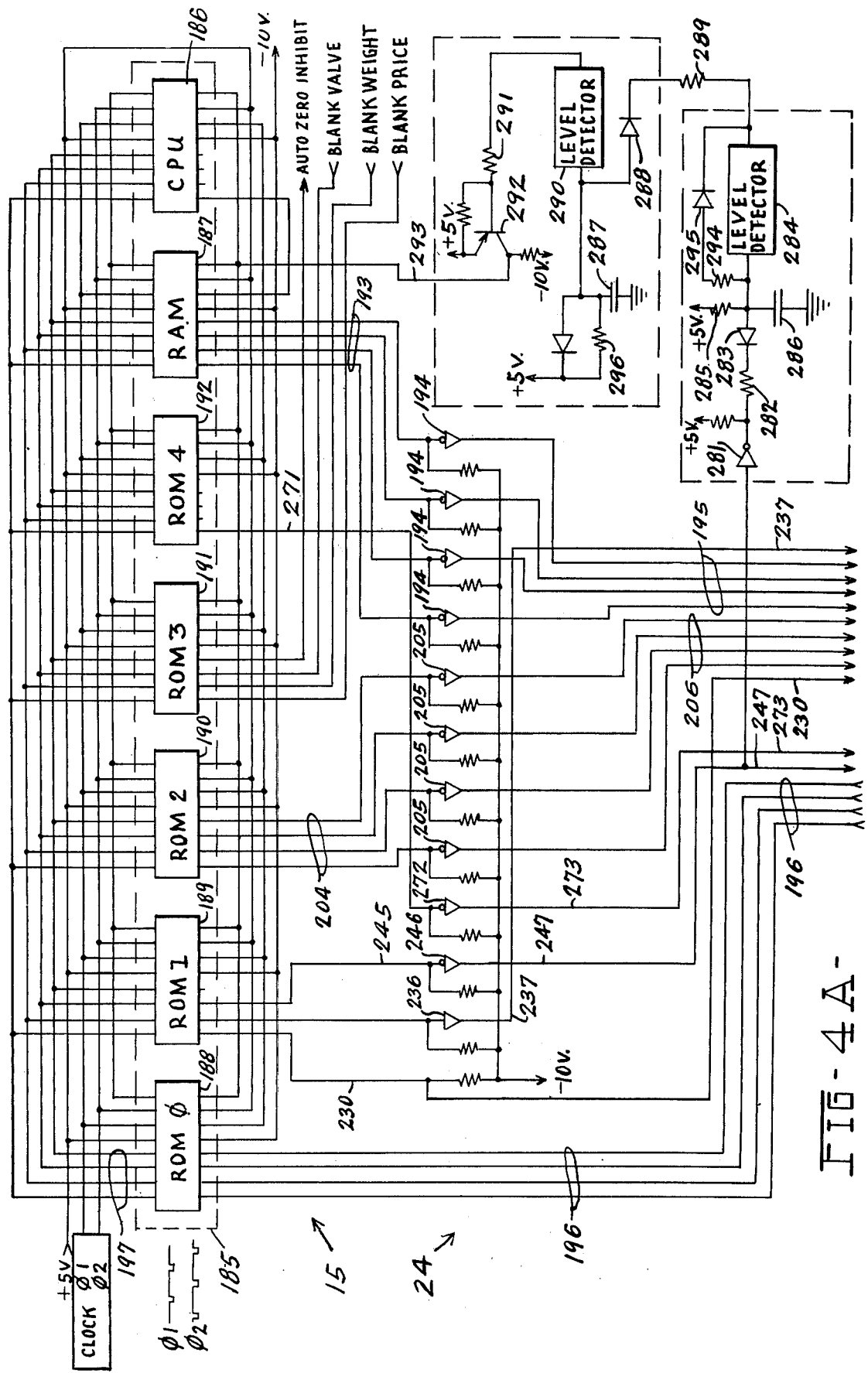
FIG. 4, composed of FIGS. 4A – 4C, is a schematic logic diagram of circuitry for controlling the operating sequence and computing a value in apparatus for weighing, computing a value and printing a label for each of a plurality of successive articles.

Details of an exemplary control unit 15 are shown in FIG. 4. FIG. 4 consists of FIG. 4A, FIG. 4B and FIG. 4C which are arranged as shown on the first sheet of the drawings. In an exemplary embodiment of the invention the control unit 15 is a microcomputer 185 which functions to compute the value of each weighed article and to control the operating sequence of the apparatus 10. The microcomputer 185, for example, may be of a type commercially available in integrated circuits and in the exemplary embodiment described herein the microcomputer 185 comprises a Model MCS-4 Microcomputer Set manufactured by Intel Corporation of Santa Clara, California. Such a microcomputer employed in the exemplary embodiment of the present invention described herein includes a central processing unit (CPU) 186, a random access memory (RAM) 187 and five read only memories (ROM) 188–192. In the exemplary arrangement described herein, the CPU 186 is an Intel Type 4004 integrated circuit, the RAM 187 is an Intel Type 4002 integrated circuit and the ROM's 188–192 are Intel Type 4001 integrated circuits. However, it will be appreciated that other commercially available integrated circuit microcomputers or other types of commercially available computers will operate in accordance with the principles described herein.

These various CPU, RAM and ROM units are interconnected in the manner shown in FIG. 4A, as required in order for these units to cooperate one with another as required by the circuit configurations of these standard commercially available units. The connections are clearly described in the Users Manual for the MCS-4 Microcomputer Set published by the Intel Corporation. Briefly, the ROM's, RAM and the CPU are all interconnected in parallel by the data bus system shown at the top of FIG. 4A. These connections are in accordance with the requirements of the computer as commercially available. These connections permit the cooperation between the ROM's, the RAM and the CPU. Thus, the CPU will transmit an address over the bus system which defines a storage space in one of the ROM's, for example. The ROM having this storage space has internal control circuitry which will respond to this address and in turn cause information stored at the designated address to be transmitted back over the data bus system to the CPU which then responds to this information in the usual manner.

The storage portion of the RAM, the ROM's and the sequence controlling portion of the CPU comprise the sequence controller 19 shown in FIG. 1. Arithmetic unit 18 of FIG. 1 comprises the arithmetic unit of the CPU 186. The data registers 20 also comprise registers in the CPU 186 and the registers in the RAM 187. Input/output ports of the ROM's 188–192 and the RAM 187 and the related equipment comprise the input/output buffer and memory 16 shown in FIG. 1.

The read only memory units referred to herein as ROM's 188–192 store fixed data and also store a series of control orders or instructions for controlling the operating sequence of the entire apparatus 10. These orders or instructions, as is well understood by persons of ordinary skill in the programming and computer art, control the central processing unit CPU 186. These orders or instructions are readily obtained by persons of ordinary skill in the programming and computer art from the flow charts of FIG. 2A–2J by translation of the flow charts into computer language as required by the particular microcomputer and set forth in the instructions in the users manual for the respective computer. A program listing for performing the operations specified in FIGS. 2A–2J is attached as an Appendix to this specification. The program in the Appendix is in the language required for an Intel MCS-4 microcomputer, as specified in the Users Manual for the MCS-4 Microcomputer Set.

Figure 7:
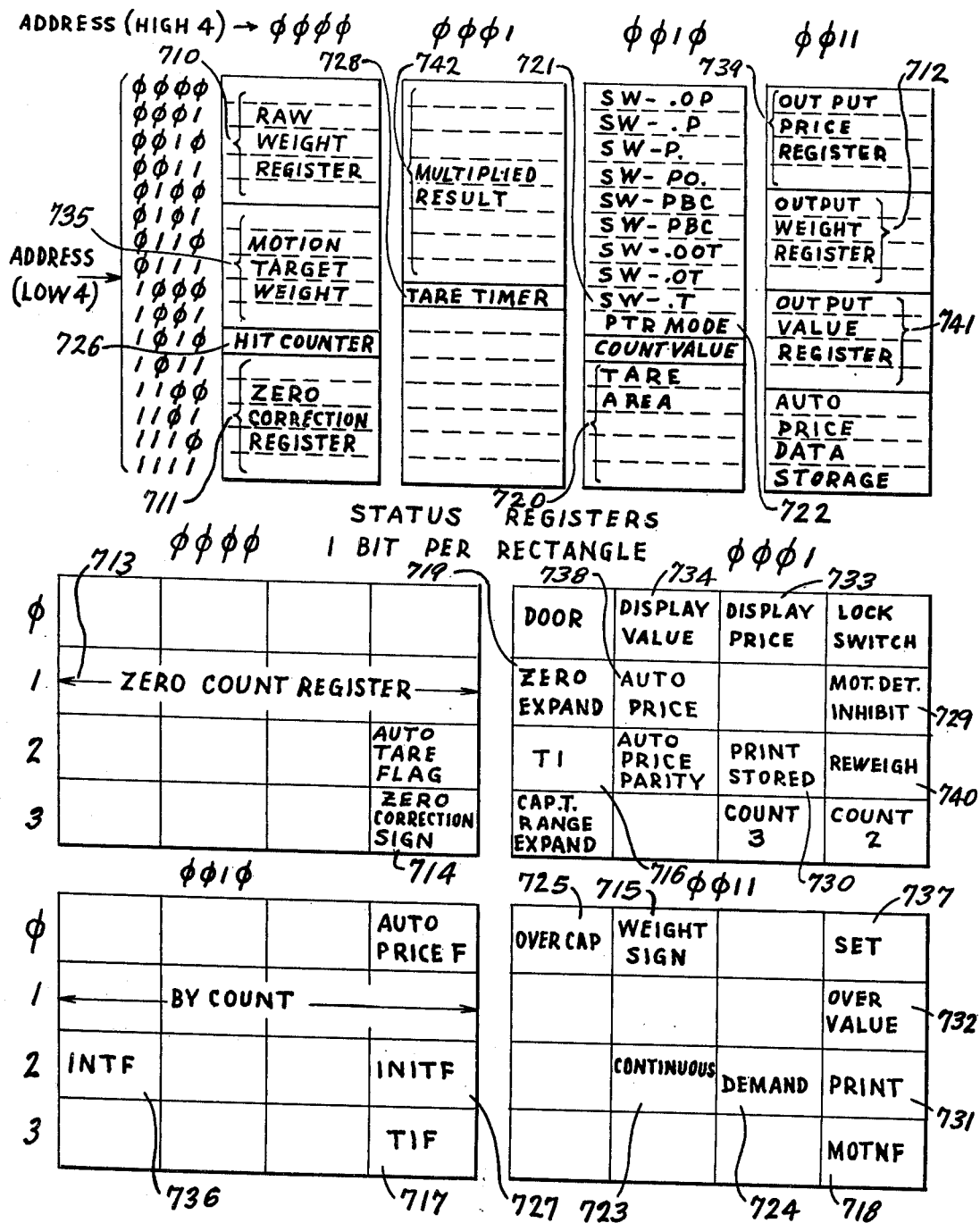
FIG. 7 is a diagram of one possible memory location arrangement in the random access memory in the microcomputer of the exemplary apparatus of the present invention.

FIG. 7 shows the storage areas of the RAM 187 and the storage areas assigned to various registers for controlling input and output data, as well as process data, so that the data control apparatus will operate to automatically correct the zero indication of the scale in accordance with the present invention.

The control orders or instructions control the CPU 186 so that it will obtain the necessary fixed information from the ROM's 188–192 as well as the required control orders and instructions and obtain the data from the RAM 187 and from the various input devices so that the correct weight of each weighted article will be accurately determined and then, after various conditions are met, its value computed, and after the value is computed and various other conditions are met, causes a label to be printed.

The data used by the microcomputer 185 consists of data from the switch busses 155, data from the scale 11, data from the printer 21 and data from various interlocks. Four address outputs 193 from the RAM 187 are connected through inverters 194 to four address buses 195. Address information and other data supplied from the RAM 187 to the address buses 195 determines the data supplied to the microcomputer 185 and the data supplied from the control unit 15 to the printer 21. External data from, for example, the switches 17, is supplied to the microcomputer 185 on four input data buses 196 connected to the ROM 188. At the proper time interval, the external input data on the buses 196 passes through the ROM 188 onto four input/output data buses 197 connected in parallel with the five ROM's 188–192, the RAM 187 and the CPU 186.

The external input data is multiplexed onto the busses 196 by means of four 8-line to 1-line decoders 198–201 and a decimal-to-binary coded decimal (BCD) decoder 202. Each of the four 8-line to 1-line decoders 198–201 has a single output connected to a different one of the external input data buses 196 connected to the ROM 188. Three of the four data address buses 195 from the RAM 187 are connected in parallel to the four decoders 198–201 for selecting the inputs to the decoders 198–201 which are connected simultaneously to the buses 196. Thus, corresponding ones of the eight inputs to the four decoders 198–201 are connected to the outputs for such decoders. The zero inputs for each of the four decoders 198–201 are connected to the four outputs from the decimal-to-BCD decoder 202. When a zero address is supplied to the data select inputs of the decoders 198–201, the nine switch buses 155 are connected in series through the decimal-to-BCD decoder 202 and the line zero inputs of the decoders 198–201 to the four data input buses 196 to the microcomputer 185.

While the switch buses 155 are connected to the microcomputer 185, signals are sequentially applied to the price switch strobes 162–164, the price by count strobes 157 and 158, the tare switch strobes 167 and 168 and the mode switch strobe 173 for entering this data into the microcomputer 185. The strobe signals are applied on these strobe lines from a BCD-to-decimal decoder 203. The ROM 190 has four data outputs 204 connected respectively through four inverters 205 to four address busses 206. The address buses 206 supply address data to the BDC-to-decimal decoder 203 for sequentially scanning the 10 outputs which strobe the price switch strobes 162–164, the price by count strobes 157 and 158, the tare switch strobes 167 and 168 and the mode switch strobe 173.

When price per unit weight data is received in an automatic mode from a commodity plate in the printer 21, such data is received over four lines 210–213. The four lines 210–213 are connected, respectively to the line one inputs on the 8-line to 1-line decoders 198–201. Four weight digit selection inputs 214–217 are connected to the line two inputs to the decoders 198–201, respectively, and four weight data lines 218–221 are connected, respectively, to the line three inputs to the decoders 198–201. The data appearing on the digit selection inputs 214–217 identifies which weight digit is present on the weight data lines 218–221. The weight data appearing on the lines 218–221 at any given time is a single digit of weight in a BCD format. If five digits of weight are to be received from the scale 11, the five weight digits are sequentially read by alternately receiving the digit selection data on the lines 214–217 and the actual weight data on the lines 218–221.

Interlock information is supplied to the microcomputer 185 by means of the line four through line six inputs of the decoders 198–200 and the line four through line seven inputs of the decoder 201. The line four input to the decoder 198 receives data from the lock switch 179, the line five input is connected to a motion detector inhibit output from a manual print switch in the printer 21 and the line six input receives a "reweigh" signal from the printer 21. The line four input to the decoder 199 is connected to a price contact on a service switch which, when actuated, connects the line four input to ground. When the service switch is actuated, price data is shifted into a weight memory for displaying on the digital weight display 22. The line five input to the decoder 199 is connected to a lead 222 which receives a signal when a label is printed, as will be discussed in greater detail below. The line six input to the decoder 199 is connected to receive an acknowledgment signal from the printer 21 when print data for a label has been stored.

The line four input to the decoder 200 is connected to a value contact on the service switch which, when actuated, causes the computed value to be shown on the digital weight display 22. The line five input to the decoder 200 is connected to the auto-price switch 174 and through an amplifier 223 to the auto-price indicator 175. When the apparatus 10 is operated with an auto-price received from the printer 21, a parity check is made to verify the accuracy of the price per unit weight data. An auto-pride parity signal is applied on a line 224 to the line six input to the decoder 200. The printer door has an interlock switch connected to the line four input to the decoder 201. This interlock prevents accidental actuation of the printer while an operator has the door open for changing commodity plates or for maintenance. The line five input to the decoder 201 is connected to the zero expand switch 178 (FIG. 3), the line six input is connected to the T1 clock (not shown) which provides a pulse signal to indicate the time interval during which weight data may be read from the scale 11. As previously indicated in the discussion of FIG. 2, the T1 clock may have a 200 millisecond cycle, comprised of 60 milliseconds in which weight data may be read from the scale 11 and 140 milliseconds in which new weight data is measured by the scale 11. Finally, the line seven input to the decoder 201 is connected to the capture range expand switch 176.

The line seven inputs to the decoders 198–200 are connected to three switches 225–227, respectively. One of the switches 225–227 is closed to establish the number of sequential hits or no motion cycles of the motion detector before a label is printed. The switches may, for example, indicate that only a single hit is required if the switch 225 is closed, two hits are required if the switch 226 is closed and three hits are required if the switch 227 is closed.

Output data from the microcomputer 185 is stored within a random access memory 228. Weight, price and computed value data is supplied to the RAM 228 from the RAM 187 in the microcomputer 185 over the buses 195. Address information for storing data in the RAM 228 is supplied from the ROM 190 over the buses 206. The buses 206 are connected through an address selector 229 to address inputs on the RAM 228. The ROM 189 is connected over a line 230 to an input to the address selector 229 for connecting the buses 206 to the RAM 228 for supplying a data storage or write address or for connecting four buses 231 to the RAM 228 for supplying a readout address. Thus, when weight data or price data is supplied to the microcomputer 185, such data is also stored in the RAM 228 and when a value is computed, the computed value is also stored in the RAM 228. The ROM 189 enables writing or storing data in the RAM 228 by applying a "write enable" signal through an amplifier 236 to a line 237. The RAM 228 has four output buses 232 which are connected in parallel for supplying data to the printer 21 and to the weight display 22. The output buses 232 are also connected through three exclusive OR gates 233–235 for generating a parity bit from the output data. A BCD signal is generated in the printer corresponding to the setting of each print wheel in the printer 21. A parity bit generated from the setting of each print wheel is compared with the corresponding parity bit from the gates 233–235 for verifying the accuracy of the printer setup. If there is a lack of parity, a "reweigh" signal is applied from the printer 21 to the line six input to the decoder 198.

As indicated above, an output address is supplied to the RAM 228 over the readout address buses 231. The output address buses 231 are also connected to supply an output data address to the weight display 22 and are connected through amplifiers 240 to supply address data on outputs 240' to the printer 21. An address is applied on the buses 231 from a four bit address counter 241. A clock signal is applied from a clock source (not shown) to a decade counter 242. One output of the counter 242 is applied through an inverter 243 for counting up the four bit address counter 241. A different output from the decade counter 242 is applied through an inverter 244 for supplying a clock signal to the printer 21.

An output 245 from the ROM 189 in the microcomputer 185 is connected through an inverter 246 to a line 247 which enables quad bistable latches 248. When the latches 248 are enabled, data present on the address and data buses 195 from the RAM 187 is set into the latches 248. One output 249 from the latches 248 is a memory update request. The memory update request line 249 is connected to a NAND gate 250. The NAND gate 250 has an output connected through an AND gate 251 to an enable input on the four bit address counter 241. The address selection line 230 connected from the ROM 189 is also connected to a second input of the AND gate 251. A signal is applied on the line 230 to the AND gate 251 at the same time the readout address lines 231 are connected to the RAM 228. If the output of the NAND gate 250 is high at the same time, the AND gate 251 will enable the four bit address counter 241 for supplying a sequence of addresses for reading data from the RAM 228. The NAND gate 250 also has four inputs connected to the address buses from the counter 241 and a printer off input from the printer which is high when the printer is off. Thus, when the bistable latches 248 are set to apply a signal on the memory update request line 249 or when the printer is off, the address counter 241 will cycle whenever a signal is received from the ROM 189 on the line 230. Once a cycle is started by a signal on either the memory update request line 249 or by a pulse on the printer off line, the address counter 241 will continue to cycle until all of the address buses 231 go to a logic zero.

The bistable latches 248 also include an output 252 which indicates when the weight reading is below zero. The output 252 is connected through an inverter 253 to supply a MINUS sign output 254 to the printer 21 and also to the weight display 22. Still another output 255 from the latches 248 is connected through an inverter 256 to an output 257 which illuminates an out-of-range indicator lamp. A fourth output 258 from the latches 248 is connected through a NAND gate 259 to illuminate a ready indicator lamp. A "print stored" input 260 from the printer 21 is connected through an inverter 261 to a second input of the NAND gate 259. The output 258 from the latches 248 is also connected through an inverter 262 to a line 263 which supplies a SET signal to the printer. The line 263 is also connected through an amplifier 264 for illuminating a SET indicator lamp. The printer also supplies the REWEIGH signal on a line 265 through an amplifier 266 to illuminate a "weigh again" indicator lamp, a "take label" signal over a line 267 through an amplifier 268 to a take label indicaator lamp and an "add label" signal over a line 269 through an amplifier 270 to an add label indicator lamp. An indicator is also provided for indicating when the apparatus 10 is operating within the weight zero limit or within a predetermined fraction of a weight graduation of zero. This has previously been referred to as the ¼ graduation lamp. The ROM 192 has a single output 271 which is connected through an inverter 272 to a line 273. The line 273 is connected through an inverter 274 for energizing the zero limit indicator lamp.

During normal operation of the microcomputer 185, the ROM 189 applies a periodic pulse on the line 247 for resetting the bistable latches 248. This pulse will appear once each time the microcomputer 185 goes through a complete program cycle. In typical operation of the microcomputer 185, the pulse will appear at about 0.2 second intervals. However, it is possible for a noise pulse or some other disturbance to cause the central processing unit 186 to end up at an incorrect or nonexistent address. In such event, the microcomputer 185 becomes "hung up" and is in effect "dead". When this condition occurs, the microcomputer 185 must be restarted before a label can be printed. Timing circuitry is provided for automatically restarting the microcomputer 185 in the event that two sequential periodic pulses are missing from the line 247.

The line 247 is connected through an inverter 281, a current limiting resistor 282 and a diode 283 to the input of a threshold or level detector 284. The input of the threshold detector 284 is also connected through a high value resistor 285 to a voltage source and through a capacitor 286 to ground. When the voltage on the input of the threshold detector 284 is below a predetermined level, the threshold detector 284 will have a high or positive output. However, if the input of the threshold detector 284 exceeds a predetermined voltage level, the output of the threshold detector 284 will go negative. The capacitor 286 is charged at a relatively slow rate through the resistor 285. Each time a cycle pulse appears on the line 247, the inverter 281 will have a low output for rapidly discharging the capacitor 286 through the diode 283 and the current limiting resistor 282. Under normal operation of the microcomputer 185, the cycle pulses on the line 247 maintain the charge on the capacitor 286 below the threshold level of the detector 284. However, in the event of two sequential cycle pulses failing to appear on the line 247, the capacitor 286 will become sufficiently charged as to cause the threshold detector 284 to change states.

When the output of the threshold detector 284 goes negative, a capacitor 287 is discharged through a diode 288 and a current limiting resistor 289. A decrease in the voltage on the capacitor 287 causes a second threshold detector 290 to change from a negative to a positive output which is applied through a resistor 291 to the base of a transistor 292. The transistor 292 then switches states of conduction for applying a recycle or restart signal on a line 293 connected in parallel to the CPU 186, the RAM 187 and the ROM's 188-192 in the microcomputer 185. A resistor 294 and a diode 295 are connected in series between the input and the output of the threshold detector 284. After the threshold level is reached and the output of the detector 284 goes negative, the capacitor 286 is discharged through the resistor 294 and the diode 295 until the output from the detector again becomes positive. The capacitor 287 is then charged through a resistor 296, thereby causing the outputs of the detector 290 and the transistor 292 to change. If two more cycle pulses are absent from the line 247, the capacitor 286 will again become charged sufficiently for the outputs of the detectors 284 and 290 and the transistor 292 to change states, applying another clear and restart signal to the microcomputer 185.

FIG. 7 is a diagram showing one of many possible memory location arrangements in the random access memory RAM 187 of the exemplary arrangement of the apparatus of the present invention.

As indicated in FIG. 7, the RAM is provided with four memory register areas. Each of these memory register areas is arranged to store four binary digit words which in the exemplary embodiment described herein usually are coded to represent a decimal digit. Each memory area 16 is arranged to store 16 of these four binary digit numbers or other information. The register areas are selected by address designated "4 HIGH" above each one of the areas. Thus, the address of the first area is 0000. The address for the other three memory register areas is shown above each of these register areas. In addition, each of the four binary digits forming a word or number in each of the areas is assigned an address, which address is shown to the left of the first memory area. As indicated, the address for the memory areas comprise the first four high numbers, or binary digits of the address, while the address of the individual words or numbers within each area is designated by an address designated "4 LOW". Thus, at least certain of the same address symbols may be employed to designate both memory areas and also the words within the memory areas. Thus, two addresses are distinguished by their location in the addresses as is well known by persons of ordinary skill in the art of microcomputer operation.

The RAM 187 also includes four status registers shown in the lower part of FIG. 7. Each of the status registers has an address similar to the corresponding memory register area as indicated above each of the status registers. The rectangles in the status registers represent a storage space for a single binary digit or bit. Thus, each of the status registers may store four four-bit binary words. In addition, each of the bits of each of the words may be employed to store a binary bit which is independent of the other binary bits of a particular word at the particular address. In other words, as indicated, the zero correction sign bit, 714, is used to store the sign of the zero correction. This bit is stored in this bit space independently of the information stored in the other three bits spaces of the last word of the first status register.

As indicated in FIG. 7, the first five word spaces 710 in the first register space are employed to store the five binary coded decimal digits of the raw weight received from the weighing apparatus and are designated raw register. The next five four-bit register word spaces 735 are employed to store the five decimal digits of the motion target weight. The next word, or register space 726, is employed to store the count or number of hits employed to determine whether or not there is motion upon the platter of the scale. The last five word spaces 711 are employed as a zero correction register and store the five BCD digits employed to correct the zero indication of the scale. The other register spaces are designated to indicate the manner in which the particular register spaces are employed.

The various status register spaces shown at the bottom of FIG. 7 are similarly designated with the name of the bit or bits employed to record the various informationn required to provide the various features of the present invention, as described herein.

OPERATION OF THE SYSTEM

As described in the above-identified patent to Williams, Jr. et al, the sensor controlled by the load cell 12 of the scale provides an output voltage which represents the load on the load cell, which in turn is a function of the load on the scale. This output voltage is then amplified and processed so as to remove an unwanted direct component and to reduce or remove unwanted variations in this voltage so that the voltage accurately represents the load on the load cell and the load on the scale. This analog voltage is then employed to control an annalog/digital converter 14.

Also the analog-to-digital converter employed in the exemplary system described herein, in addition to generating a digital signal representing the weight on the scale to be displayed also generates a digital signal representing a fraction of the weight represented by the least significant digit of the displayed weight. In the examplary embodiment described herein, it is assumed that this additional signal represents tenths of the weight represented by the least significant digit displayed. However, this additional digital signal may represent any other suitable or desirable fraction of the weight represented by the least significant digit displayed.

The analog-to-digital converter in effect samples this corrected analog voltage at repeatedly recurring instants of time. These sample voltages are then employed to control the output of the digital converter. Thus the output of the digital converter is a digital signal which accurately represents the load on the load cell and thus the load on the scale. In the exemplary arrangement described in the above-identified patent to Williams, Jr. et. al, and in the exemplary arrangement described herein, the analog-to-digital converter requires a cycle of about 200 milliseconds. This cycle is thus repeated approximately five times a second. Near the end of each cycle of operation of the analog-to-digital converting apparatus, this apparatus transfers digital signals representing the analog weight input to a set of latches. These latches then maintain these digital signals for a predetermined interval of time. During a portion of this interval of time, the analog-to-digital converter also applies an output signal to the T1 lead. This T1 signal is obtained from device 100 of FIG. 2 of the above-identified Williams, Jr. et al patent. Thus during the time the output signal is applied to the T1 conductor, output from the latches remains constant so that the input to the multiplex switching devices 352, 353, 354 and 355 of FIG. 3A remains constant. Consequently, the output signals applied in sequence to the weight data conductors WT. DATA 1, WT. DATA 2, WT. DATA 4 and WT. DATA 8 represent the respective decimal digits of the output weight from the analog-to-digital converter. The frequency or speed of the clock pulses from source 350 are such that the equipment of FIG. 3A will operate through a plurality of cycles during the time an output signal is applied to the T1 conductor. In other words, each of the binary representations of the five decimal digits representing the weight will be applied in succession to the output weight data conductors WT. DATA 1, WT. DATA 2, WT. DATA 4 and WT. DATA 8 a plurality of times during the time an output signal is applied to the T1 conductor.

Concurrently with the application of the respective decimal digits to the weight data lines WT. DATA 1, WT. DATA 2, WT. DATA 4 and WT. DATA 8, corresponding signals are applied either to none or to one of the data selecting conductors B, C, D and E indicating the specific of the five decimal digit signals applied to the weight data conductors WT. DATA 1, WT. DATA 2, WT. DATA 4 and WT. DATA 8 at each of the instants of time.

Assume now that power has been applied to the system so that the analog-to-digital converter will start to develop an analog conversion and provide a digital output signal after an interval of time. At the same time, the control equipment 15 will perform an initializing operation in the usual manner and cause zeros to be stored in each and every register space in the RAM 187. Thus, zeros will be stored in all of the register spaces of this RAM 187 shown in FIG. 7.

After zeros are stored in all of the register spaces, the control of the system is transferred to the main program A1 shown in FIG. 2A. Block 25 causes the memory space 718 of FIG. 7 to be tested to determine whether a one or a zero is recorded in this space. This space, which is designated "MOTNF", represents a motion flag and under the assumed conditions, a zero will be recorded in this space with the result that the program is now transferred to E1 of FIG. 2E. As a result, the system then tests the storage space T1F 717 to determine whether a one or zero is stored in this space. Under the assumed conditions, a zero will be stored in this storage spot. This storage space is designated a T1 flag. Since a zero is stored in this storage space, the program proceeds from box 81 to box 82 where the condition of the T1 clock lead (see the bottom of FIG. 4B) is tested to determine whether one signal or a zero signal is present on this lead.

Under the assumed conditions, a zero will be present on this lead so that the program proceeds to block 83. With the zero present on this lead, the analog-to-digital converter indicates that a satisfactory output signal is not present on the output leads from the analog-to-digital converter.

In block 83 the computer is directed to change the information stored in the storage bit space 717 to a one, indicating that the analog-to-digital converter is in the process of providing a valid output digital signal, but that such signal is not present at this time on the output leads from the analog-to-digital converter.

From block 83 the control then goes to block 84 where the zero expand switch is tested. A flag or bit stored in a status register bit space 719 indicates the setting of the zero expand switch. Since this switch is assumed to be off, the zero expand is not true and the control is thus transferred to A15 of FIG. 2A at which time the control equipment successively reads all of the various external inputs and stores their condition in the third one of the storage registers having an address 0010 of FIG. 7. After all of these switches have been tested and their condition recorded in the corresponding register spaces assigned to them, the control then proceeds to block 40 where the price by count mode switch is tested. Under assumed conditions, this switch will be conditioned so that price by count is not the mode of operation. Consequently, control is then transferred to block 41.

Again, assuming this system is not operating in the auto price mode, a zero will be stored in the auto price bit storage location in the status register 0001 and, as a result, the control of the program is transferred to block 48 of FIG. 2B via transfer B2. As a result, block 48 tests the status register storage space 738 designated auto price in the status register 0001. Assuming that the last cycle was not auto price and that a zero bit is stored in this register indicating that the last cycle was also a manual price entry, the control is transferred from block 48 to block 47. Block 47 determines whether or not the price input has changed.

Thus, block 47 compares the information just recorded in the storage spaces SW-.OP through SW-.PO with the previous price output registered in the output price register 739 in the register 0011. Under the assumed conditions, the prices may or may not be the same. If the manual switches are all set on zero, then these prices will be the same and the price will not have changed so far as the control equipment is concerned. As a result, the control goes to block 49 of FIG. 2B where a safety switch on the printer door is checked, since this will be closed, control then goes to block 50 where the condition of an auto zero inhibit switch is tested. If these switch is operated, it is desirable to disable to the auto zero correction operations as described herein.

Assuming that the auto zero inhibiting switch is off, then the control is transferred to block 53 over the transfer B8. Block 53 tests the auto tare switch.

Under the assumed conditions, the information stored in the storage space SW-.T in the storage register 0010 indicates that the AUTO-TARE switch is not pushed with the result that the program now transfers to block 144 via transfer I1 of FIG. 2I.

Block 144 causes the computer to test the storage areas SW-.T and SW-.OT and if none of the tare switches has been operated, the program is transferred to block 145 which causes the tare register area 720 of FIG.. 7 to be all returned to zero, or zeros again recorded in area under the assumed conditions. In addition, a one is recorded in the INTF status register space 736 of the status register 0010. Then the control is transferred to block 55 via B10 of FIG. 2B.

Block 55 causes the computer to compare the printer mode recorded in space 722 of register 0010 with the recordings in the status register bits 723 and 724. Since it is assumed herein that the printer mode will be the manual mode, these registers will not have changed so the operation will be transferred to block 57 via transfer B12. In block 57, the condition of the interlocked flag in the status bit register 736 is interrogated and as pointed out above, this flag has been set to a one so that control then goes to block 58 where the interlock flag is changed from one to zero and the initialized flag INITF stored in space 727 is set to a one. Next, the set bit in space 737 of the status register 0011 is set and the control transferred to block 66 via C5. Since this cycle of operations started from block 25, block 66 causes the computer to transfer control back to block 25 via transfer A1.

Since the motion flag is not set, that is, since a zero is still stored in the status register storage space 718, the control will be transferred to block 81 via transfer E1. At this time, the block 81 causes the computer to again test the T1F flag, that is, the T1F storage space 717. During the previous cycle, as described above, a one was stored in this block indicating that T1F is set. Consequently, at this time the control will be transferred to block 86, instead of 82, as described in the previous cycle. However, under the assumed conditions, the signal on the T1 clock lead is still zero so that control will be now transferred to block 84 via the transfer E4. Thereafter, block 84 tests the zero expand switch which, as assumed to be unoperated, so that control will then be transferred to block 39 via transfer A15. Thereafter the remainder of the second cycle is substantially the same as described above assuming that none of the various keys or switches have been actuated.

At the end of the second cycle, control will be transferred to the block 25 via A1 transfer in the manner described above and each succeeding cycle of the main program will be repeated in accordance with the above description of the second cycle so long as the signal from the analog-to-digital converter on the T1 clock lead remains zero. During each of these cycles, the T1F or T1 flag signal is set in a one state by a one being stored in the storage space 717 and a zero signal remains on the T1 clock lead from the analog-to-digital converter.

NO MOTION DETECTION

Assume now that during some one of the above-described cycles of the main program, the analog-to-digital converter 14 completes a conversion and supplies digital output signals to the control equipment 15. Consequently, the analog-to-digital converter 14 will also apply a one signal to the T1 clock lead. As a result, when a control is transferred to the block 86 during the next main program cycle, as described above, the T1 lead will test one or true so that the control is now transferred to block 87 where the T1F or T1 flag is cleared. In other words, a zero is now stored in the T1F status register space 717 instead of a one.

Thereafter, the control goes to block 88 where the weight output signals from the analog converter 14 are read into the raw weight register 710 of FIG. 7.

FIG. 2J shows a flow chart of an exemplary sub-routine for entering weight signals from the analog-to-digital converter in the raw weight register 710 of FIG. 7.

As described above when the analog-to-digital converter is in condition for transferring digital signals to the raw weight register 710, an output signal is applied by the analog-to-digital converter to the T1 lead. As a result the control sequence proceeds from block 86 through block 87 to block 88 as described above. Within block 88 the control is transferred to a block 370. This block indicates that the RO register within the CPU unit is set to 11. The P1 register is set to zero and the R3 register also set to zero. These registers being located within the CPU unit.

The RO register is employed to indicate when all of the digits of the weight are transferred to the raw weight register 710. The P1 register is employed to direct the digits to the proper register spaces within the raw weight register. The R3 register is employed to select the desired decimal digit to be transferred from the analog-to-digital converter to the raw weight register 710. Thus initially with these registers set as described above, the block 371 to which the control is transferred from block 370 first reads the R3 register and finds a zero recorded therein. Block 370 then translates this zero to indicate that the zero should be read from each one of the leads DIG SEL B, DIG SEL C, DIG SEL D and DIG SEL E. The translation order or sequence is designated KBP which translates the binary digit in the R3 register into a one-out-of-four code. Next block 372 tests the digit select leads B, C, D and E and if any signal condition on these leads other than zero on all of them is found, the control is transferred back to transfer point J2 and the above cycle repeated. The small loop including blocks 371 and 372 are then repeated until zero is found on all four of the digit select leads DIG SEL B, DIG SEL C, DIG SEL D and DIG SEL E.

When a zero is found on all of these leads, the control is then transferred to the block 373 where the value of this digit is read into the raw weight register area selected by the P1 register in the CPU unit. This will be the first digit space in the raw weight register 710 since a zero was previously set in the P1 register in the CPU unit.

After the first digit is thus transferred to the raw weight register 710, the zero in the R3 register in the CPU unit is again translated by the KBP operations into a one-out-of-four code and the signals on the digit select conductors DIG SEL B, DIG SEL C, DIG SEL D and DIG SEL E compared with this code. If under the assumed conditions zeros are found on all of these leads, thus corresponding to the zero in register R3 after being translated to the one-out-of-four code, the control is advanced to block 376.

If on the other hand the signals on the weight data conductors WT. DATA 1, WT. DATA 2, WT. DATA 4 and WT. DATA 8 change during the time the weight is being read into the raw weight register 710, then when the signals on the digit select leads DIG SEL B, DIG SEL C, DIG SEL D and DIG SEL E are again compared with the setting of the R3 register by block 375 these signals will have changed so that the control is then transferred back to transfer point J1 and thus to block 370 instead of block 376. Under these assumed conditions wherein the signals on the B, C, D and E digit select conductors change during the reading in of a digit, it is assumed that the digit transferred to the raw weight register will be in error. Consequently, the transfer operations are started over again and proceed as described above. Namely, the control will be first transferred to block 370 where the registers RO, P1 and R3 are set as described above. Then the control is advanced to block 371 and the setting of the R3 register translated to a one-out-of-four code and again compared with the B, C, D and E select conductors. This cycle is then repeated until the signals on these conductors are the same as the translated setting of the R3 register at which time the digit on the weight data conductors 1, 2, 4 and 8 is again transferred to the raw weight register.

Assume that the signals on these digit select conductors do not change so that when they are again tested by the block 375 they will again correspond to the translated setting of the R3 register. Consequently, the control is advanced to block 376 where the setting of these three registers P1, P3 and RO are all incremented by one. The control then advances to block 377 where the number stored in the RO register is tested. Under the assumed conditions this number is now 12 (11 plus 1). Since this number is not zero, the control is transferred to the J2 transfer point and thus to block 371 where the above cycles of operation are repeated until the second of the decimal digits of the raw weight are transferred from the analog-to-digital converter to the raw weight register. The control is then again transferred to block 376. Assuming that the signals on the B, C, D and E digit select conductors have not been changed during the recording of the value of the second digit in accordance with block 376, the registers P1, R3 and RO are again incremented so that the next or number three digit will be transmitted from the interface equipment of FIG. 3A to the raw weight register 710.

After the fifth digit has been thus selected and transferred to the raw weight register 710, the RO register in the CPU unit will have recorded in it 15. This is incremented by the sub-routine of block 376. As a result, the setting of this RO register will now be zero. Since this is a four digit binary register when the register is incremented with 15 stored in it, it is restored to zero. With the result that the control is now transferred from reading the weight to the block 89 of FIG. 2E.

From block 88 the control sequence advances through blocks 96 and 97 and at times through block 97A which blocks are employed to advance the tare timer in a well-known manner. Briefly, the block 96 causes the count stored in the tare timer space 728 to be read out. Then block 97 determines if the count read out is zero. If it is zero the control sequence advances to block 89. If the count read out is not zero then the control sequence advances to block 97A where one is subtracted from the count read out and the new count restored in the tare timer storage spaces 728.

Next, in block 90, the computer determines whether or not there has been motion or a change in weight on the scale platform. The arrangement, in accordance with the exemplary embodiment of this invention, is arranged so that if the weight changes or is less than a predetermined amount, that is within a prdetermined band, it is assumed that there is no motion of the platform scale. If, on the other hand, a weight change exceeds the predetermined band, then it is assumed that there is motion of a scale platform. In accordance with the present invention, the bandwidth may be predetermined to any desired value, which value is stored in the pre-assigned storage spaces in one of the ROM's.

Under the assumed conditions, zeros will be stored in the motion target weight register 735. Assume now that the band is 0.003 pound, plus or minus, and that a weight of 0.004 pound is read into the raw weight register 710 from the analog-to-digital converter 14 during this cycle of the control equipment 15. Then in accordance with block 90, the zero weight from the motion target weight register 735 is subtracted from the weight in the raw weight register 710 and then the band 0.003 subtracted from the difference which leaves +0.001. Since the final difference is positive, it indicates that motion is present. Next, the weight in the target weight register is subtracted from the weight in the raw weight register and the band of 0.003 pound added to the difference, and since this sum is not negative, it does not indicate motion. However, motion was indicated by the first calculation. Therafter, in response to the motion indicated from block 90, block 91 causes the program to transfer to block 98 via the F1 transfer. Block 98 first clears the no motion or hit counter 726 (i.e. causes all zeros to be stored in this counter space) and sets the motion flag MOTNF. That is, it causes a one to be stored in the status register 718. Then block 99 causes the weight in the motion target weight register 735 to be changed to the 0.004 pound recorded in the raw weight register. The weight of 0.004 pound remains recorded in the raw weight register 710 at this time. Next, an initial weight of 8 pounds representing the weight of the scale platter on the load cell is subtracted.

The program then proceeds through blocks 100 where zero expand switch is tested and found not to be operated. At block 103 the zero range expand switch is tested and found not to be operated, so the program then jumps to block 105 via transfer F6 where the weight recorded in the raw weight register 710 is corrected by the auto zero weight stored in the zero correction register 11, which is zero at this time under the assumed condition. The program then proceeds to block 107 where the control equipment determines that the weight on the platter is not greater than 30 pounds. Consequently, the control then advances to block 109 where a zero is recorded in the over capacity status register space 725.

Next, the control equipment 15 is advanced to the block 110 where the motion flag is tested. That is, the status register space 718 is read out and since a one is recorded in this space, the program then advances to block 111 where the one recorded in the set status register space 737 is tested. Since a one is assumed to be stored in this space, the program is then transferred to G7 so that the block 123 subtracts the tare weight in the register 720 from the weight in the raw weight register 710, causes round off operation to be performed and restores the thus corrected weight in the raw weight register and moves the four most significant digits from the raw weight register 710 to the weight out register 712.

Next, the program advances through blocks 124 transfer G12, blocks 128 and 129, 130 and 131 and transfer C5 to block 66.

Since this cycle of operation of the control equipment 15 started from block 25, as described above, the block 66 now causes the program to be transferred back over transfer A1 to block 25 and another cycle of the control equipment 15 is initiated.

At this time the motion flag MOTNF is set, i.e. the status register space 718 has a one stored in it as described above, so the control sequence advances to block 26 instead of being transferred to block 81 via transfer E1.

In block 26, the status of the MOTNF status register space 718 is again tested and since a "1" is recorded in this space, this flag is not clear; consequently, the program is transferred by transfer E1 to block 81.

At this time the T1F flag is not set. In other words, a zero was recorded in the status register space 717 on the last cycle of the control equipment 15. Consequently the program now proceeds to block 82 where the condition of the T1 clock lead from the analog-to-digital converter is tested. At this time it is assumed that a "1" signal is on this lead with the result that the program now transfers over the E4 transfer to block 84. Since the zero expand switch is not operated, this zero expand is not true with the result that the program is transferred over transfer A15 to block 39. The remainder of this cycle of the control equipment 15 then is as described above through blocks 40, 41 transfer B2 to blocks 48, 47, 49, 50, 52, 53 transfer I1 to block 144, then block 146 and transfer B10 to block 55. From block 55, control is transferred to block 57 over transfer block and then through block 57 transfer C1 to clobk 62, transfer C5 and then through block 57 transfer C1 to block 62, transfer C5 to block 66.

Since this cycle was initiated through block 26, block 66 now returns the control to block 26 over transfer A2 and the above cycle of operations then repeated. This cycle of operation is then continuously repeated so long as a "1" signal is applied to the T1 clock lead by the analog-to-digital converter.

Next, when the analog-to-digital converter removes the "1" signal from T1 clock lead, the program during the next cycle of the control equipment 15 is subsequently transferred to blocks 81 and 82 in the manner described above, the T1 clock lead will not be true, in other words it will test "0" so the program is then advanced to block 83 where the T1 flag is again set; that is, the "1" is recorded in the T1F storage space 717 in the status registers. Thereafter, the above cycles of operation of the control equipment will continue as described above initially except that the block 66 in FIG. 2C will return the control to block 26 over the A2 transfer since the cycle started from this block instead of block 25 as described initially.

By the use of the T1F flag and the testing of the T1 clock control lead as described above, the output from the analog-to-digital converter is transferred to the control equipment only once during each of the 200 millisecond cycles of the analog-to-digital converter 14. This transfer occurs in the next succeeding cycle of the control equipment after the "1" signal is applied to the T1 clock control lead. Thereafter the "1" signal has to be removed from this lead and re-applied by the analog-to-digital converter 14 before a subsequent weight will be transferred from the analog-to-digital converter to the control equipment 15.

Since the control equipment 15 operates in the above-described manner for the various cycles, when weight information is not transferred from the analog-to-digital converter, the operation of the control equipment 15 during such cycles will not be repeated. Instead the operation during only those cycles during which weight information is transmitted from the analog-to-digital converter to the control equipment 15 will be described. However, it is to be understood that control equipment 15 advances through numerous of these cycles in the manner described above between each of these cycles during which weight information is read out from the analog-to-digital converter and stored in the raw weight register 710.

Assume now on the next weighing cycle, that is the next time a weight is received from the analog-to-digital converter and stored in the raw weight register 710, the weight stored in this register will not have changed but will be 0.004 pound. Consequently when the calculations at block 90 have performed in the sequence as described above, the calculations will indicate that no motion is present. No motion would also be present if the weight received from the analog-to-digital converter does not vary more than 0.003 pound from the 0.004 pound previously received from the register.

Under these assumed conditions with the calculations performed in accordance with block 90 indicating no motion, block 91 will then cause the control to be advanced to block 92 when the motion flag MOTNF is read out and checked. This time the motion flag will not be zero since a "1" was previously stored in the status register space 718 and has not been changed. As a result, control is advanced to block 93 where the no motion counter or hit counter 726 of FIG. 7 is incremented by one. Under the assumed condition, "0" has been previously stored in this counter so the counter will now indicate a count of "1". Control is then advanced to block 94 where the count in this counter 726 is read out and since it is less than some predetermined value, the count will not be greater than this value with the result that the control is transferred via F2 to block 99 and the remaining portion of the cycle repeated as described above.

On the next cycle during which weight indication is again received from the analog-to-digital converter in the manner described above, if no motion is still determined by block 90, then the hit counter 726 will again be incremented and have a count of 2. Thus each cycle during which no motion is present, this counter is incremented by "1". If, however, during any of these cycles the calculations of block 90 indicate that motion is present, then block 91 will transfer the control to block 98 via transfer F1 at which time the hit counter 726 is cleared, i.e. zeros are stored in the counter spaces, and the motion flag 718 is again set to 1; in other words, a "1" is written over the "1" already in this storage register space.

After the predetermined number of no motion indications have been obtained from calculations of block 90 and the control advanced through blocks 91, 92, 93 to 94, it will be determined that the counter is in excess of the required number of counts.

Thus, to obtain a no motion indication, it is not only necessary that the scale remain within a fixed band indication of weights, but also that it remain in this band for a predetermined interval of time. This interval of time can be predetermined within increments of 0.200 of a second, the cycle period of an analog-to-digital converter. Assuming that five such increments are required thus requiring that the weight indication remain within 0.003 pound for one second when the control is transferred to block 94 and a count of five stored in the counter 726, block 94 will advance control to block 95 where the motion flag MOTNF is cleared. In other words, a "0" is now recorded in status register space 718.

Thereafter the control is transferred to block 99 via transfer F2 and then advanced through the blocks 99, 100, 103, transfer F6 to block 105, block 107, block 109 and to block 110.

In block 110, the motion flag is again tested and since a "0" is now stored in the status register 718, the control is transferred to block 115 over the transfer G1 and thereafter the control is transferred as described hereinafter under the heading of "Automatic Zero Correction". On the next cycle of the control equipment 15, after the no motion flag is cleared as described, control is returned to the block 26. In accordance with this block, motion flag is read out and tested and since it is clear, control is advanced to block 27 where it is determined whether the scale is arranged to operate in the demand mode or continuous mode. Under the assumed conditions, the scale is arranged to operate in the manual mode and not in the demand or continuous mode so that the control continues to a block 28. At the block 28, a check is made to see if a "motion detector inhibit" switch is closed to disable the motion detector portion of the apparatus 15. It is assumed that the switch is not closed and the control continues to block 29. Block 29 determines that a reweigh is not necessary at this time so control is transferred to block 30. In accordance with block 30, the control equipment under the assumed conditions will determine that print data is not stored so the control sequence advances to block 31. Block 31 determines that the no tare key is not pressed so that control is advanced to block 34. If the weight is greater than 0.1 pound then the control is advanced to block 35 where the set status register space 737 is tested. This space 737 is assumed to be true so that the control is then transferred back to block 25 via transfer A1. If the weight as assumed is not greater than 0.1 pound then block 34 causes the control to be transferred back to block 25 via transfer A1. In either case the above-described cycle then repeats starting with block 25 for each of the various cycles described so long as the motion flag is not set; that is so long as zero remains recorded in the status register 718.

If the weight is greater than 0.1 pound, the set is not true, the weight is not minus, and is not over the capacity of the scale, then the control sequence advances through blocks 34, 35, 36 and 37 to block 38. Block 38 causes an output print pulse which causes the weight to be printed. Then the sequence returns to block 25 via transfer A1. Thereafter, the above-described sequences are repeated.

AUTOMATIC ZERO CORRECTION

Assume now that either when the scale is first turned on or that after the previous object has been weighed and removed from the scale, the scale has not returned accurately to zero. Assume, for example, that the scale has returned to 00.0004. Also assume that zeros are entered in the zero correction register 711 and after the various operations referred to above, have been completed, 00.004 pound is entered in the raw weight register 710. A "1" will be registered in the weight sign register 715 and "1" in the zero correction sign register 714.

The one in the sign registers indicate that the sign of the weight or zero correction is plus and zeros entered in these registers represent a negative sign or weight indication. The manner in which the various signs are determined and entered into the respective registers will be apparent from the following description.

Thus, on the first cycle of the control equipment 15 after the previous weight has been removed from the scale and the scale returned to idle condition or the power turned on, 00.004 will be entered into the raw weight register 710 and a "1" indicating a plus will be entered in the weight sign register space 715. Next during this same cycle of operation of the control unit 15, the weight in the zero correction register 711 is subtracted (block 105 FIG. 2F) from the weight in the raw weight register and the difference is then re-entered in the raw weight register 710. Under these assumed conditions, zero will be subtracted from the 00.004 recorded in the raw weight register and the difference 00.004 rerecorded in the raw weight register 710.

Next the automatic zero correction limit of 00.005 pound is subtracted (block 115 FIG. 2G) from the 00.004 pound in the raw weight register and since the 00.004 pound is less, the weight indication of the scale is within the automatic zero correcting range so the control equipment will then follow additional steps required to automatically correct the 00.004 pound. Next the 00.004 pound in the raw weight register is compared with the zero or ¼ graduation range of 00.002 pound (block 117 FIG. 2G).

Both this comparison and the previous comparison may be made in any desired manner such as, for example, by means of threshold circuits of any well known and suitable type. However, in accordance with the present invention, this comparison is made by the central processor unit CPU 186 of the microcomputer or control unit 15.

Briefly, a series of orders or instructions direct the central processing unit 186 to predetermined locations in the ROM units where the limits of 00.005 and 00.002 are stored. These instructions direct the central processing unit 186 to obtain these limits and then subtract them from the weight in the raw weight register. As a result, the central processing unit 186 causes the limit 00.002 obtained from the predetermined address in the ROM to be subtracted from the 00.004 stored in the raw weight register 710. The result of this subtraction is 00.002 which is a positive number thus indicating that the magnitude of the weight in the raw weight register is not equal to or less than 0.002 pound. As a result, 12 will be entered in the zero count register 713 (block 118, FIG. 2G).

Next, the reading of 12 in the zero count register 713 is read out by the control equipment (block 120) and since this reading is less than 16, the zero count register 713 does not return to zero, the count in this register is incremented by one so that a 13 is now stored in the zero count register 713 (blocks 119 and 114, FIG. 2G).

Next, since the weight stored in the raw weight register is not 00.000 (block 132, FIG. 2G) the weight recorded in the zero correction register 711 is compared with the 0.6 pound limit for the operation of the zero correction (block 121, FIG. 2G). In performing this comparison, as above, any suitable type of comparing or threshold circuits may be employed, however, in the specific arrangement described herein, the central processing unit CPU 186 will obtain, under control of orders or instructions stored in the ROM's 188–192, the 0.6 of a pound from a predetermined location in the read only memory and then subtract the weight in the zero correction register 711 from this value. If the value in the zero correction register 711 is less than the 0.6 of a pound the zero correcting operation will continue. This limit of 0.6 pound and also the other limits of 00.005 and 00.002 pound may be changed or determined by the value stored in the read only storage device's at the predetermined locations employed for storing these values.

Since under the assumed conditions the 00.000 stored in the zero correction register is less than 0.6 pound the weight stored in the zero correction register 711 is augmented or changed by 00.001 pound (block 122, FIG. 2G) and the sign in the zero correction sign register 714 is changed to a plus.

Next a round-off operation is performed by adding 00.005 to the weight now recorded in the raw weight register 710. As a result, the weight of 00.009 is rerecorded in the raw weight register 710 (block 123, FIG. 2G).

Next the four most significant digits recorded in the raw weight register 710 which are all zeros is transferred to the output weight register 712 so that they will be available for controlling the output indication of 00.00.

During a subsequent portion of this first cycle, the 13 stored in the zero count register 713 is again read out and since this number is not 16, i.e. not 0, the ¼ graduation lamp is turned off if it was on or maintained off if it was already off. Thereafter, during the remaining portion of this first cycle of the control unit 15, other operations may be performed. However, the values stored in the various registers described above will remain until the next operating cycle of this control unit 15.

During the next cycle of operation of the control unit 15, the 00.004 weight will be registered again in a raw weight register 710 in the same manner as during the first cycle. Then the value in the zero correction register 711 which is now 00.001 pound will be subtracted from the weight in the raw weight register 710 and the difference is rerecorded in the raw weight register 710. Thus 0.003 pound is now stored or recorded in the raw weight register 710.

Next the 00.003 pound stored in the raw weight register 710 is compared with the 00.005 pound operating limit of the automatic zero correcting operation which is obtained from the read only storage units of the system. Since the result of subtracting the 00.003 pound from the 00.005 pound is positive, the plus sign remains stored in the zero correction sign register and the system continues to perform additional operations required for the automatic zero correction in accordance with the present invention.

Next the 00.003 pound stored in the raw weight register 710 is compared with the zero or ¼ graduation range in the manner described above. Thus the 00.002 pound, obtained from the read only memory at the predetermined location assigned to this limit, is subtracted from the 0.003 pound in the raw weight register 710. The result of this subtraction is a positive number, namely 00.001 pound.

Since the weight in the raw weight register is not less than 00.002 pound the control unit causes 12 to be again entered in the zero count register 713 and then this register read out as described above. Since the count is not 16, i.e. not 0, the count in the zero count register 713 is incremented by one so that 13 is now recorded in the zero count register 713. In addition, since the weight in the raw weight register 710 is not 00.000 the weight stored in the zero correction register 711 of 00.001 pound, is compared with the limits of 0.6 pound of the zero correction range by subtracting the 00.001 from the 0.6 pound. The result is positive so the weight in the zero correction register 711 is augmented by 00.001 pound.

As a result 00.002 pound is now recorded in the zero correction register 711. Next, a roundoff operation is performed by adding 00.005 pound to the 00.003 pound in the raw weight register 710 and the result 00.008 pound recorded in the raw weight register 710.

Next the four most significant digits in the raw weight register, namely 0000, are transferred to the output weight register so they will be available for controlling the display of 0000.

Also during this second cycle, the 13 recorded in the zero count register is again read out as before and since the count is not 16, i.e. not 0, the ¼ graduation lamp is maintained off.

During the remaining portion of this second cycle of the control unit 15 the information recorded in the above registers employed in the automatic zero correction operation remains substantially the same as described.

Near the beginning of the third cycle of the operation of the control unit 15, the raw weight 00.004 pound will again be registered in the raw weight register 710. Next the 00.002 pound stored in the zero correction register 711 will be subtracted from the raw weight 00.004 and the difference 00.002 pound restored in the raw weight register 710.

Next the 00.002 pound weight in the raw weight register 710 is compared with the zero correcting limit of 00.005 pound. The 00.002 pound in the raw weight register 710 is subtracted from the 00.005 pound and since the result of this subtraction is 00.003 pound the plus sign remains stored in the zero correction sign register 714 and the zero correcting operation continues.

Next, the zero or ¼ graduation range of 00.002 is subtracted from the 00.002 pound in the raw weight register 710. The resulting difference of 0 indicates that the weight in the raw weight register is equal to or less than the 00.002 pound recorded in the raw weight register 710. Consequently, the contents of the zero count register 713 is read out which is 13 as described above. Since this is less than 16 the zero count register is incremented by 1 which causes 14 to be stored in this register at this time (blocks 117, 120, 119 and 114 in FIG. 2G). Since the weight recorded in the raw weight register 710 is not 00.000, the weight of 00.002 stored in the zero correction register is compared with the 0.6 pound limit of the automatic correction range. The 00.002 is subtracted from the 0.6 pound and since the result is positive, 00.001 is added to the 00.002 pound stored in the zero correction register 711 and the sum 00.003 pound is now restored in the zero correction register 711. Next the roundoff operation is performed by adding 00.005 to the 00.002 in the raw weight register and the sum 00.007 now stored in the raw weight register 710. Next the four most significant digits of the weight recorded in the raw weight register 710. Next the four most significant digits of the weight recorded in the raw weight register is transferred to the output weight register 712 where it is available for later controlling the digital output indicator of the scale.

During this third cycle of operation the 14 now recorded in the zero count register will again be read out and since it is less than 16, the ¼ graduation lamp will remain turned off. Thereafter during the remainder of the third cycle of operation of the control unit 15 after the scale has returned to zero or normal, the information recorded in the various registers described above remains unchanged.

During the fourth cycle of operation of the control equipment 15 the raw weight of 00.004 is again stored in the raw weight register 710 and the 00.003 now stored in the zero correction register 711 is subtracted from this 00.004 and the resulting difference 00.001 pound is now stored in the raw weight register 710. This 00.001 pound is then compared with the 00.005 limit of the automatic zero correction and also with the 00.002 limit. As a result of both of these comparisons, the system works as described above since the 00.001 stored in the raw weight register is less than 00.005 limit and also less than 00.002 limit.

Since the 00.001 weight stored in the raw weight register is less than the 00.002 limit, the number stored in the zero count register 713 will be augmented by 1 so that 15 will now be stored in this register. Later, when this register is again read out, the 15 will be less than 16 so the ¼ graduation lamp will be maintained turned off.

Similarly, the 00.003 now stored in the zero correction register 711 is compared with 0.6 limit of the zero correction range and as a result 00.001 is added to the 00.003 in the zero correction register 711 and the resulting 00.004 now stored in this register. Next the roundoff operation is performed by adding 00.005 to the 00.001 in the raw weight register and the resulting 00.006 sum now stored in the raw weight register 710. Thereafter the four most significant digits 00.00 of the raw weight register 710 are moved to the weight output register 712 where they are available for controlling the output display of the scale.

As before, during the remainder of this fourth cycle of operation of the control unit 15 the information stored in the various registers employed in the zero correcting arrangement remain unchanged.

During the fifth cycle of operation of the control equipment 15 the raw weight of 00.004 pound is again stored in the raw weight register 710 and the 00.004 now stored in the zero correction register 711 subtracted from this 00.004. Resulting difference 00.000 is now stored in the raw weight register.

This weight is then compared with the 00.005 limit of the automatic zero correction range and also with the 00.002 limit.

As a result of both of these comparisons the system works substantially as described above. Briefly as a result of the comparison of the 00.000 with the 00.002 limit, the 14 now stored in the zero count register 713 is read out. Since this count is less than 16, the count is incremented by one so that thereafter 15 is stored in the zero count register 713. At this time, since the weight in the raw weight register 710 is 00.000 the weight stored in the zero correction register is not augmented but remains 00.004.

Thereafter, during the remaining portions of this fifth cycle of operation of the control unit 15, the system works substantially as described. When the 15 stored in the zero count register 713 is read out it will cause the ¼ graduation lamp to remain off because the count is less than 16.

During the next or sixth cycle of operation of the control unit 15 the system works substantially as described above except that when the zero count register is incremented it will have stored in it a count of 16. Since this register stores four binary digits, the count of 16 will cause the register to return to zero. Later when this register is again read out during this cycle of operation the 16, or zeros, recorded in the register will cause the ¼ graduation lamp to be turned on which indicates that the automatic zero correction has been made and that the scale is within ¼ graduation of the least significant display digit. This time, as pointed out above, weight displayed on the scale will be 00.00.

Thereafter during the succeeding cycles of operation of the control equipment neither 713 will be augmented; instead the contents of these registers will be maintained substantially as described above until either a weight is placed on the scale or the zero drifts or wanders. If the zero indication should drift or wander then it will be corrected in the manner described above.

Assume now that an object weighing 1 pound is placed on the scale platter or pan. As a result, the load cell together with its sensor and the analog-to-digital converter will cause a new raw weight including the zero error to be entered in the raw weight register 710.

This new raw weight will be corrected by the weight of the pan or platter as described above and as a result a weight of 01.004 will be entered in the raw weight register.

At this time, under the conditions assumed above, 00.004 is still registered in the zero correction register so this 00.004 is subtracted from the 01.004 in the raw weight register 710 and the difference 01.000 is then stored in the raw weight register 710. Next the 1 pound weight, namely 01.000, stored in the raw weight register 710 is compared with the 00.005 pound limit of the automatic zero correcting range by subtracting the 00.005 from the 01.000 pound. The result of this subtraction is positive with the result that 13 is entered in the zero count register 713, which later causes the ¼ graduation lamp to be turned off. In addition, since the 1 pound is greater than the 00.005 there is no point in comparing the 1 pound with 00.002 limit so that the control unit 15 will immediately cause the roundoff operation by adding 0.005 to the weight recorded in the raw weight register and thus cause 00.005 to be added to the 01.000 weight and cause the sum 01.005 to be stored in the raw weight register 710.

Next the four most significant digits, that is the 01.000 will be transferred to the output weight register 712 where they will control the output weight indication of the scale and thus accurately indicate the 1 pound weight or object placed on the scale platter or pan. So long as the 01.00 weight remains on the scale the above cycles of operation of the control unit 15 will be repeated. 00.004 remains stored in the zero correction register. 13 is repeatedly stored in the zero count register with the result that the ¼ graduation lamp remains turned off and 01.00 is displayed. The raw weight of 01.004 obtained from the scale is corrected by the 00.004 in the zero correction register so the correct weight 01.00 of the object on the scale is correctly displayed.

Assume now that after the object weighed above is removed from the scale, the scale now returns to −00.001 instead of to 00.004 pound. This weight −00.001 pound is entered in the raw weight register 710 after the scale has come to rest and the initial 8 pounds subtracted from the digital output of the analog-to-digital converter as described herein and a 0, indicating the minus sign, stored in the weight sign register 715.

Next, the plus 00.004 in the zero correction register 711 is algebraically subtracted from −00.001 in the raw weight register, the resulting difference is −00.005 which is stored in the raw weight register 710 and a minus sign or zero is stored in the weight sign register 715.

Next, the minus 00.005 recorded in the raw weight register 710 is compared with the 00.005 automatic zero correction limits. At this time the magnitude or absolute value of the weight in the raw weight register is compared with the limits 00.005. Since it is equal to the lower limit, the automatic zero correcting sequence of operations will be performed.

Next, the weight of −00.005 recorded in the raw weight register 710 is compared with the 00.002 pound limit. Since this weight is greater in magnitude than the limit, a 12 is now recorded in the zero count register 713 and then this register read out. Since the count is less than 16, the count is incremented by 1 so that 13 is now recorded in this register. As described above, the 13 in this register later causes the zero or ¼ graduation lamp to be turned off or maintained off if it is already off. Since the weight in the raw weight register 710 is not zero, the weight recorded in the zero correction register 711 is subtracted from the 0.6 pound limit and since the weight is less than the limit, 00.001 is subtracted from the weight in the zero correction register 711 so that 00.003 is now recorded in the zero correction register 711.

Next, the roundoff operation is performed by adding 00.005 to the weight −00.005 recorded in the raw weight register 710 and the sum 00.000 rerecorded in the raw weight register. Next the four most significant digits of this weight are transferred to the output register where the output indication will then be 0000 when the other operations required to display this number have been performed during the remaining part of this first cycle of control unit 15 after the scale has become stabilized when the previous weight was removed from the pan or platter.

During the next cycle of the control unit 15, the −00.001 pound again will be entered in the raw weight register 710 and a zero indicating minus sign of the raw weight will be entered in the weight sign register 715.

Next, the weight of 00.003 positive now recorded in the zero correction register is algebraically subtracted from the weight −00.001 in the raw weight register 710 and the resulting difference −00.004 is recorded in the raw weight register 710.

Next, this weight in the raw weight register is compared with the 00.005 pound which is the limit of the automatic zero correcting arrangement and since the absolute value of this weight is less than the limit, the sequence of operations of the automatic zero correction are continued.

Next, the weight of −00.004 pound is compared with the limit 00.002 pound and since it is more than the limit, the 12 is again recorded in the zero count register 713. The 12 is then read out of the register and since it is less than 16, 1 is added to the 12, so 13 is now stored in the register. Later the 13 causes the zero or ¼ graduation lamp to be turned off or maintained off if it is already off, as under the assumed conditions.

The weight of 00.003 pound in the zero correction register is now compared with the 0.6 pound limit of the zero correcting arrangement and since it is less, 00.001 is subtracted from the 00.003 weight recorded in the zero correcting register and the difference 00.002 rerecorded in the zero correcting register.

Next, the roundoff operation is performed and 00.005 added to the weight −00.004 in the raw weight register and the sum −00.001 rerecorded in the raw weight register. Then the four most significant digits 00.00 recorded in the output weight register so that they are available for controlling the output weight indication. At this time the minus sign is not displayed.

During the next cycle of operation of the control unit 15 substantially the same operations are repeated except that when zero correcting register 711 contents 00.002 is subtracted from the raw weight register of −00.001, the resulting difference of −00.003 is recorded in the raw weight register 710 instead of −00.004. In addition 00.001 weight is subtracted from the 00.002 in the zero correction register so the weight of 00.001 will be recorded in the zero correction register 711 instead of 00.002 as in the previous cycle of operation of the control unit 15.

During the next cycle of the control unit 15, the raw weight of −00.001 pound again is entered in the raw weight register 710. Next the weight of 0.001 pound in the zero correcting register is algebraically subtracted from the −00.001 pound in the raw weight register 710 with the result that −00.002 pound is restored in the raw weight register. The magnitude of this weight is first compared with the 00.005 limit of the automatic correcting range. Since its magnitude is less, the various steps of the automatic correction range are repeated. The magnitude of the weight of −00.002 pound in the raw weight register 710 is then compared with the limit of 00.002 pound and since it is equal to this value, the 13 now stored in the zero count register 713 is read out and since this count is less than 16 it is increased by one leaving a 14 now stored in this zero count register 713. This 14 is again later read out and employed to maintain the ¼ graduation lamp off. Thereafter weight of 00.001 in the zero correcting register is compared with the 0.6 pound of the zero correcting range and since it is less, 00.001 pound is subtracted from the 00.001 pound in the zero correcting range register and a difference 00.000 recorded in this same register. Thereafter the roundoff and transfer operations are performed as described above.

During the next cycle of operation of the control unit 15, substantially the same operations as described above are performed except that the zero correcting register 711 now has all zeros recorded in it so that the −00.001 remains recorded in the raw weight register. During this cycle of operation, the zero count register 713 is read out and since the 14 recorded in this register is less than 16, 1 is added to the contents of the register and the 15 again will be recorded in this register 713. This 15 is later read out and employed to maintain the ¼ graduation lamp turned off. In addition, 00.001 is subtracted from the zero correcting register leaving −00.001 stored in this register and a minus or zero stored in the zero sign correcting register.

During the next cycle of operation of the control unit 15, the 00.001 minus stored in the zero correcting register will be algebraically subtracted from the −00.001 pound recorded in the raw weight register 710 leaving all zeros recorded in the raw weight register. Consequently, no subtraction is made from the −00.001 pound recorded in the zero correction register. However, 1 is added to the zero count register. One is then added to the zero count register during each succeeding cycle of the control unit 15 until the predetermined number, which is 16, i.e. all zeros, in an exemplary embodiment, is stored in this register. When the 16, or all zeros is later read out of the zero count register, the control unit 15 will turn on the ¼ graduation lamp. Thereafter the contents of the various registers remains substantially as described until another article is weighed on the scale. During this time the display will correctly indicate 00.00. In addition, when the next object is weighed the zero wander of −00.001 will be corrected so the correct weight of the object will be displayed.

Assume now that for some reason after a given weighing operation the output from the scale, load cell, sensor and analog-to-digital converter returns to 00.100 pound after the weight of 8 pounds has been subtracted as described above. Consequently, the weight of 00.100 pound will be entered in the raw weight register 710. In addition, a "1" representing a plus weight on the scale will be entered in the weight sign register 715.

Next, the weight in the zero correction register 711, assuming this weight to be 00.003 pound, will be subtracted from the weight in the raw weight register 710 and the difference 00.097 pound restored in the raw weight register. Next, the weight of 00.097 pound now recorded in the raw weight register 710 is compared with the automatic zero correction limit of 00.005 pound. Since the weight in the raw weight register 710 is greater than 00.005 pound, the automatic zero correcting operations are not performed and 13 is recorded in the zero count register, which later causes the ¼ graduation lamp to be turned off, or maintained off if it had previously been turned off.

Next, the weight in the raw weight register 710 is rounded off by adding 00.005 pound to the 00.097 pound recorded in this register. The sum of 00.102 pound is then rerecorded in the raw weight register and the four most significant digits 00.10 are entered in the output register 712 where it is available for actuating the output indication of the scale.

The information recorded in the various registers then remains substantially as described for the remainder of this cycle of operation of the control unit 15.

During each of the succeeding cycles of the control unit 15, the operations of the equipment relative to the raw weight register 710, the weight sign register 715, the zero correction register 711, the zero correction sign register 714 and the zero count register 713 and the weight output register 712 are substantially as described above.

However, the attendant or operator of the scale upon noting the 00.10 weight indicated on the output of the scale will be informed that the scale is not in condition for another weighing operation. At this time the operator may operate the zero expand range switch 176 to cause the scale to be corrected so that it will be in condition to accurately weigh the next object placed upon the pan or platter.

On the next cycle of operation of the control unit 15, after the zero capture range expand switch 176 or button has been operated, the weight of 00.100 pound will be entered in the raw weight register 710. In addition, a "1" representing a plus sign is entered in the weight sign register 715. Also at this time 00.003 is stored in the zero correction register 711 and a "1" indicating a plus sign is stored in the zero correction sign register 714.

With the zero capture range expand switch operated and the 00.100 pound entered in the raw weight register 710, the central processing unit 186 will cause the weight entered in the raw weight register to be compared with 0.6 pound which is the assumed limit of the zero correction range.

Since under the assumed conditions the weight of 00.100 pound is less than 0.6 pound, the central processing unit 186 will cause a weight of 00.100 pound in the raw weight register 710 to be transferred to the zero correction register 711. As a result, 00.100 will now be stored in the zero correction register 711 and then this weight is subtracted from the weight of the raw weight register 710 with the result that 00.000 will now be stored in the raw weight register 710.

Next, the weight 00.000 in the raw weight register 710 is compared with the automatic zero correcting range of 0.005 pound and since it is less than this limit, the zero correcting operation will be performed in the manner described above and the 00.00 indication transferred to the output weight register. Also, the ¼ graduation lamp will be turned on as described above.

So long as the expand button or switch 176 is operated, the above cycles of operation are repeated. When this button or switch is released, the weight stored in the zero correcting register 711 will correct the weight in the raw weight register 710 so that the corrected weight will be within the 00.005 pound correcting limits. Consequently, the above-described zero correcting operations are performed and the correct weight of an object, within the capacity of the scale, is correctly displayed.

Again, so long as the various factors affecting the zero indication of the scale do not vary more than 00.005 pound, the control arrangement 15 operates as described above and maintains the scale zero indication accurately at zero so that the scale will accurately weigh various objects or commodities placed on its platter or pan. If the zero wander effects exceed the 00.005 pound but do not exceed the 0.6 pound, then these effects can be corrected by the operator or attendant operating the zero capture range expand switch 176 and the scale is corrected as described above.

The zero capture range expand switch 176 together with the zero correcting operation of the scale may be employed as a self-correcting tare arrangement so long as the weight of the container is less than 0.6 pound and so long as variations from container to container, plus zero wander effects of the scale described above, do not exceed 00.005 pound.

Thus, assume that an empty container weighing 00.15 pound is placed on the scale. The scale will indicate this weight of 00.15 pound accurately providing, of course, the automatic zero correcting arrangement was operating satisfactorily and the ¼ graduation lamp turned on prior to placing the container on the platter or pan of the scale. The operator or attendant will now operate the zero capture range expand switch 176 which will correct for the weight of the empty container and cause the scale to indicate a zero output. The attendant may then fill the container with a commodity and the scale will indicate accurately the correct weight of the commodity only and compute its cost if it is so desired. Upon removing the filled container from the scale, the scale will now indicate −00.15 pound, assuming no zero wander effects. If the attendant or operator now places another similar container on the scale of the same weight as the previous container, then the scale indication will return to zero and the automatic zero correcting operations performed providing, of course, that the variation in weight of the containers plus the variation in any zero wander effects are less than 0.005 pound. If, however, the variations are greater than 00.005 pound, the ¼ graduation lamp will not light and the indication on the scale will not return to zero. The attendant can then re-operate the zero expand range switch and cause the scale to automatically correct thereafter for automatic zero variations in the manner described herein.

If, of course, the weight of the container or variations in the weight of the container and the zero wander exceed the predetermined operating limits described above, then the operator or attendant can use the usual tare buttons or keys and operate the scale in accordance with prior art arrangements without employing the automatic zero correcting arrangement in accordance with the present invention.

As indicated above, the various limits of 00.002, 00.005 and 00.600 have been selected to illustrate the invention and may be changed as desired for various applications or uses of the scale.

ZERO EXPAND

It is desirable to frequently check the operation of the automatic zero and the amount of correction that is being introduced by the automatic zero in the manner described above. To enable the amount of automatic zero correction being applied to be readily determined, a zero expand switch 178 (FIG. 3) is provided. When this switch is operated, it prevents the operation of the automatic zero correction. In addition, on the next cycle of the control equipment 15, if this cycle is not one in which weight is read out of the analog-to-digital converter and entered into the raw weight register 710, then when the program advances to block 84, it will test this zero expand switch and, finding it operated or true, control is then advanced to block 85 which sets the interlock flag INTF. In other words, it causes a "1" to be stored in the status register space 736. Later in this same cycle of operation of the control equipment 15, the control is advanced to block 57 as described above with the result that the interlock flag is tested. That is, the "1" stored in the register space 736 is read out and since it is a "1", the control is then advanced to block 58 which clears the interlock flag INTF by entering a zero in the register space 736 and, in addition, sets or enters a "1" in the initialize register space 727.

Thereafter, the control advances to block 59 at which a "1" is entered in the storage space 737. The control then advances to block 66 over the transfer C5. With these changes the above cycles of operation of the control equipment 15 are then repeated until a cycle in which the raw weight is read out of the analog-to-digital converter and stored in the raw weight register 710. During this cycle the control is advanced to block 100 in the manner described herein and since the zero expand switch is now pressed or turned on, control is then advanced to block 101 where the four least significant digits in the raw weight register 710 are read out and moved to the weight out register 712 where they later are caused to actuate the readout or display of the system which will then indicate these four least significant digits of the raw weight read into the raw weight register and thus indicate the amount of correction being applied to the system by the automatic zero correction arrangement.

When the zero expand switch 178 is restored to normal, it is then necessary to initialize the system and to check the price per pound, the tare and finally to operate the lock switch 179 indicating that all the necessary information is available for the next weighing operation.

TIMED TARE ENTRY

Each time the program is transferred to block 144 the control apparatus tests the "no tare" switch 171 (FIG. 3) to determine whether or not this switch is operated. If the switch 171 is operated, then the program sets the interlock flag INTF and transfers to block 145 which causes the tare register 720 to be cleared or restored to zero and then the program advances to block 55 via transfer B10 and the cycle of operation is completed as described above.

If the "no tare" switch 171 is not pushed or operated as previously assumed, then the control is advanced to block 146 where all of the other tare keys are tested to determine if any of them are operated. If none are operated the sequence transfers to block 55 and the cycle completed as described above. If some one of these keys is operated, for example the tare key 0.1 pound, then the control is advanced to block 147 instead of to block 55 via transfer B10 as described above. Block 147 determines whether or not 2.6 seconds has elapsed since another tare button was pushed. It is assumed that this is the first tare button to be pushed, then 2.6 seconds will have elapsed since a previous tare button is pushed. Consequently, the tare timer spaces 728 will have all zeros stored in them so the program is advanced to block 148 where tare register 720 is cleared or returned to zero. Thereafter the control is advanced to block 149 where the 0.1 pound is entered in the tare register 720 and the interlock flag is set by entering one in storage space 736. Thereafter the program is advanced to block 55 via transfer B10 and the cycle of operation continued in the manner described above.

In addition to entering the tare weight in the tare register space 720, the tare timer is set into operation as stated in block 149. This is accomplished by entering 13 in this tare timer space 728. Then on each of the cycles during which a weight is transferred from the analog-to-digital converter to the raw weight register 710, 1 is subtracted from the number stored in the tare timer 728 as indicated in blocks 96, 97 and 97A as described above. After 13 of such cycles, 2.6 seconds have elapsed.

If another one of the tare keys is operated in this 2.6 second period, then the control is transferred from block 147 directly to block 149 where the value of the second operated tare key is entered in the tare storage spaces 720. Also, the tare timer is reset or recycled by again entering 13 in the tare timer storage spaces 728. Thus for example if the tare key 0.05 is actuated, then this figure will be entered in the tare register 720 with the result that the register now has entered in it a tare weight of 0.15 pound. Thereafter the interlock and initializing conditions must be checked and the lock switch 179 must be operated in order to condition the system for weighing operations involving subtracting tare weights as described herein.

If, however, the second key is operated 2.6 seconds after the previous key then the next time the control sequence advances to block 147 in the manner described above, the sequence transfers to block 148 which clears the tare storage areas and then to block 149 so that the weight represented by only the last tare key operated is stored in the tare storage areas 720.

OUTPUT CONTROL

When a package has been placed on the scale platter and weighed, and the weight corrected after a no motion condition has been established as described herein, control will be transferred to block 26 via transfer C5 to block 66 and then to block 26. The "MOTNF" flag is cleared at this time so block 26 will transfer control to block 27. Block 27 interrogates the printer mode switch 172 (FIG. 3) and branches around block 28 to block 29 if the system is in either the demand or the continuous mode. Since we are assuming single mode, block 27 transfers control to block 28.

Block 28 interrogates the status storage space 729 status register 0001. This signal is true if, during the input operations a motion detector inhibit switch in the printer is on. This switch is provided so that systems which are in vibratory installations (heavy machinery causing floor vibrations or overhead fans, for example) can have the switch turned on to guarantee only one label per weight application. If the switch is "on", control is transferred to block 29.

Block 29 examines the status of a reweigh storage space 740 of status register 0001. A one or true of this reweigh signal is an indication that the previous printer operation was aborted due to a set-up malfunction. If there was a malfunction, block 29 transfers control to block 31 via A7 (this allows another print to be initiated for the same package to allow the printer to rectify the error). If there is no reweigh, block 29 transfers control to block 30. Block 30 interrogates the status of storage space 730 of status register 0001. A true or one in this location indicates that a print has occurred and the printed label has not been removed. If this condition exists, block 30 transfers control to block 25 via connector A1. Thus no print occurs during this motion-no motion sequence. (Motion Detector Inhibit)

If a zero is stored in the print storage space in the status register 0001, block 30 transfers data to block 31 and, providing other conditions are fulfilled, a label is printed.

Blocks 28 through 30 comprise a system whereby only one label per weight application is allowed, unless the printer malfunctions, in which case a subsequent motion-no motion cycle will be recognized.

If the motion detector inhibit switch is not on, block 28 transfers control to block 31 directly; thus allowing a new printer cycle for each motion-no motion detected.

Blocks 31 through 33 allow the printing of a label with the applied weight being below a preselected minimum value (in this example, 0.10 pound). The need of the minimum value inhibit is that if none were present, the system would be printing labels with zero weight on the platter, an undesirable condition. The ability to print labels with applied weights below the predetermined value is necessary for tests.

If the unit price is set to zero and the no tare key is depressed, an output print signal is generated when a motion-no motion cycle occurs, regardless of the applied weight. Block 31 interrogates the "no tare" switch 171 for a no tare signal. If this condition exists, control is transferred to block 32 which interrogates SW–.OP through SW–.PO (FIG. 7). If the price is zero as indicated by SW–.OP through SW–.PO, all being zero, control is transferred to block 33 which causes a "1" to be stored in the status storage space 731 of status register 0011 and the printer will generate a label. Block 33 then transfers control to block 25 via A1.

If either block 31 or block 32 are not true, control is transferred to block 34. Block 34 interrogates the output weight register 712 (FIG. 7). If the weight is less than 0.1 pound, control is returned to block 25 via A1. If the net weight is greater than 0.1 pound, control is transferred to block 35.

Block 35 interrogates set bit space 737 in status register 0011. If set is true (an indication that interlocks are not satisfied) control is returned to block 25 via A1. If set is false, control is transferred to block 36.

In the weight processing description, the method of processing the raw weight information into net weight output information was described. At that time, it was shown that the value in the output weight register is the magnitude only of the weight. Thus the weight could be greater than 0.1 pound but be negative, in which case no print should occur. Block 36 interrogates the weight sign storage space 715 in status register 0011 of FIG. 7. If the signal is false (indicating a minus weight) control is returned to block 25. If the signal is true, the system control transfers to block 37.

Block 37 interrogates the level of the signal in storage space 725 in status register 0011 (FIG. 7). If this signal is true (an indication that the applied weight exceeds the capacity of the weight converter) system control returns to block 25 via A1. If the scale weighing capacity is not exceeded, control transfers to block 38.

Block 38 generates an output pulse similar to block 33. Control is then transferred to block 25 via transfer A1.

As previously described, block 134 is activated by transfer from block 130 via transfer H1. Block 134 interrogates the blank price signal from the printer into the input of ROM 191 (see FIG. 4A). If this signal is off, block 134 bypasses block 135 and transfers control to block 136 via transfer H3. If the signal is on, block 134 advances control to block 135. Block 135 causes all bits of all words in the output price register 739 (FIG. 7) to be changed to "1's" (binary 15 causes blanks in the printer). Control is then transferred to block 136.

Block 136 interrogates the blank weight signal from the printer into the input of ROM 191 (see FIG. 4A). When this signal is off, control is transferred to block 139. When on, control is transferred to block 137. When the system is operated in the price by count mode, the normal function is to blank the weight field on the printed ticket. Thus, a blank weight off signal must cause the weight to be blanked and vice versa. The purpose of blocks 137 and 139 is to invert the sense of the blank weight switch when operating in price by count.

Thus, if block 136 enables block 137 and the system is in price by count, block 138 is bypassed. If block 139 is activated instead, block 138 is not bypassed. However, since this discussion is limited to by weight operation, a true in block 136 ultimately transfers control to block 138. Block 138 causes all data in the output weight register 712 to be forced to a 15 (blank) level. Control is then transferred to block 140. A false in block 136 bypasses block 138 and transfers control to block 140 through block 139 via connector H6.

Blocks 140 and 141 perform the same blanking function on the output value register 741 (FIG. 7) based on the level of the blank value signal into the ROM 191 (FIG. 4A) and then transfers control to block 69 via transfer D1.

Note that the blanking switches are located in the printer but this is for convenience only; any location is acceptable.

Referring to FIG. 2D, the description of the service switch function follows. With a system as complex as this, it is desirable to provide some trouble isolation capabilities to improve the serviceability.

APPARATUS FOR ISOLATING ERRORS IN PRINTED RECORDS

Since the most probable failure will be incorrect price, weight or value data on the printed label, a series of serviceman controlled inputs are provided. The most basic ones allow the serviceman to select which of these three fields (price, weight or total value) he wishes to have displayed in the weight display area. In this manner, he can determine if the fault is in the scale, as indicated by faulty output information, or if the fault is in the printer, as indicated by correct output information but a faulty printed ticket.

Figure 5:
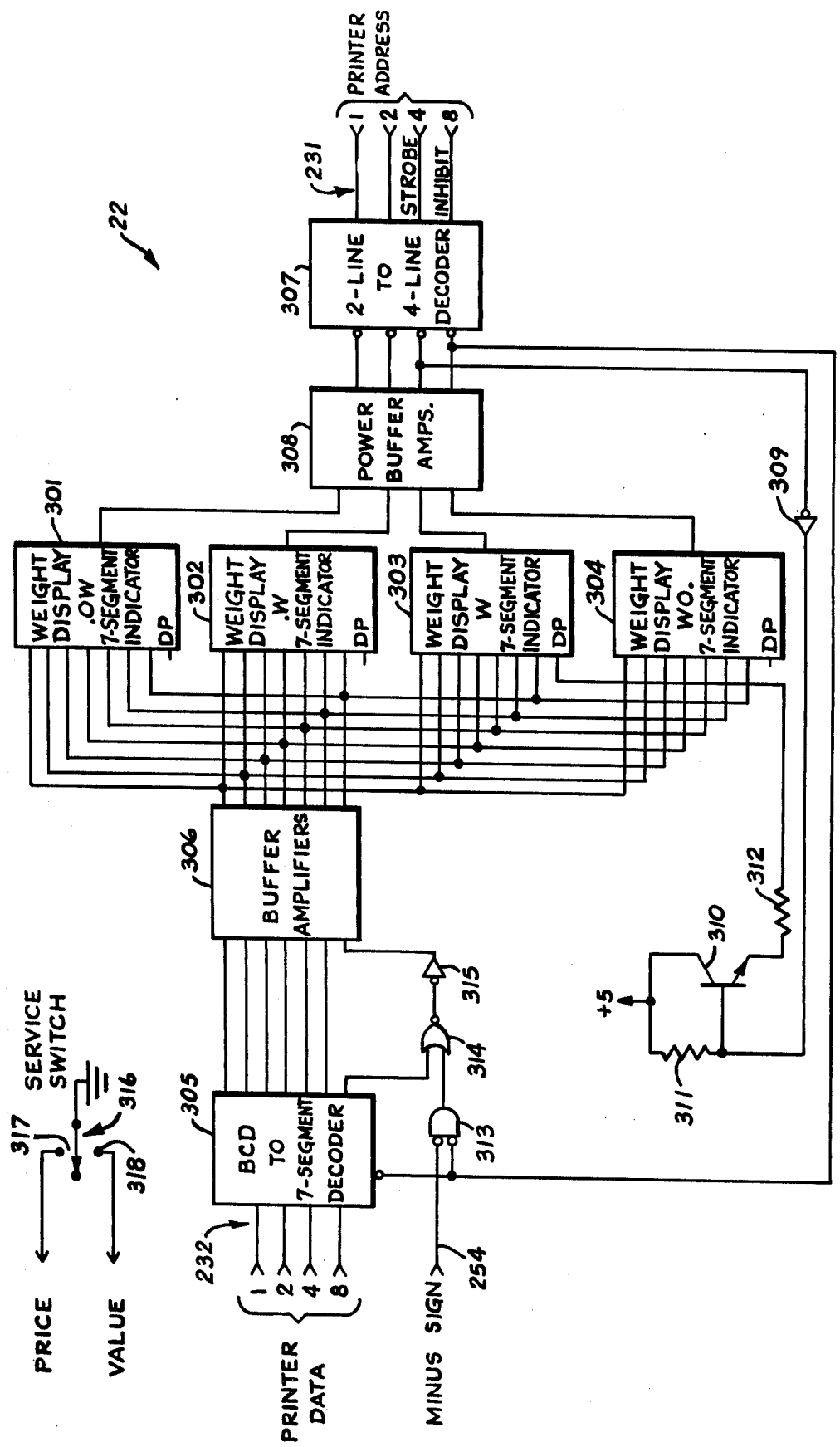
FIG. 5 is a schematic logic diagram showing multiplexing circuitry for supplying data to a digital weight display.

In FIG. 5, it has been shown how the weight information is selected from the series of information being transmitted.

By supplying service switches whereby price or value information is placed in the weight output register 712, the digital display can be made to indicate price, weight or value as computed by the system and thus simplify fault isolation.

Referring to FIG. 2D, block 69 interrogates status register space 733 in status register 0001. During the input cycle, the condition of the price input to input 4 of data selector 199 (FIG. 4B) has been stored in this location. If block 69 determines that the display price signal is true, i.e. a one is stored in 733, control transfers to block 70 and the signal contents of the output price register 739 are transferred to the output weight register 712 (FIG. 7). Thus the digital display will indicate price and if there is a discrepancy between the setting of the price entry equipment and the displayed value, the serviceman can observe this and proceed to determine the cause of the fault, having localized it. Block 70 transfers control to block 73.

If block 69 determines that the display price signal is false, i.e. a zero is stored in 733, control is transferred to block 71. Block 71 interrogates status register space 734 of status register 0001 which has been set up to coincide with the value input to input 4 of data selector 200 in FIG. 4B. If the display value is true, block 71 transfers control to block 72. Block 72 transfers the contents of the output value register 741 into the output weight register 712 (FIG. 7) and then transfers control to block 73. Thus the digital display indicates the computed value for fault isolation testing.

If block 71 senses that the display value signal is false, block 72 is bypassed and control is transferred to block 73 via transfer D3.

Block 73 transfers a signal to wire 273 of FIGS. 4A, 4B and 4C based on the signals in word 0 of status registers 0000 to either illuminate or extinguish the zero limit indicator (FIG. 4C). Control is then transferred to block 74. Block 74 updates the signals in the 4 × 16 bit RAM 228 of FIG. 4B (price, weight, value data and printer control) and also updates the signals out of quad bistable latches 248 of FIG. 4C. Control then transfers to block 75.

Block 75 checks the multiplied result register 742 of FIG. 7 and transfers control to block 76 if the answer obtained by multiplying the output price by the output weight is equal to or greater than $100.00. Block 76 trues space 732 in status register 0011. This signal is used elsewhere to indicate an out of range condition by causing the output value register 741 to be set to zero by means not shown. Other uses of this overvalue signal could be to illuminate a warning light and to prevent a print pulse. Block 76 transfers control to block 77.

If the computed value is less than $100.00, block 75 transfers control directly to block 77 via tranfer D7, bypassing block 76.

Block 77 determines if the capacity of the analog-to-digital weight converter 14 has been exceeded. If so, control is transferred to block 78 which stores a one in status register space 725 in status register 0011. This signal will be transferred to the quad bistable latch 248 (FIG. 4C) to set output D to illuminate the out of range indicator during the next performance of block 74.

Block 78 then transfers control to block 66 via transfer C5. If the weight converter capacity is not exceeded, block 77 transfers control to block 66 via connector C5. The system continues with the performance of block 66 and subsequent blocks as described previously.

Turning now to FIG. 5, the digital weight display 22 is shown in detail. The weight display 22 includes four seven-segment indicators 301–304. The indicators are arranged in a row on a front panel on the apparatus 10 with the indicator 301 displaying the hundredths or 0.0W pound weight digit, the indicator 302 displaying the tenths or 0.W0 pound weight digit, the indicator 303 displaying the units or W.00 pound weight digit and the indicator 304 displaying the tens or W0.00 pounds weight digit. The indicators 301–304 may be of any conventional seven-segment design, such as of a type using incandescent lamps or of a type using light emitting diodes. Of course, other types of digital indicators may also be used. A multiplexing technique is used for sequentially supplying data to the four indicators 301–304. Only one of the four indicators is actually energized at any given instance. However, the indicators 301–304 are energized at a sufficiently fast rate as to appear to be continuously energized.

The printer data on the buses 232 from the RAM 228 is supplied through a BCD-to-seven-segment decoder 305 and seven buffer amplifiers 306 in parallel to each of the four indicators 301–304. The printer address buses 231 are used for supplying address data for scanning the four weight display indicators 301–304. The address buses 231 are connected to a 2-line to 4-line decoder 307. Two of the address buses 231 determine which of the four indicators 301–304 is to be energized as weight data is received on the buses 232, while a third bus provides a strobe signal and a fourth of the buses provides an inhibit signal. The decoder 307 has four outputs which pass through four buffer amplifiers 308 to enable inputs on the four weight indicators 301–304. The output form the decoder 307 for energizing the units weight display 303 also applies a signal for energizing a decimal point on the units weight display 303. This output is applied through an inverter 309 to a buffer amplifier comprising a transistor 310 and a bias resistor 311. The output from the transistor 310 is connected through a resistor 312 to the decimal point input on the indicator 303. Thus, whenever the units indicator 303 is enabled, a decimal point is illuminated.

The apparatus 10 is designed for indicating weights ranging from −2 pounds up to +30 pounds. In the event that the measured weight goes below zero, a minus sign is formed by illuminating the center element in the tens indicator 304. This is accomplished by connecting the output from the decoder 307 which enables the indicator 304 to a NAND gate 313. The minus sign signal on the line 254 from the logic unit 15 is applied to a second input on the gate 313. The output of the NAND gate is connected through a NOR gate 314 and an inverter 315 to the input on the buffer amplifiers 306 which energizes the segment in the indicator 304 used to form the minus sign. The output from the BCD-to-seven-segment decoder 305 which normally energizes this segment of the weight indicators 301–304 is also connected through the NOR gate 314 to the buffer amplifiers 306. Thus, the middle segment in the other indicators 301–303 and in the indicator 304 when a positive weight is read is energized by the output of the decoder 305 passing through the gate 314 and the inverter 315 to the buffer amplifiers 306.

Although it is not normally exposed to an operator of the apparatus 10, a service switch 316 is shown with the weight display 22. The service switch 316 is a normally open switch having a momentary price contact 317 and a momentary value contact 318. When the service switch 316 is moved to a position wherein the price contact 317 is grounded, the line four input to the 8-line to 1-line decoder 199 (FIG. 4B) is grounded. When this occurs, the strobe signal on the readout address buses 231 is changed to strobe the weight indicators 301–304 while price data is present on the printer data buses 232. Similarly, when the service switch 316 is moved to ground the value contact 318, the line four input of the 8-line to 1-line decoder 200 (FIG. 4B) is grounded. When this occurs, the strobe signal to the decoder 307 is synchronized with the computed value data on the printer data buses 232 causing the indicators 301–304 to display the computed value. As previously indicated, this permits maintenance personnel to isolate an error in a printed label between the printer 21 and the logic unit 15. If the weight indicators 301–304 display a correct price per unit weight or a correct value for an article, then an error in the printed label will be isolated to the printer 21. However, if the indicators 301–304 display the same error present on the printed label, then the error is isolated to either the logic unit 15 or to one of the data inputs to the logic unit 15.

Figure 6:
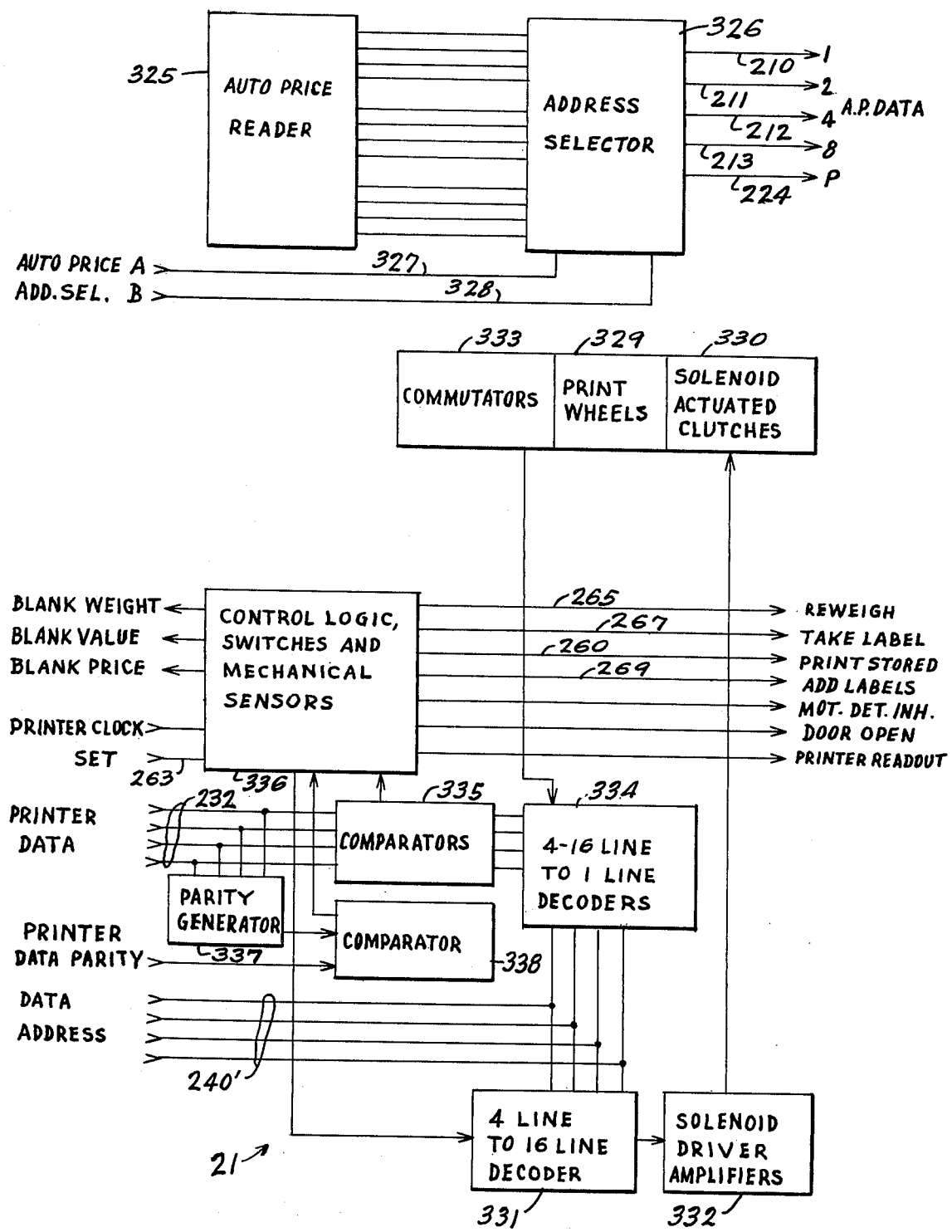
FIG. 6 is a block diagram of a printer for use in apparatus according to the present invention.

The printer 21 may be of any conventional design suitable for use with weighing and price computing apparatus. One typical printer design is shown in U.S. Pat. No. 3,163,247 which issued on Dec. 29, 1964 to R. E. Bell et al. However, a preferred arrangement for the printer 21 is shown diagrammatically in the block diagram of FIG. 6. As previously indicated, the printer 21 includes apparatus for automatically entering price data into the logic unit 15. The auto-price apparatus includes an auto-price reader 325 which includes an optical reader for reading three digits of price data from a commodity plate. The commodity plate also includes raised type for printing on the labels the name of the commodity. The three binary coded decimal price digits from the auto-price reader 325 are applied through a data selector 326 to the four auto-price data lines 210–213 which are connected to the line one inputs of the 8-line to 1-line decoders 198–201 of FIG. 4B. The data selector 326 may also include apparatus such as exclusive OR gates connected for generating an auto-price parity bit on an output 224 connected to the line six input to the decoder 200. An alternate and preferred method for producing an auto-price parity bit is to store the parity information directly on the commodity plate for reading by the auto-price reader 325. The actual auto-price digit supplied from the reader 325 through the data selector 326 to the lines 210–213 is determined by signals on two auto-price address selection lines 327 and 328 (from FIG. 4C). Signals on the address selection lines 327 and 328 are received from the address buses 206 from the ROM 190 in the control unit 15. Thus, when a commodity plate is inserted within the auto-price reader 325, the address selector 326 applies one digit at a time of the price per pound data on the lines 210–213 depending upon an address selection signal received on the lines 327 and 328.

The three digits of the price per unit weight for an article being labeled, the four weight digits and the four value digits are printed on the label by means of print wheels 329. Each of the print wheels 329 is connected through a solenoid actuated clutch 330 to a common drive shaft. Outputs 240' from the printer data address amplifiers 240 (FIG. 4B) are applied to a 4-line to 16-line decoder 331. Eleven of the output lines from the decoder 331 are used for selecting the 11 clutch solenoids 330 which selectively engage the 11 print wheels 329 with the drive shaft. The outputs from the decoder 331 are connected through solenoid driver amplifiers 332 which power the clutch solenoids 330. Thus, when address data is received on the lines 240', one of the solenoid clutches 330 is addressed for engaging the associated print wheel 329 with the drive shaft.

Each print wheel 329 is provided with a commutator 333 which rotates with and indicates the position of the print wheel. The commutators 333 are connected to four 16-line to 1-line decoders 334. The decoders 334 have BCD output corresponding to the digit to which an addressed print wheel is positioned. Address information is supplied to the decoders 334 from the data address lines 240'. The BCD output from the decoders 334 is applied to one input of a four bit comparator or coincidence circuit 335. The printer data on the buses 232 from the RAM 228 (FIG. 4B) in the control unit 15 is applied to a second input of the comparators 335. When an addressed print wheel 329 is driven to a desired number, the output of the decoders 334 will correspond to the printer data on the buses 232 and the comparators 335 will apply a coincidence signal to control logic 336. When coincidence occurs, power is removed from the energized clutch solenoid 330.

The printer data on the buses 232 is also applied to a parity generator 337 which generates a parity bit in a conventional manner, such as with three exclusive OR gates. The parity bit from the generator 337 is applied to a comparator 338, which may also be an exclusive OR gate, where it is compared with the printer data parity bit from the printer data parity generator comprising the exclusive OR gates 233–235 (FIG. 4B) in the control unit 15. If there is no parity check, the control logic 336 applies a REWEIGH signal on the line 265 for recycling the control unit 15. The control logic 336 also includes various switches and mechanical sensors as well as inputs from and outputs to the control unit 15. The printer clock input is obtained from the inverter 244 and the SET input on line 263 from an inverter 262. Outputs from the control logic 336 include the REWEIGH line 265, the take label line 267, the print stored line 260, the add labels line 269, a motion detector inhibit line connected to the line five input to the decoder 198 in the control unit 15, the door open interlock connected to the line four input to the decoder 201, a printer readout on/off output connected to the NAND gate 250 (FIG. 4C) and the blank weight, blank value and blank price signals to the ROM 191. The manner in which these outputs are generated is known in the art and will not be covered in further detail.

The above-described features of the exemplary embodiment permit the apparatus 10 to weigh articles, compute an article value and print an article label with a speed and accuracy heretofore not possible. Furthermore, the accuracy of the apparatus 10 is maintained over a long period of time, despite changes in component parameters caused by ageing and changes in temperature.

In the exemplary embodiment of the apparatus 10 described above, weight measurements were in pounds and value was computed in dollars. It will be appreciated by those of ordinary skill in the art that the apparatus 10 may be readily adapted for other weight units, such as kilograms, and to other monetary units. The number of weight, price per unit weight and computed value digits also may be changed to meet any requirements for the apparatus 10. Also, changes may be readily made in the degree or band of motion to which the motion detector is responsive and in the operating range and increments of the automatic zeroing circuit.

The apparatus 10 has been described as generating a predetermined number of significant weight digits, e.g., for significant weight digits for weights of from 0.01 pound up to 30.00 pounds. However, any other number of digits may be generated and employed and any other weight and price limits employed as may be necessary or desirable. These weight digits are displayed, printed on labels and used in computing values. In addition, at least one more least significant digit is generated for use in automatically and manually zeroing the apparatus 10 and in motion detection. Although such additional least significant digit has been described as a decimal, it will be apparent that it may be of other fractional units such as one-third or one-fifth of the least significant one of the predetermined number of significant weight digits. If an odd fractional increment, such as one-third, is generated, then the scale zero will be centered and the automatic zero correction factor will generally not change except for compensating for any slow drift in the zero.

In describing the zero expansion circuitry, it has been stated that the additional least significant weight digit is stored in the weight output memory during actuation of the zero expand switch 178 so that this digit will appear on the weight display 22. In an alternative embodiment, a separate indicator may be provided for displaying the additional least significant weight digit. This indicator will normally be blanked and will be energized only when the zero expand switch 178 is actuated. It will be appreciated that various other changes may also be made in the above-described inventions without departing from the spirit and the scope of the following claims.

A P P E N D I X

```
SYMBOL TABLE

ACLR1   001201
ADD     000485
ARICL   001196
A1      000527
A10     000765
A11     000780
A12     000858
A12LK   000512
A13     000927
A14     000915
A15     000947
A16     000930
A17     000938
A18     000953
A19     001045
A2      000537
A20     001059
A21     001067
A24     001032
A25     001034
A27     000894
A28     001053
A3      000547
A4      001072
A5      000543
A6      001080
A7      000798
A7A     000813
A7B     000808
A8      000705
A8A     000739
A9      000762
BLANK   001187
BLNK1   001190
B1      000637
B2      000643
B3      000644
B4      001123
CALC    000514
CLATF   001182
C1      000074
C10     000188
```

-continued

```
SYMBOL TABLE

C12     000229
C13     000191
C14     000214
C15     000215
C2      000114
C20     000252
C21     000223
C22     000250
C3      000129
C4      000133
C5      000186
C6      000150
C7      000156
C8      000171
C9      000174
DGSCH   001069
ENTAT   001156
EWSGN   000422
INTCK   000067
INTLK   000535
LATCH   000345
LDTAR   001081
LTCH1   000353
MCHK    000000
MCHK1   000008
MINMI   000482
MOTCK   000569
MOTN    000656
MOVA    000406
MOVB    000413
MOV4    000418
MOV5    000404
M1      000964
M2      000969
M3      000979
M4      000981
M6      000993
M7      000999
NMCHK   000014
NOTAR   001151
OUTA    000268
OUTB    000273
OUTC    000275
OUTPT   000256
OUT1    000298
OUT2    000308
PCHK    000037
PCHK1   000030
PCHK2   000063
PCHK3   001214
PCHK4   001248
PCHK5   001238
RDINP   001206
RETN    000390
RNDOF   000362
ROFF1   000366
SDONE   000498
SUB     000448
SUBAZ   000375
SUBDI   000669
SUBTR   000432
SUB1    000453
SWSGN   000391
TAR1    001088
TAR2    001098
TIMCK   001138
UDTGT   000663
```

PROGRAM

```
0000 00040 MCHK,     FIM  P4   11000B    /INIT CONSTANT POINTERS
     00024
0002 00042          FIM  P5   110011B
     00051
0004 00044          FIM  P6   10
     00010
0006 00046          FIM  P7   101001B
     00041
0008 00082 MCHK1,   JMS  CALC
     00002
0010 00043          SRC  P5
0011 00239          RD3            /READ MOTIONF
0012 00020          JCN  AZ   MCHK1 /LOOP UNTIL MOTION
     00008
0014 00082 NMCHK,   JMS  CALC
     00002
0016 00043          SRC  P5
0017 00239          RD3            /READ MOTION F
0018 00028          JCN  AN   NMCHK /LOOP UNTIL NO MOTION
     00014
0020 00047          SRC  P7
0021 00233          RDM            /READ PRINT MODE
0022 00246          RAR            /C SET IF MODE 2
0023 00041          SRC  P4
0024 00018          JCN  CN   PCHK1 /JMP IF DEM OR CONT
     00030
0026 00237          RD1
0027 00246          RAR            /PUT MOT DET INH IN C
0028 00026          JCN  CZ   PCHK  /JMP IF NOT TRUE
     00037
0030 00238 PCHK1,   RD2
0031 00246          RAR            /PUT REWEIGH IN C
0032 00018          JCN  CN   PCHK  /JMP IF HAVE REWEIGH
     00037
0034 00246          RAR            /PUT PRINT STORED IN C
0035 00018          JCN  CN   MCHK  /DO NOT PRINT IF TRUE
     00000
0037 00068 PCHK,    JUN  PCHK3     /CHK FOR NO TARE BUTTON
     00190
0039 00034          FIM  P1   11101B    /SELECT DIGIT FOR
     00029
0041 00035          SRC  P1        /.1 LB CHK
0042 00209          LDM  1
0043 00224          WRM
0044 00034          FIM  P1   11011B
     00027
0046 00036          FIM  P2   0
     00000
0048 00081          JMS  EWSGN     /SUB .1 LB FROM WGT
     00166
0050 00028          JCN  AN   MCHK  /JMP IF WGT LT .1 LB
     00000
0052 00043          SRC  P5
0053 00236          RD0            /RD SET, MINUS, OVERCAP
0054 00028          JCN  AN   MCHK  /JMP IF ANY TRUE
     00000
0056 00238          RD2
0057 00246          RAR
0058 00250          STC            /SET PRINT
0059 00245          RAL
0060 00230          WR2
0061 00081          JMS  OUTPT     /OUTPUT TO BUFFER
     00000
0063 00043 PCHK2,   SRC  P5
0064 00240          CLB            /CLR PRINT
0065 00230          WR2
0066 00061          JIN  P6
0067 00034 INTCK,   FIM  P1   100000B
     00032
0069 00032          FIM  P0   1100100B   /R0=10 CNTR, R1=4
     00100
0071 00045          SRC  P6
```

-continued

```
0072 00240           CLB                  /LOAD A 0000
0073 00225           WMP                  /0000 SELECTS ROTARY SW INP
0074 00163    C1,    LD    R3             /LOAD SWITCH POINTER
0075 00047           SRC   P7
0076 00226           WRR                  /SELECT SWITCH
0077 00045           SRC   P6
0078 00234           RDR
0079 00035           SRC   P1             /WRITE SW INP TO MEM REG 2
0080 00224           WRM
0081 00099           INC   R3             /INC POINTER
0082 00112           ISZ   R0    C1       /LOOP 10 TIMES
     00074
0084 00084           JMS   RDINP          /READ DISCRETE INPUTS
     00182
0086 00239           RD3                  /READ STARTS AT ADD. 4
0087 00228           WR0
0088 00084           JMS   RDINP
     00182
0090 00239           RD3
0091 00229           WR1
0092 00084           JMS   RDINP
     00182
0094 00239           RD3
0095 00230           WR2
0096 00084           JMS   RDINP
     00182
0098 00237           RD1
0099 00245           RAL
0100 00245           RAL                  /PUT PRICE RITE/MAN IN C
0101 00047           SRC   P7
0102 00237           RD1             /READ BY CNT
0103 00028           JCN   AN   C6+2      /JMP IF IN BY CNT
     00152
0105 00236           RD0                  /READ PRICE RITEF
0106 00026           JCN   CZ   C6        /JMP IF IN MAN
     00150
0108 00020           JCN   AZ   C5        /JMP IF MODE CHANGED
     00186
0110 00032           FIM   P0   11000000B
     00192
0112 00034           FIM   P1   100000B
     00032
0114 00045    C2,    SRC   P6
0115 00209           LDM   1              /LOAD A 0001
0116 00225           WMP                  /0001 SELECTS P/R DATA INP
0117 00036           FIM   P2   12        /R4=1 BITS CNTR,R5=4 CNTR
     00012
0119 00161           LD    R1             /LOAD PIR DIG ADD. POINTER
0120 00047           SRC   P7
0121 00226           WRR                  /SELECT P/R DIGIT
0122 00045           SRC   P6
0123 00234           RDR
0124 00244           CMA
0125 00035           SRC   P1             /SELECT MEM CHAR
0126 00224           WRM                  /WRITE P/R DIG
0127 00097           INC   R1             /INC DIG ADD. PNTR
0128 00099           INC   R3             /INC MEM CHAR PNTR
0129 00246    C3,    RAR                  /ROTATE BITS TO CNT ONES
0130 00026           JCN   CZ   C4        /SKIP INC INST IF BIT 0
     00133
0132 00100           INC   R4
0133 00117    C4,    ISZ   R5   C3        /DO 4 TIMES
     00129
0135 00214           LDM   6              /LOAD A 0110
0136 00045           SRC   P6
0137 00225           WMP                  /0110 SELECTS P/R PARITY
0138 00234           RDR
0139 00245           RAL
0140 00245           RAL                  /PUT P/R PARITY IN C
0141 00247           TCC                  /PUT PARITY BIT IN ACC
0142 00132           ADD   R4             /ADD ONES CNT TO PARITY
0143 00246           RAR                  /RESULT SHOULD BE EVEN
0144 00018           JCN   CN   C10       /JMP IF NOT
     00188
```

-continued

```
0146 00112              ISZ  R0   C2     /LOOP 4 TIMES
     00114
0148 00064              JUN  C9
     00174
0150 00028    C6,       JCN  AN   C5     /JMP IF MODE HAS CHANGED
     00186
0152 00034              FIM  P1   100000B /P1 POINTS TO NEW P/P
     00032
0154 00036              FIM  P2   111100B /P2 POINTS TO OLD P/P
     00060
0156 00241    C7,       CLC                /C MUST BE CLR
0157 00035              SRC  P1
0158 00233              RDM                /READ NEW CHAR
0159 00037              SRC  P2
0160 00232              SBM                /SUB OLD CHAR
0161 00020              JCN  AZ   C8     /JMP IF NO CHANGE
     00171
0163 00034              FIM  P1   100000B /CHANGED, RESET
     00032
0165 00036              FIM  P2   111100B /POINTERS
     00060
0167 00081              JMS  MOV4          /MOVE NEW TO OLD
     00162
0169 00064              JUN  C10
     00188
0171 00099    C8,       INC  R3            /INC DIG POINTER
0172 00117              ISZ  R5   C7     /LOOP 4 TIMES
     00156
0174 00041    C9,       SRC  P4            /SELECT OLD TARE ADD.
0175 00236              RDO
0176 00245              RAL                /PUT DOOR OPEN IN C
0177 00018              JCN  CN   C10    /JMP IF DOOR OPEN
     00188
0179 00043              SRC  P5
0180 00234              RDR
0181 00245              RAL                /PUT A-Z INH IN C
0182 00026              JCN  CZ   C10    /JMP IF TRUE
     00188
0184 00064              JUN  C13
     00191
0186 00247    C5,       TCC
0187 00228              WR0                /UPDATE P/R FLAG
0188 00047    C10,      SRC  P7
0189 00216              LDM  8
0190 00230              WR2                /SET INTF
0191 00084    C13,      JMS  TAR2
     00074
0193 00047    .         SRC  P7            /SELECT PRINT MODE SW
0194 00241              CLC
0195 00233              RDM                /READ PRINT MODE
0196 00020              JCN  AZ   C15+1
     00216
0198 00246              RAR
0199 00241              CLC
0200 00246              RAR                /NOW ACC=0 IF BY WGT
0201 00229              WR1                /WRITE TO BY CNT
0202 00233              RDM                /READ AGAIN
0203 00246              RAR                /C=1 MEANS MODE 2
0204 00043              SRC  P5
0205 00026              JCN  CZ   C14    /JMP IF MODE 1
     00214
0207 00246              RAR                /C=1 IF CONT
0208 00212              LDM  4             /WILL SET CONT
0209 00018              JCN  CN   C15    /JMP IF CONT
     00215
0211 00246              RAR                /RAR IF DEM TO SET DEM
0212 00064              JUN  C15
     00215
0214 00240    C14,      CLB
0215 00230    C15,      WR2                /UPDATE PRINT MODE OUT
0216 00047              SRC  P7
0217 00238              RD2
0218 00245              RAL                /PUT INTF IN C
```

-continued

```
0219 00026            JCN  CZ   C12   /JMP IF INTF NOT SET
     00229
0221 00209            LDM  1
0222 00230            WR2              /CLR INTF, SET INITF
0223 00043    C21,    SRC  P5
0224 00236            RD0
0225 00246            RAR
0226 00250            STC              /TRUE SET
0227 00064            JUN  C22
     00250
0229 00238    C12,    RD2
0230 00246            RAR              /PUT INITF IN C
0231 00026            JCN  CZ   C20   /JMP IF NOT SET
     00252
0233 00047            SRC  P7          /SELECT PRINTER MODE
0234 00233            RDM
0235 00246            RAR              /C=1 IF MODE 2
0236 00018            JCN  CN   C20   /JMP IF MODE 2
     00252
0238 00041            SRC  P4
0239 00236            RD0
0240 00246            RAR              /PUT LOCK SW IN C
0241 00026            JCN  CZ   C20   /JMP IF NOT PRESSED
     00252
0243 00047            SRC  P7
0244 00240            CLB
0245 00230            WR2              /CLR INITF
0246 00043            SRC  P5
0247 00236            RD0
0248 00246            RAR
0249 00241            CLC
0250 00245    C22,    RAL
0251 00228            WR0
0252 00192    C20,BBL 0
0256 00041    OUTPT,  SRC  P4
0257 00036            FIM  P2   110100B    /DEST WILL BE WGT OUT
     00052
0259 00236            RD0
0260 00246            RAR
0261 00246            RAR              /PUT DISPLY PRICE IN C
0262 00026            JCN  CZ   OUTA  /JMP IF NOT SET
     00012
0264 00034            FIM  P1   110000B    /SOURCE IS PRICE
     00048
0266 00065            JUN  OUTB
     00017
0268 00246    OUTA,   RAR              /PUT DISPLY VALUE IN C
0269 00026            JCN  CZ   OUTC  /JMP IF NOT SET
     00019
0271 00034            FIM  P1   111000B    /SOURCE IS VALUE
     00056
0273 00081    OUTB,   JMS  MOV4            /MOVE SOURCE TO DEST
     00162
0275 00045    OUTC,   SRC  P6
0276 00237            RD1              /RD 1/4 GRAD LAMP
0277 00034            FIM  P1   1000000B
     00064
0279 00035            SRC  P1
0280 00252            KBP
0281 00244            CMA
0282 00226            WRR              /WRITE TO ROM4
0283 00043            SRC  P5          /OUTPUT ALL DATA TO BUFFER
0284 00034            FIM  P1 110000B  /MEM AND LATCH
     00048
0286 00236            RD0
0287 00246            RAR
0288 00246            RAR
0289 00250            STC              /SET MEM UPDATE REQ
0290 00245            RAL
0291 00245            RAL
0292 00228            WR0
0293 00081            JMS  LATCH
     00089
```

```
0295 00045             SRC  P6       /SELECT RAM0, ROM0
0296 00213             LDM  5        /LOAD A 0101
0297 00225             WMP           /0101 SELECTS MUE INPUT
0298 00234  OUT1,      RDR
0299 00246             RAR
0300 00246             RAR           /PUT MUE IN C
0301 00026             JCN  CZ  OUT1
     00042
0303 00041             SRC  P4       /SELECT ROM1
0304 00209             LDM  1        /LOAD A 0001
0305 00226             WRR           /0001 TKES CONTROL F BUF
0306 00212             LDM  4
0307 00176             XCH  R0       /R0 IS 12 CNTR
0308 00047  OUT2,      SRC  P7       /SELECT ROM2
0309 00163             LD   R3       /LOAD BUF ADD.
0310 00226             WRR
0311 00035             SRC  P1       /SELECT OUTPUT CHAR
0312 00233             RDM
0313 00045             SRC  P6       /SELECT RAM0
0314 00225             WMP           /OUTPUT BUFFER DATA
0315 00041             SRC  P4       /SELECT ROM1
0316 00211             LDM  3        /LOAD A 0011
0317 00226             WRR           /0011 STROBES WE
0318 00209             LDM  1        /LOAD A 0001
0319 00226             WRR           /0001 TURNS OFF WE
0320 00099             INC  R3       /INC CHAR POINTER
0321 00112             ISZ  R0  OUT2 /LOOP 12 TIMES
     00052
0323 00047             SRC  P7
0324 00163             LD   R3       /POINT BUF ADD. 13
0325 00226             WRR
0326 00043             SRC  P5
0327 00238             RD2           /READ PRINT CONTROL WRD
0328 00045             SRC  P6
0329 00225             WMP
0330 00041             SRC  P4
0331 00211             LDM  3        /STROBE WE
0332 00226             WRR
0333 00209             LDM  1
0334 00226             WRR
0335 00208             LDM  0
0336 00226             WRR           /RELEASE BUFFER CONTROL
0337 00043             SRC  P5
0338 00236             RD0
0339 00246             RAR
0340 00246             RAR
0341 00241             CLC           /CLR MEM. UPDATE REQ
0342 00245             RAL
0343 00245             RAL
0344 00228             WR0
0345 00236  LATCH,     RD0           /SRC P5 LAST GIVEN
0346 00245             RAL           /PUT OVERCAP IN C
0347 00018             JCN  CN  LTCH1/IF SET FORGET
     00097
0349 00176             XCH  R0
0350 00237             RD1
0351 00246             RAR           /PUT OVERVALUE IN C
0352 00176             XCH  R0
0353 00246  LTCH1,     RAR           /SET OVERCAP IF
0354 00045             SRC  P6       /EIGHER WAS SET
0355 00225             WMP
0356 00041             SRC  P4
0357 00212             LDM  4        /LOAD A 0100
0358 00226             WRR           /0100 STROBES 7475
0359 00208             LDM  0
0360 00226             WRR           /REMOVE STROBE
0361 00192             BBL  0
0362 00039  RNDOF,     SRC  P3       /SUBROUTINE FOR WGT ROUNDOFF
0363 00219             LDM  11       /LOAD AN 11
0364 00235             ADM           /C WILL SET IF LSD GE 5
0365 00103             INC  R7
0366 00039  ROFF1,     SRC  P3
0367 00247             TCC           /PUT C IN ACC
```

-continued

```
0368 00235              ADM              /ADD NEXT DIG
0369 00251              DAA
0370 00224              WRM              /UPDATE DIG
0371 00103              INC  R7
0372 00018              JCN  CN  ROFF1   /KEEP GOING UNTIL C 0
     00110
0374 00192              BBL  0
0375 00034  SUBAZ,      FIM  P1  11      /ROUTINE TO SUB AUTO ZERO
     00011
0377 00036              FIM  P2  0       /FROM WGT
     00000
0379 00037              SRC  P2
0380 00239              RD3              /READ AZ SIGN
0381 00246              RAR              /SAVE N C
0382 00236              RD0
0383 00245              RAL
0384 00228              WR0              /PUT AZ SIGN IN
0385 00081              JMS  EWSGN       /ENTER WGT SIGN
     00166
0387 00020              JCN  AZ  RETN    /IF POS LOAD 0
     00134
0389 00193              BBL  1           /IF NEG LOAD 1
0390 00192  RETN,       BBL  0
0391 00176  SWSGN,      XCH  R0          /ROUTINE TO SET WGT SIGN
0392 00043              SRC  P5          /AFTER SUB
0393 00236              RD0              /READ STATUS WORD
0394 00245              RAL
0395 00245              RAL              /PUT WGT SIGN IN C
0396 00176              XCH  R0          /PUT SUB SIGN BACK IN
0397 00246              RAR              /PUT SUB SIGN IN C
0398 00176              XCH  R0          /RECOVER STATUS WORD
0399 00246              RAR
0400 00246              RAR              /PUT UPDATED SIGN IN PLACE
0401 00228              WR0
0402 00036              FIM  P2  0
     00000
0404 00032  MOV5,       FIM  P0  10111011B    /R0=5CNTR, R1=5CNTR
     00187
0406 00035  MOVA,       SRC  P1
0407 00233              RDM
0408 00037              SRC  P2          /READ CHAR
0409 00224              WRM              /WRITE TO DEST
0410 00028              JCN  AN  MOVB    /JMP IF CHAR A 0
     00157
0412 00097              INC  R1          /INC ZEROES CNTR
0413 00099  MOVB,       INC  R3
0414 00101              INC  R5
0415 00112              ISZ  R0  MOVA
     00150
0417 00192              BBL  0
0418 00032  MOV4,       FIM  P0  11001100B    /R0=4 CNTR, R1=4 CNTR
     00204
0420 00065              JUN  MOVA
     00150
0422 00036  EWSGN,      FIM  P2  0       /ROUTINE TO ENTER WGT
     00000
0424 00043              SRC  P5          /SIGN AND THEN SUB
0425 00236              RD0
0426 00245              RAL
0427 00245              RAL              /PUT WGT SIGN IN C
0428 00045              SRC  P6
0429 00236              RD0
0430 00245              RAL
0431 00228              WR0              /ENTER SIGN TO MINUEND
                        /ROUTINE TO SUB NUM AT P1 FROM NUM AT P2
                        /AND LACE RESULT AT P3. ALL REGS ARE USED
0432 00038  SUBTR,      FIM  P3  10000B  /DEST POINTER
     00016
0434 00045              SRC  P6
0435 00163              LD   R3          /LOAD SUBTRAHEND PNTR
0436 00184              XCH  R8          /SAVE IN R8
0437 00165              LD   R5          /LOAD MINUEND PNTR
0438 00185              XCH  R9          /SAVE IN R9
```

```
0439 00219                 LDM  11         /LOAD 5 CNTR
0440 00187                 XCH  R11                /PUT IN R11
0441 00236                 RDO             /READ SIGNS
0442 00246                 RAR             /PUT MINUEND SIGN IN C
0443 00018                 JCN  CN    MINMI    /IF C SET MINUEND MINUS
     00226
0445 00246                 RAR             /C=0. PUT SUBTRAHEND IN C
0446 00018                 JCN  CN    ADD   /IF MINUS WANT TO ADD
     00229
0448 00038    SUB,    FIM  P3    10000B    /REPEAT 3 INSTS IN
     00016
0450 00219                 LDM  11         /CASE NEED TO RE-DO
0451 00187                 XCH  R11                /SUB
0452 00250                 STC             /SET C TO START SUB
0453 00249    SUB1,   TCS                  /IF C=0 A=1001,C=1 A=1010
0454 00035                 SRC  P1
0455 00232                 SBM             /SUB SUBTR
0456 00241                 CLC
0457 00037                 SRC  P2
0458 00235                 ADM             /ADD MINUEND
0459 00251                 DAA             /DECIMAL ADJUST
0460 00039                 SRC  P3
0461 00224                 WRM             /WRITE RESULT TO DEST
0462 00099                 INC  R3         /INC ALL POINTERS
0463 00101                 INC  R5
0464 00103                 INC  R7
0465 00123                 ISZ  R11 SUB1   /LOOP 5 TIMES
     00197
0467 00018                 JCN  CN    SDONE    /IF NO BORROW THEN DONE
     00242
0469 00162                 LD   R2         /IF BORROW MUST RE-DO
0470 00180                 XCH  R4         /XCH MINUEND AND SUBTRAHEND
0471 00178                 XCH  R2
0472 00168                 LD   R8
0473 00181                 XCH  R5
0474 00169                 LD   R9
0475 00179                 XCH  R3
0476 00045                 SRC  P6
0477 00236                 RDO             /READ SIGN STATUS
0478 00244                 CMA             /COM IT
0479 00228                 WRO             /REWRITE IT
0480 00065                 JUN  SUB              /RE-DO SUBTRACTION
     00192
0482 00246    MINMI,  RAR                  /PUT SUBTRAHEND SIGN IN C
0483 00018                 JCN  CN    SUB   /IF C=1 WANT TO SUB
     00192
0485 00241    ADD,    CLC
0486 00035                 SRC  P1
0487 00233                 RDM             /LOAD FIRST NUM
0488 00037                 SRC  P2
0489 00235                 ADM             /ADD SECOND
0490 00251                 DAA             /DECIMAL ADJUST
0491 00039                 SRC  P3
0492 00224                 WRM             /WRITE RESULT TO DEST
0493 00099                 INC  R3
0494 00101                 INC  R5
0495 00103                 INC  R7
0496 00123                 ISZ  R11 ADD+1  /LOOP 5 TIMES
     00230
0498 00040    SDONE,  FIM  P4    11000B    /RESTORE MAINTAINED
     00024
0500 00042                 FIM  P5    110011B   /POINTERS
     00051
0502 00034                 FIM  P1    10000B    /POINT P1 TO DEST
     00016
0504 00045                 SRC  P6
0505 00236                 RDO             /READ SIGN
0506 00246                 RAR             /PUT SIGN IN C
0507 00026                 JCN  CZ    RETN  /JMP IF POS
     00134
0509 00193                 BBL  1          /NEG SIGN
0512 00067    A12LK,  JUN  A12
     00090
```

```
0514 00047   CALC,    SRC   P7
0515 00239            RD3
0516 00246            RAR                      /PUT T1F IN C
0517 00041            SRC   P4
0518 00238            RD2                      /READ T1 INPUT
0519 00018            JCN   CN    A2    /JMP IF T1F SET
     00025
0521 00245            RAL                      /PUT T1 IN C
0522 00018            JCN   CN    A1    /JMP IF T1 TRUE
     00015
0524 00047            SRC   P7
0525 00209            LDM   1
0526 00231            WR3                      /SET T1F
0527 00041   A1,      SRC   P4
0528 00237            RD1
0529 00245            RAL                      /PUT EXPAND IN C
0530 00026            JCN   CZ    INTLK /JMP IF EXPAND NOT TRUE
     00023
0532 00047            SRC   P7
0533 00216            LDM   8
0534 00230            WR2                      /SET INTF
0535 00064   INTLK,   JUN   INTCK
     00067
0537 00245   A2,      RAL                      /PUT T1 IN C
0538 00026            JCN   CZ    A1    /JMP IF T1 FALSE
     00015
0540 00047            SRC   P7
0541 00208            LDM   0
0542 00231            WR3                      /CLR T1F
0543 00032   A5,      FIM   P0    10110000B
     00176
0545 00034            FIM   P1    0
     00000
0547 00084   A3,      JMS   DGSCH              /SEE IF DIG WANTED THERE
     00045
0549 00028            JCN   AN    A3    /TRY AGAIN IF NOT
     00035
0551 00211            LDM   3                  /LOAD A 0011
0552 00225            WMP                      /0011 SELECT WGT DIGIT
0553 00234            RDR                      /READ WGT DIGIT
0554 00244            CMA
0555 00224            WRM
0556 00084            JMS   DGSCH              /MAKE SURE DIGIT STILL THERE
     00045
0558 00028            JCN   AN    A5    /ABORT THIS READ IF NOT
     00031
0560 00099            INC   R3                 /INC WGT CHAR POINTER
0561 00112            ISZ   R0    A3
     00035
0563 00041            SRC   P4
0564 00233            RDM                      /RD TARE TIMER
0565 00020            JCN   AZ    MOTCK /JMP IF NOT RUNNING
     00057
0567 00248            DAC
0568 00224            WRM                      /RUN TIMER TOWARD 0
0569 00084   MOTCK,   JMS   ARICL
     00172
0571 00045            SRC   P6
0572 00210            LDM   2                  /RIG SIGNS SO SUBTRACT
0573 00228            WR0                      /ROUTINE WILL ADD
0574 00034            FIM   P1    11100B
     00028
0576 00035            SRC   P1
0577 00209            LDM   1
0578 00224            WRM                      /ENTER BAND IN ARI
0579 00034            FIM   P1    11011B       /BAND
     00027
0581 00036            FIM   P2    5     /TARGET
     00005
0583 00081            JMS   SUBTR              /ADD BAND TO TARGET
     00176
0585 00036            FIM   P2    11011B
     00027
```

```
0587 00081              JMS   MOV5             /MOVE RESULT BACK TO ARI
     00148
0589 00034              FIM   P1    11011B     /TARGET+BAND
     00027
0591 00036              FIM   P2    0          /WGT
     00000
0593 00045              SRC   P6
0594 00208              LDM   0
0595 00228              WR0                    /BOTH SIGNS ARE +
0596 00081              JMS   SUBTR            /WGT-(TARGET+BAND)
     00176
0598 00020              JCN   AZ    MOTN /HAVE MOTION IF +
     00144
0600 00084              JMS   ARICL
     00172
0602 00034              FIM   P1    11100B
     00028
0604 00209              LDM   1           /LD BAND OF 1
0605 00035              SRC   P1
0606 00224              WRM                    /PUT IN ARI
0607 00034              FIM   P1    11011B     /BAND
     00027
0609 00036              FIM   P2    5          /TARGET
     00005
0611 00081              JMS   SUBTR            /TARGET-BAND
     00176
0613 00036              FIM   P2    11011B
     00027
0615 00081              JMS   MOV5
     00148
0617 00034              FIM   P1    11011B     /TARGET-BAND
     00027
0619 00036              FIM   P2    0          /WGT
     00000
0621 00081              JMS   SUBTR            /WGT-(TARGET-BAND)
     00176
0623 00028              JCN   AN    MOTN /HAVE MOTION IF -
     00144
0625 00043              SRC   P5
0626 00239              RD3                    /READ MOTIONF
0627 00020              JCN   AZ    UDTGT/JMP IF ALREADY NO MOTN
     00151
0629 00041              SRC   P4
0630 00239              RD3
0631 00246              RAR                    /PUT CNT BIT 0 IN C
0632 00026              JCN   CZ    B1         /JMP IF NOT SET
     00125
0634 00210              LDM   2          /CNT = 2
0635 00066              JUN   B3
     00132
0637 00246     B1,      RAR                    /PUT CNT BIT 1 IN C
0638 00026              JCN   CZ    B2          JMP IF NOT SET
     00131
0640 00211              LDM   3          /CNT = 3
0641 00066              JUN   B3
     00132
0643 00209     B2,      LDM   1          /CNT = 1
0644 00176     B3,      XCH   R0         /SAVE IN R0
0645 00045              SRC   P6
0646 00233              RDM                    /READ CURRENT HIT CNT
0647 00242              IAC                    /INC CUR HIT CNT
0648 00224              WRM
0649 00144              SUB   R0         /SUB REQ CNT
0650 00028              JCN   AN    SUBDI/NOT ENOUGH HITS YET
     00157
0652 00043              SRC   P5
0653 00231              WR3                    /CLR MOTIONF
0654 00066              JUN   UDTGT
     00151
0656 00045  MOTN,       SRC   P6
0657 00240              CLB
0658 00224              WRM              /CLR CUR HIT CNT
0659 00221              LDM   13
```

```
-continued
0660 00229              WR1                 /TURN OFF 1/4 GRAD LAMP
0661 00043              SRC  P5
0662 00231              WR3                 /SET MOTION FLAG
0663 00034  UDTGT,      FIM  P1   0
     00000
0665 00036              FIM  P2   5
     00005
0667 00081              JMS  MOV5
     00148
0669 00084  SUBDI,      JMS  LDTAR          /SCAN TARE KEYS
     00057
0671 00084              JMS  ARICL
     00172
0673 00034              FIM  P1   11110B
     00030
0675 00035              SRC  P1
0676 00216              LDM  8
0677 00224              WRM                 /DIGITAL INITIAL OF 8LB.
0678 00034              FIM  P1   11011B
     00027
0680 00036              FIM  P2   0
     00000
0682 00081              JMS  SUBTR          /SUB DIGITAL INITIAL
     00176
0684 00081              JMS  SWSGN          /SET SIGN, MOVE RESULT TO WGT
     00135
0686 00041              SRC  P4
0687 00237              RD1                 /READ EXPAND INPUT
0688 00245              RAL                 /PUT EXPAND IN C
0689 00026              JCN  CZ   A8        /JMP IF NO EXPAND
     00193
0691 00034              FIM  P1   0
     00000
0693 00036              FIM  P2   110100B
     00052
0695 00081              JMS  MOV4
     00162
0697 00034              FIM  P1   11        /CLR AUTO-ZERO AREA
     00011
0699 00084              JMS  ARICL+2
     00174
0701 00221              LDM  13
0702 00229              WR1                 /TURN OFF 1/4 GRAD LAMP
0703 00065              JUN  OUTPT          /JMP TO OUTPUT, WILL RETURN
     00000
                                            /DIRECTLY TO MOTN CHK ROUTINE
0705 00041  A8,         SRC  P4
0706 00239              RD3
0707 00245              RAL                 /PUT A-Z CORR EXP IN C
0708 00026              JCN  CZ   A8A       /JMP IF NOT SET
     00227
0710 00084              JMS  ARICL
     00172
0712 00034              FIM  P1   11101B
     00029
0714 00035              SRC  P1
0715 00214              LDM  6
0716 00224              WRM                 /PUT .6 IN ARI
0717 00034              FIM  P1   11011B
     00027
0719 00036              FIM  P2   0
     00000
0721 00081              JMS  SUBTR          /SUB .6 FROM WGT
     00176
0723 00020              JCN  AZ   A12LK     /JMP IF WGT GE .6
     00000
0725 00043              SRC  P5
0726 00236              RD0
0727 00245              RAL
0728 00245              RAL                 /PUT WGT SGN IN C
0729 00045              SRC  P6
0730 00208              LDM  0
0731 00245              RAL                 /PUT WGT SGN IN ACC
```

```
0732 00231              WR3             /WRITE TO A-Z SGN
0733 00034              FIM   P1    0
     00000
0735 00036              FIM   P2    11
     00011
0737 00081              JMS   MOV5            /MOVE WGT TO A-Z
     00148
0739 00081    A8A,      JMS   SUBAZ     /SUB AUTO-ZERO FROM WGT
     00119
0741 00081              JMS   SWSGN     /SET SIGN. MOVE RESULT TO WGT
     00135
0743 00084              JMS   ARICL
     00172
0745 00034              FIM   P1    11111B
     00031
0747 00035              SRC   P1
0748 00211              LDM   3               /LOAD OVERCAP OF 30 L B
0749 00224              WRM
0750 00034              FIM   P1    11011B
     00027
0752 00081              JMS   EWSGN           /SUB OVERCAP FROM WGT
     00166
0754 00043              SRC   P5
0755 00028              JCN   AN    A9
     00250
0757 00236              RD0
0758 00245              RAL
0759 00250              STC             /SET OVERCAP
0760 00066              JUN   A10
     00253
0762 00236    A9,       RD0
0763 00245              RAL
0764 00241              CLC             /CLR OVERCAP
0765 00246    A10,      RAR
0766 00228              WR0
0767 00239              RD3             /READ MOTIONF
0768 00020              JCN   AZ    A11  /JMP IF NO MOTION
     00012
0770 00236              RD0
0771 00246              RAR             /PUT SET IN C
0772 00018              JCN   CN    A12  /JMP IF SET TRUE
     00090
0774 00034              FIM   P1    110100B
     00052
0776 00084              JMS   BLANK           /BLANK WGT
     00163
0778 00065              JUN   OUTPT
     00000
0780 00084    A11,      JMS   ARICL
     00172
0782 00034              FIM   P1    11011B
     00027
0784 00035              SRC   P1
0785 00213              LDM   5
0786 00224              WRM             /WANT .005 IN ARI
0787 00036              FIM   P2    0
     00000
0789 00081              JMS   SUBTR     /MAG WGT - .005
     00176
0791 00045              SRC   P6
0792 00028              JCN   AN    A7   /JMP IF LT .005
     00030
0794 00221              LDM   13
0795 00229              WR1             /SET 1/4 GRAD LAMP
0796 00067              JUN   A12
     00090
0798 00240    A7,       CLB
0799 00034              FIM   P1    0
     00000
0801 00035              SRC   P1
0802 00210              LDM   2         /LD A 2 FOR 1/4 G LMP TST
0803 00232              SBM             /SUB WGT LSD
0804 00018              JCN   CN    A7B  /JMP IF WGT LE .002
     00040
```

-continued

```
0806 00220              LDM    12          /LD A 12 TO 1/4 G LMP
0807 00229              WR1                /AND LET IT INC ONCE
0808 00237      A7B,    RD1                /RD 1/4 GRAD LAMP
0809 00020              JCN    AZ   A7A    /JMP IF LAMP ALREADY ON
     00045
0811 00242              IAC                /INC TOWARD 0
0812 00229              WR1                /UPDATE 1/4 GRAD LAMP
0813 00161      A7A,    LD     R1          /LOAD ZERO CNTR
0814 00020              JCN    AZ   A12    /JMP IF WGT MOVED WAS 0
     00090
0816 00043              SRC    P5
0817 00234              RDR
0818 00245              RAL                /PUT A-Z INH IN C
0819 00026              JCN    CZ   A12    /JMP IF TRUE
     00090
0821 00084              JMS    ARICL
     00172
0823 00043              SRC    P5
0824 00236              RD0                /READ WGT SIGN
0825 00246              RAR
0826 00246              RAR                /PUT WGT SGN IN LOW ORDER BIT
0827 00244              CMA                /COM ACC FOR A-Z CORRECTION
0828 00045              SRC    P6
0829 00228              WR0                /STORE IN SIGN STATUS
0830 00239              RD3                /READ A-Z SIGN
0831 00246              RAR
0832 00236              RD0
0833 00245              RAL
0834 00228              WR0                /ENTER TO SIGN STATUS
0835 00034              FIM    P1   11011B
     00027
0837 00035              SRC    P1
0838 00209              LDM    1
0839 00224              WRM
0840 00036              FIM    P2   11
     00011
0842 00081              JMS    SUBTR       /CORRECT A-Z BY .001
     00176
0844 00045              SRC    P6          /ENTER RESULTING SIGN
0845 00231              WR3                /TO A-Z SIGN
0846 00036              FIM    P2   10010B
     00018
0848 00241              CLC
0849 00214              LDM    6
0850 00037              SRC    P2
0851 00232              SBM                /SUB A-Z .XXX FROM .6
0852 00020              JCN    AZ   A12    /JMP IF A-Z OUT OF RANGE
     00090
0854 00036              FIM    P2   11
     00011
0856 00081              JMS    MOV5        /MOVE RESULT TO A-Z
     00148
0858 00034      A12,    FIM    P1   11001B
     00025
0860 00035              SRC    P1
0861 00209              LDM    1
0862 00224              WRM                /SET WGT RDY FLG
0863 00084              JMS    LDTAR       /GO TO CHK AND LD TARE
     00057
0865 00084              JMS    ARICL
     00172
0867 00034              FIM    P1   101011B
     00043
0869 00081              JMS    EWSGN       /SUB TARE FROM WGT
     00166
0871 00081              JMS    SWSGN
     00135
0873 00241              CLC
0874 00038              FIM    P3   0      /SELECT WGT
     00000
0876 00081              JMS    RNDOF       /ROUND OFF FINAL NET WGT
     00106
```

```
0878 00034            FIM  P1   1
     00001
0880 00036            FIM  P2   110100B /MOVE HIGH 4 DIG OF
     00052
0882 00081            JMS  MOV4          /WGT TO WGT OUTPUT
     00162
0884 00161            LD   R1            /LD ZERO CNTR
0885 00028            JCN  AN   A27
     00126
0887 00236            RD0
0888 00245            RAL
0889 00245            RAL
0890 00241            CLC            /CLR MINUS
0891 00246            RAR
0892 00246            RAR
0893 00228            WR0
0894 00047    A27,    SRC  P7        /SELECT PRINT MODE SWITCH
0895 00237            RD1            /READ BY CNT
0896 00020            JCN  AZ   A17  /JMP IF BY WGT
     00170
0898 00034            FIM  P1   100000B
     00032
0900 00036            FIM  P2   110000B
     00048
0902 00081            JMS  MOV4         /PUT P/LB SW IN P/LB OUT
     00162
0904 00038            FIM  P3   100100B
     00036
0906 00039            SRC  P3        /SELECT P/CNT SW DECK 1
0907 00233            RDM
0908 00028            JCN  AN   A14  /IF NON-ZERO PUT IT IN
     00147
0910 00103            INC  R7
0911 00039            SRC  P3
0912 00241            CLC
0913 00216            LDM  8         /MUST ADD 8 TO DECK 2
0914 00235            ADM
0915 00043    A14,    SRC  P5
0916 00224            WRM            /ENCODE CNT IN P/LB OUT
0917 00034            FIM  P1   101010B
     00042
0919 00035            SRC  P1        /SELECT OLD CNT VALUE
0920 00241            CLC            /NEW CNT VALUE IN ACC
0921 00232            SBM            /SUB OLD CNT VALUE
0922 00020            JCN  AZ   A16  /JMP IF SAME
     00162
0924 00043            SRC  P5
0925 00233            RDM            /READ NEW CNT
0926 00035            SRC  P1
0927 00224    A13,    WRM            /UPDATE OLD CNT
0928 00066            JUN  INTLK-3   /GO TO SET INTF
     00020
0930 00034    A16,    FIM  P1   100000B
     00032
0932 00036            FIM  P2   111000B
     00056
0934 00081            JMS  MOV4      /PUT P/LB SW IN VALUE OUT
     00162
0936 00068            JUN  A25
     00010
0938 00034    A17,    FIM  P1   101010B
     00042
0940 00035            SRC  P1        /SELECT OLD CNT VALUE
0941 00233            RDM
0942 00020            JCN  AZ A15    /JMP IF WAS BY WGT
     00179
0944 00240            CLB            /CNT VALUE=0 FOR BY WGT
0945 00067            JUN  A13
     00159
0947 00034    A15,    FIM  P1 100000B
     00032
0949 00036            FIM  P2 110000B
     00048
```

-continued

```
0951 00081           JMS  MOV4              /MOVE PRICE TO PRICE OUT
     00162
0953 00034    A18,   FIM  P1   110000B      /P/LB OUT IS MULTIPLIER
     00048
0955 00036           FIM  P2   110100B      /WGT OUT IS MULTIPLICAND
     00052
0957 00240           CLB                    /ENTER MULTIPLY ROUTINE
0958 00185           XCH  R9                /CLR SHIFT CNTR
0959 00038           FIM  P3   10000B       /SET DEST POINTER
     00016
0961 00032           FIM  P0   10001100B    /LOAD 8 CNTR AND 4 CNTR
     00140
0963 00240           CLB
0964 00039    M1,    SRC  P3                /POINT TO DEST DIG
0965 00224           WRM                    /CLR IT
0966 00103           INC  R7
0967 00112           ISZ  R0   M1           /LOOP 8 TIMES
     00196
0969 00241    M2,    CLC
0970 00169           LD   R9                /LOAD SHIFT CNT
0971 00183           XCH  R7                /SHIFT DEST PNTR BY IT
0972 00035           SRC  P1                /SELECT MULTIPLIER DIG
0973 00233           RDM
0974 00244           CMA                    /FORM (DIG NOT)+1 FOR CNTR
0975 00242           IAC
0976 00020           JCN  AZ   M7           /SKIP IF DIG=0
     00231
0978 00184           XCH  R8                /R8 IS DIG ADD CNTR
0979 00220    M3,    LDM  12                /SET MULTIPLICAND CNTR = 4
0980 00176           XCH  R0                /PUT IN R0
0981 00037    M4,    SRC  P2                /SELECT MULTIPLICAND DIG
0982 00233           RDM
0983 00039           SRC  P3                /SELECT DEST DIG
0984 00235           ADM                    /ADD IT
0985 00251           DAA
0986 00224           WRM                    /UPDATE DEST DIG
0987 00103           INC  R7                /INC DEST POINTER
0988 00101           INC  R5
0989 00112           ISZ  R0   M4           /LOOP 4 TIMES
     00213
0991 00081           JMS  ROFF1             /ADD POSSIBLE CARRY
     00110
0993 00169    M6,    LD   R9
0994 00183           XCH  R7                /DEST PNTR = SHIFT CNTR
0995 00212           LDM  4                 /RESTORE MULPLCND PNTR
0996 00181           XCH  R5
0997 00120           ISZ  R8   M3           /LOOP UNTIL ADDS DONE
     00211
0999 00105    M7,    INC  R9                /INC SHIFT CNT
1000 00099           INC  R3                /INC MULTIPLIER PNTR
1001 00113           ISZ  R1   M2           /LOOP UNTIL JOB DONE
     00201
1003 00038           FIM  P3   10001B       /SET ROUNDOFF PNTR
     00017
1005 00241           CLC
1006 00081           JMS  RNDOF
     00106
1008 00040           FIM  P4   11000B       /RESTORE P4
     00024
1010 00034           FIM  P1   10010B
     00018
1012 00036           FIM  P2   111000B
     00056
1014 00081           JMS  MOV4              /MOVE RESULT TO VALUE OUT
     00162
1016 00034           FIM  P1   10110B
     00022
1018 00035           SRC  P1
1019 00233           RDM                    /V00.=0 IF NOT OVERVAL
1020 00068           JUN  1024
     00000
```

```
1024 00020              JCN  AZ  A24    /JMP IF NOT OVERVAL
     00008
1026 00034              FIM  P1  111000B
     00056
1028 00208              LDM  0
1029 00084              JMS  BLANK+1    /ZERO VALUE OUT
     00164
1031 00209              LDM  1
1032 00043   A24,       SRC  P5
1033 00229              WR1             /UPDATE OVERVAL FLG
1034 00043   A25,       SRC  P5
1035 00234              RDR             /READ SELECTIVE BLNK INP
1036 00246              RAR             /PUT P/LB BLNK IN C
1037 00180              XCH  R4
1038 00018              JCN  CN  A19    /JMP IF NO BLNK
     00021
1040 00034              FIM  P1  110000B
     00048
1042 00084              JMS  BLANK      /BLANK P/LB
     00163
1044 00224              WRM             /PUT ZERO IN HIGH ORDER P/LB
1045 00180   A19,       XCH  R4
1046 00246              RAR             /PUT WGT BLNK IN C
1047 00180              XCH  R4
1048 00047              SRC  P7
1049 00237              RD1             /RD BY CNT
1050 00020              JCN  AZ  A28    /JMP IF BY WGT
     00029
1052 00243              CMC             /INVERT BLANK LOGIC
1053 00018   A28,       JCN  CN  A20
     00035
1055 00034              FIM  P1  110100B
     00052
1057 00084              JMS  BLANK      /BLANK WGT
     00163
1059 00180   A20,       XCH  R4
1060 00246              RAR             /PUT VALUE BLNK IN C
1061 00018              JCN  CN  A21
     00043
1063 00034              FIM  P1  111000B
     00056
1065 00084              JMS  BLANK      /BLANK VALUE
     00163
1067 00065   A21,       JUN  OUTPT
     00000
1069 00035   DGSCH,     SRC  P1         /SUBROUTINE TO CHK FOR
1070 00210              LDM  2          /PROPER DIG FROM A/D CONV
1071 00225              WMP             /0010 SELECTS DIG SLCT INP
1072 00234   A4,        RDR
1073 00244              CMA
1074 00241              CLC
1075 00252              KBP             /CONVERT 1 OF 4 CODE TO BIN
1076 00147              SUB  R3         /SUB DESIRED WGT DIG ADD.
1077 00028              JCN  AN  A6     /JMP IF WRING
     00056
1079 00192              BBL  0
1080 00193   A6,        BBL  1
1081 00032   LDTAR,     FIM  P0  11100000B   /R0=2 CNTR
     00224
1083 00034              FIM  P1  100111B
     00039
1085 00045              SRC  P6
1086 00240              CLB
1087 00225              WMP             /SLCT SW INPUTS
1088 00163   TAR1,      LD   R3         /LD SW POINTER
1089 00047              SRC  P7
1090 00226              WRR             /SLCT TARE SW INPUT
1091 00045              SRC  P6
1092 00234              RDR             /RD TARE SW
1093 00035              SRC  P1
1094 00224              WRM             /ENTER TARE DIG
1095 00099              INC  R3
1096 00112              ISZ  R0  TAR1   /LOOP 2 TIMES
     00064
```

-continued

```
1098 00045   TAR2,    SRC  P6
1099 00238            RD2              /RD AUTO TARE FLG
1100 00028            JCN  AN  ENTAT   /JMP IF SET
     00132
1102 00036            FIM  P2  101000B
     00040
1104 00038            FIM  P3  101101B
     00045
1106 00037            SRC  P2
1107 00233            RDM              /RD .T
1108 00020            JCN  AZ  B4      /JMP IF NOT PRESSED
     00099
1110 00084            JMS  TIMCK
     00114
1112 00037            SRC  P2
1113 00233            RDM              /RD .T
1114 00246            RAR
1115 00026            JCN  CZ  NOTAR   /JMP IF NO TARE WANTED
     00127
1117 00246            RAR
1118 00018            JCN  CN  ENTAT   /JMP IF AUTO TARE
     00132
1120 00233            RDM              /RD .T
1121 00039            SRC  P3
1122 00224            WRM              /WRITE TO TARE OUT
1123 00036   B4,      FIM  P2  100111B
     00039
1125 00038            FIM  P3  101100B
     00044
1127 00037            SRC  P2
1128 00233            RDM              /RD .OT
1129 00020            JCN  AZ  TIMCK-1    /JMP IF NOT PRESSED
     00113
1131 00084            JMS  TIMCK
     00114
1133 00037            SRC  P2
1134 00233            RDM              /RD .OT
1135 00039            SRC  P3
1136 00224            WRM              /WRITE TO TARE REG
1137 00192            BBL  0
1138 00216   TIMCK,   LDM  8
1139 00047            SRC  P7
1140 00230            WR2              /SET INTF
1141 00041            SRC  P4
1142 00233            RDM              /RD TARE TIMER
1143 00028            JCN  AN  TIMCK-1    /JMP IF RUNNING
     00113
1145 00221            LDM  13
1146 00224            WRM              /START TIMER
1147 00034            FIM  P1  101011B
     00043
1149 00068            JUN  ARICL+2    /CLR TARE
     00174
1151 00084   NOTAR,   JMS  NOTAR-4    /MAKE SURE TARE CLEARED
     00123
1153 00041            SRC  P4
1154 00224            WRM              /STOP TARE TIMER
1155 00192            BBL  0
1156 00045   ENTAT,   SRC  P6
1157 00209            LDM  1
1158 00230            WR2              /SET AUTO TARE FLG
1159 00034            FIM  P1  11001B
     00025
1161 00035            SRC  P1
1162 00233            RDM              /RD WGT RDY FLG
1163 00020            JCN  AZ  ENTAT-1 /JMP IF NOT RDY
     00131
1165 00240            CLB
1166 00224            WRM              /CLR WGT RDY FLG
1167 00043            SRC  P5
1168 00236            RD0
1169 00245            RAL
1170 00245            RAL              /PUT WGT SGN IN C
```

-continued

```
1171 00018            JCN  CN CLATF     /JMP IF MINUS
     00158
1173 00239            RD3               /RD MOTION FLG
1174 00028            JCN  AN ENTAT-1   /JMP IF MOTN
     00131
1176 00034            FIM  P1  0
     00000
1178 00036            FIM  P2  101011B
     00043
1180 00081            JMS  MOV5          /ENTER WGT AS TARE
     00148
1182 00045  CLATF,    SRC  P6
1183 00240            CLB
1184 00230            WR2                /CLR AUTO TARE FLG
1185 00068            JUN  NOTAR+2
     00129
                      /ROUTINE TO BLANK 4 CHARS
1187 00223  BLANK,    LDM  15            /LD A BLANK
1188 00032            FIM  P0  11000000B  /LD A 4 CNTR TO R0
     00192
1190 00035  BLNK1,    SRC  P1            /P1 HOLDS ADDRESS
1191 00224            WRM                /WRITE BLANK
1192 00099            INC  R3
1193 00112            ISZ  R0  BLNK1     /LOOP 4 TIMES
     00166
1195 00192            BBL  0
                      /ARITHMETIC AREA CLR ROUTINE
                      /CLRS 5 DIGITS. USED BEFORE SUBTRACT
1196 00034  ARICL,    FIM  P1  11011B    /MEM REG 1, CHAR 11
     00027
1198 00240            CLB
1199 00045            SRC  P6
1200 00228            WR0                /CLR SIGN STATUS
1201 00035  ACLR1,    SRC  P1
1202 00224            WRM                /WRITE A 0
1203 00115            ISZ  R3 ACLR1      /LOOP 5 TIMES
     00177
1205 00192            BBL  0
                      /ROUTINE TO READ 1 WRD OF DISCRETE INP
1206 00161  RDINP,    LD   R1            /R1 HOLDS MLPX ADD.
1207 00045            SRC  P6            /SELECT RAM0
1208 00225            WMP
1209 00234            RDR
1210 00041            SRC  P4
1211 00231            WR3                /WRITE INPUT TO STATUS 3
1212 00097            INC  R1/INC MLPX ADD.
1213 00192            BBL  0
1214 00034  PCHK3,    FIM  P1  101000B
     00040
1216 00035            SRC  P1
1217 00241            CLC
1218 00210            LDM  2
1219 00232            SBM                /SUB .T FROM 2
1220 00028            JCN  AN PCHK4      /JMP IF NO TARE NOT PRESSED
     00224
1222 00034            FIM  P1  110000B
     00048
1224 00036            FIM  P2  110000B
     00048
1226 00081            JMS  MOV4          /SEE IF P/P 0
     00162
1228 00161            LD   R1
1229 00028            JCN  AN PCHK4      /JMP IF NOT 0
     00224
1231 00228            WR0                /CLR SET, MINUS, OVERCAP
1232 00209            LDM  1
1233 00230            WR2                /SET PRINT
1234 00081            JMS  OUTPT
     00000
1236 00034            FIM  P1  6
     00006
1238 00112  PCHK5,    ISZ  R0  PCHK5
     00214
```

```
1240  00113           ISZ  R1   PCHK5
      00214
1242  00114           ISZ  R2   PCHK5
      00214
1244  00115           ISZ  R3   PCHK5  /1.1 SEC DELAY
      00214
1246  00064           JUN  PCHK2
      00063
1248  00084  PCHK4,   JMS  ARICL
      00172
1250  00064           JUN  PCHK+2
      00039
```

What we claim is:

1. Net weight measuring apparatus comprising, in combination, scale means for measuring the gross weight of an article, a plurality of push button switch means for entering a tare weight into said apparatus, each switch means corresponding to a different value tare weight, a tare weight memory, means for measuring a predetermined time interval starting when one of said tare switch means is pushed, means for storing in said tare weight memory a tare weight corresponding to the sum of the tare weights for predetermined ones of said switch means pushed during a measured predetermined time interval, and means for subtracting the tare weight stored in said memory from the measured gross article weight to obtain the net weight of the article.

2. Net weight measuring apparatus, as set forth in claim 1, wherein said switch means includes a plurality of first switch means corresponding to tare weight digits having a predetermined significance and at least one second switch means corresponding to a tare weight digit having the next higher significance, and wherein said means for storing a tare weight in said memory is responsive to the actuation of first and second switch means during a measured predetermined time interval for storing in said memory the sum tare weight from a single first switch means and a single second switch means.

3. Measuring apparatus comprising, in combination, means for measuring a parameter of an object, a plurality of push button switch means for entering a measurement into said apparatus, each switch means corresponding to a different value of measurement, a measurement memory, means for measuring a predetermined time interval starting when one of said switch means is actuated, means for storing in said measurement memory a measurement corresponding to the sum of the measurements corresponding to predetermined ones of the switch means actuated during said measured predetermined time interval, and means for combining the measurement stored in said memory with the measured parameter from said measuring means.

4. Measuring apparatus comprising, in combination, means for measuring a parameter of an object, a computer interconnected with said measuring apparatus having a memory, a plurality of switch means for entering measurements into said memory, each switch means corresponding to a different value of measurement, said computer comprising means for (1) measuring a predetermined time interval starting when one of said switch means is actuated, for (2) storing in said memory a measurement corresponding to the sum of the measurements corresponding to predetermined ones of the switch means actuated during said measured predetermined time interval, and for (3) combining the measurement stored in said memory with the measured parameter from said measuring means.

* * * * *

UNITED STATES PATENT OFFICE
CERTIFICATE OF CORRECTION

PATENT NO. : 3,962,570

DATED : June 8, 1976

INVENTOR(S) : Richard C. Loshbough and Edward G. Pryor

It is certified that error appears in the above-identified patent and that said Letters Patent are hereby corrected as shown below:

Column 1, line 7, "converter" should be -- Serial --; line 46, "in" should be -- each --; line 47, delete "The".

Column 2, line 7, "the" should be -- The --; line 10, "until" should be -- unit --; line 16, after "until" insert -- the --; line 19, "unit" should be -- until --.

Column 3, line 20, before "tare" insert -- the --.

Column 4, line 21, after "load" insert -- cell --.

Column 12, line 15, "flat" should be -- flag --; line 31, before "switch" insert -- expand --.

Column 13, line 15, before "increments" insert -- in 0.001 pound --; line 29, "of" should be -- or --.

Column 15, line 21, delete "is" first occurrence.

Column 16, line 19, "bases" should be -- buses --.

Column 20, line 21, "weighted" should be -- weighed --; line 27, "busses" should be -- buses --.

Column 23, line 48, "indicaator" should be -- indicator --.

Column 25, line 50, "tionn" should be -- tion --; line 61, after "direct" insert -- current --; line 65, "annalog/digital" should be -- analog/digital --.

Column 26, line 3, "examplary" should be -- exemplary --.

Column 30, line 36, "P3" should be -- R3 --.

UNITED STATES PATENT OFFICE
CERTIFICATE OF CORRECTION

PATENT NO. : 3,962,570

DATED : June 8, 1976

Page 2 of 2

INVENTOR(S) : Richard C. Loshbough and Edward G. Pryor

It is certified that error appears in the above-identified patent and that said Letters Patent are hereby corrected as shown below.

Column 31, line 36, "Therafter" should be -- Thereafter --; line 37, "indicated" should be -- indication --.

Column 32, line 43, "block" first occurrence should be -- B12 --; line 44, entire line should be deleted; line 45, delete "fer Cl to"; line 62, "in" should be -- of --.

Column 36, line 24, "device's" should be -- devices --; same line, before "at" insert -- ROM's --.

Column 38, line 11, delete "Next the four most significant digits of the"; line 12, delete "weight recorded in the raw weight register 710.".

Column 39, line 31, after "neither" insert -- the zero correction register 711 nor the zero count register --.

Column 45, line 17, "these" should be -- the --.

Signed and Sealed this

Twenty-eighth Day of June 1977

[SEAL]

Attest:

RUTH C. MASON
Attesting Officer

C. MARSHALL DANN
Commissioner of Patents and Trademarks